United States Patent
Murakami

(10) Patent No.: US 8,062,562 B2
(45) Date of Patent: Nov. 22, 2011

(54) METHOD OF PRODUCING A CELLULOSE ESTER FILM

(75) Inventor: Takashi Murakami, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 25 days.

(21) Appl. No.: 12/422,492

(22) Filed: Apr. 13, 2009

(65) Prior Publication Data

US 2009/0202823 A1 Aug. 13, 2009

Related U.S. Application Data

(63) Continuation of application No. 11/509,768, filed on Aug. 25, 2006, now abandoned.

(30) Foreign Application Priority Data

Aug. 30, 2005 (JP) ................................ 2005-249038

(51) Int. Cl.
*B29D 11/00* (2006.01)
*B29C 39/14* (2006.01)
(52) U.S. Cl. .......... 264/1.34; 264/2.6; 264/2.7; 264/217
(58) Field of Classification Search .............. 264/1.1, 264/1.34, 2.6, 2.7, 216, 217
See application file for complete search history.

(56) References Cited

U.S. PATENT DOCUMENTS

| | | | |
|---|---|---|---|
| 6,814,914 B2 | 11/2004 | Tasaka et al. | |
| 6,881,457 B2 | 4/2005 | Tasaka et al. | |
| 2002/0102369 A1 | 8/2002 | Shimizu et al. | |
| 2002/0156270 A1 | 10/2002 | Kazama et al. | |
| 2002/0162483 A1 | 11/2002 | Shimizu et al. | |
| 2005/0140881 A1 | 6/2005 | Nimura et al. | |
| 2005/0195348 A1 | 9/2005 | Saitoh et al. | |
| 2005/0208231 A1 | 9/2005 | Nimura et al. | |
| 2006/0181774 A1* | 8/2006 | Ojima et al. | 359/586 |
| 2007/0048462 A1* | 3/2007 | Takebe et al. | 428/1.33 |

* cited by examiner

*Primary Examiner* — Mathieu D. Vargot

(74) *Attorney, Agent, or Firm* — Finnegan, Henderson, Farabow, Garrett & Dunner, L.L.P.

(57) ABSTRACT

A cellulose ester film exhibiting: a free volume radius of 0.25 to 0.31 nm and a half-width of 0.04 to 0.1 nm, the free volume radius and the half-width being determined by positron annihilation lifetime spectroscopy; and Ro of 0 to nm and Rt of −30 to +20 nm, Ro and Rt being defined by the following equations: Equation (a): $Ro=(nx-ny) \times d$; Equation (b): $Rt=((nx+ny)/2-nz) \times d$ (Ro: in-plane retardation, Rt: retardation in the thickness direction of the film, nx: in-plane refractive index in slow axis direction, ny: in-plane refractive index in fast axis direction, nz: refractive index in the thickness direction of the film (refractive indexes being measured at wavelength of 590 nm), d: thickness of the film (nm)).

2 Claims, 1 Drawing Sheet

METHOD OF PRODUCING A CELLULOSE ESTER FILM

This is a continuation application of application Ser. No. 11/509,768, filed on Aug. 25, 2006, now abandoned claiming the benefit of the filing date of Japanese Patent Application No. 2005-249038, filed Aug. 30, 2005, All applications cited in this paragraph are incorporated herein by reference.

This application is based on Japanese Patent Application No. 2005-249038 filed on Aug. 30, 2005 in Japanese Patent Office, the entire content of which is hereby incorporated by reference.

FIELD OF THE INVENTION

The present invention relates to a cellulose ester film, a polarizing plate, and a display, and in more detail, relates to a cellulose ester film which hardly causes a rupture problem during the polarizing plate production process employing a cellulose ester film exhibiting reduced optical anisotropy, and also hardly causes variation of retardation values, as well as relates to an in-plane switching mode liquid crystal display having a polarizing plate prepared by using the cellulose ester film, the in-plane switching mode liquid crystal display exhibiting excellent visibility even under changing screen luminance.

BACKGROUND OF THE INVENTION

Along with improvements in performance and quality of liquid crystal displays, various demands have been made for polarizing plate protective films employed in polarizing plates.

Commonly employed as the polarizing plate protective film of liquid crystal displays is film which employs cellulose ester as a material. In view of assuring flatness, cellulose ester film is commonly produced employing a solution film-casting method, whereby the refractive index in the thickness direction of the film tends to be lower than that in the in-plane direction.

In Patent Document 1, described is a cellulose ester film which results in minimal degradation of the polarizer under high temperature and high humidity, and reduced optical anisotropy due to the incorporation of ethylenic polymers. However, when only ethylenic polymers are incorporated, rupture of the film tends to occur during the production process of the polarizing plates. Further, it is desirous to reduce the variation of retardation values. Specifically, it was found that in the horizontal electric field switching mode type or the in-plane switching mode (hereinafter referred to as an IPS type) liquid crystal display, when the image area luminance is adjusted based on the ambient brightness during viewing, visibility such as contrast or color shift varied.

Patent Document 1 Japanese Patent Publication for Public Inspection (hereinafter referred to as JP-A) No. 2003-12859

SUMMARY OF THE INVENTION

An object of the present invention is to provide a cellulose ester film which hardly causes a rupture problem during a polarizing plate production process employing the cellulose ester film exhibiting reduced optical anisotropy, and also hardly causes variation of retardation values. Further another object of the present invention is to provide an in-plane switching mode liquid crystal display having a polarizing plate prepared by employing the above cellulose ester film, the in-plane switching mode liquid crystal display exhibiting excellent visibility even when the screen luminance varies.

One of the aspects of the present invention to achieve the above objects is a cellulose ester film exhibiting: a free volume radius of 0.25 to 0.31 nm and a half-width of 0.04 to 0.1 nm, the free volume radius and the half-width being determined by positron annihilation lifetime spectroscopy; and Ro of 0 to 10 nm and Rt of −30 to +20 nm, Ro and Rt being defined by the following equations.

$$Ro = (nx - ny) \times d \qquad \text{Equation (a)}$$

$$Rt = ((nx + ny)/2 - nz) \times d \qquad \text{Equation (b)}$$

DESCRIPTION OF THE PREFERRED EMBODIMENTS

Figure 1:
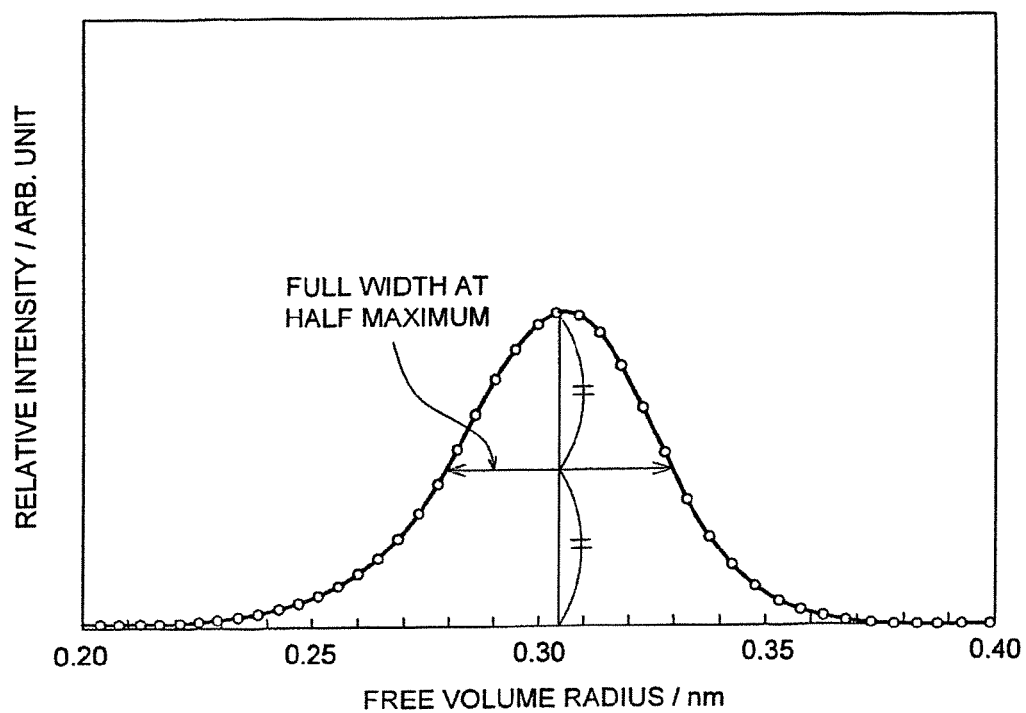
FIG. 1 is a typical example of a graph showing a relationship between free volume radius and relative intensity.

The above objects of the present invention are achieved by the following structures.

(1) A cellulose ester film exhibiting:

a free volume radius of 0.25 to 0.31 nm and a half-width of 0.04 to 0.1 nm, the free volume radius and the half-width being determined by positron annihilation lifetime spectroscopy; and Ro of 0 to 10 nm and Rt of −30 to +20 nm, Ro and Rt being defined by the following equations:

$$Ro = (nx - ny) \times d \qquad \text{Equation (a)}$$

$$Rt = ((nx + ny)/2 - nz) \times d \qquad \text{Equation (b)}$$

wherein Ro represents an in-plane retardation value, Rt represents a retardation value in a thickness direction of the film, nx represents an in-plane refractive index in a slow axis direction, ny represents an in-plane refractive index in a fast axis direction, nz represents a refractive index in the thickness direction of the film (each refractive index is determined at a wavelength of 590 nm), and d represents a thickness of the film (nm).

(2) The cellulose ester film of Item (1), wherein the film comprises, as an additive, a polymer having a weight average molecular weight of 500 to 30000, the polymer being prepared from a monomer having an ethylenically unsaturated bond.

(3) The cellulose ester film of Item (1) comprising an additive selected from the group consisting of compounds represented by Formulas (1), (2), (3), (4), (5), (6), (7), (8), (9), (10), (11), (12), (13) and (14):

Formula (1)

wherein $R^1$ and $R^2$ each independently represents an alkyl group which may have a substituent or an aryl group which may have a substituent, Formula (2)

[Chemical structure showing a central atom $X^2$ bonded to three phenyl rings with substituents $R^{11}$ through $R^{35}$]

wherein $X^2$ represents B, C—R (wherein R represents a hydrogen atom or a substituent), or N; and $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent, $$R1\text{-}(OH)n \qquad \text{Formula (3)}$$

wherein R1 represents an organic group having a valence of n, and n represents an integer of 2 or more, $$Y^{31}\text{—}L^{31}\text{—}Y^{32} \qquad \text{Formula (4)}$$

Formula (5)

$$Y^{33}\text{—}L^{32}\text{—}\underset{\underset{Y^{34}}{\overset{\vert}{L^{33}}}}{\overset{\overset{V^{31}}{\vert}}{C}}\text{—}L^{32}\text{—}Y^{32}$$

Formula (6)

$$Y^{36}\text{—}L^{35}\text{—}\underset{\underset{Y^{37}}{\overset{\vert}{L^{36}}}}{\overset{\overset{Y^{39}}{\vert}\overset{\vert}{L^{38}}}{C}}\text{—}L^{37}\text{—}Y^{38}$$

Formula (7)

$$Y^{40}\text{—}L^{39}\text{—}\underset{\underset{Y^{41}}{\overset{\vert}{L^{40}}}}{\overset{\overset{V^{32}}{\vert}}{C}}\text{—}L^{43}\text{—}\underset{\underset{Y^{42}}{\overset{\vert}{L^{41}}}}{\overset{\overset{V^{33}}{\vert}}{C}}\text{—}L^{42}\text{—}Y^{43}$$

Formula (8)

$$Y^{45}\text{—}L^{44}\text{—}\underset{\underset{Y^{46}}{\overset{\vert}{L^{45}}}}{\overset{\overset{V^{44}}{\vert}\overset{\vert}{L^{43}}}{C}}\text{—}L^{48}\text{—}\underset{\underset{Y^{47}}{\overset{\vert}{L^{46}}}}{\overset{\overset{V^{34}}{\vert}}{C}}\text{—}L^{47}\text{—}Y^{48}$$

Formula (9)

$$Y^{49}\text{—}L^{49}\text{—}\underset{\underset{Y^{50}}{\overset{\vert}{L^{50}}}}{\overset{\overset{V^{36}}{\vert}}{C}}\text{—}L^{43}\text{—}\underset{\underset{Y^{51}}{\overset{\vert}{L^{51}}}}{\overset{\overset{V^{36}}{\vert}}{C}}\text{—}L^{56}\text{—}\underset{\underset{Y^{52}}{\overset{\vert}{L^{52}}}}{\overset{\overset{V^{37}}{\vert}}{C}}\text{—}L^{53}\text{—}Y^{53}$$

-continued

Formula (10)

$$Y^{54}\text{—}L^{56}\text{—}\underset{\underset{Y^{55}}{\overset{\vert}{L^{57}}}}{\overset{\overset{Y^{59}}{\vert}\overset{\vert}{L^{61}}}{C}}\text{—}L^{43}\text{—}\underset{\underset{Y^{56}}{\overset{\vert}{L^{58}}}}{\overset{\overset{Y^{58}}{\vert}\overset{\vert}{L^{60}}}{C}}\text{—}L^{69}\text{—}Y^{57}$$

Formula (11)

$$Y^{60}\text{—}L^{62}\text{—}\underset{\underset{Y^{61}}{\overset{\vert}{L^{63}}}}{\overset{\overset{V^{38}}{\vert}}{C}}\text{—}L^{67}\text{—}\underset{\underset{Y^{62}}{\overset{\vert}{L^{68}}}}{\overset{\overset{Y^{66}}{\vert}\overset{\vert}{L^{71}}}{C}}\text{—}L^{56}\text{—}\underset{\underset{Y^{63}}{\overset{\vert}{L^{69}}}}{\overset{\overset{V^{39}}{\vert}}{C}}\text{—}L^{66}\text{—}Y^{64}$$

Formula (12)

$$Y^{65}\text{—}L^{72}\text{—}\underset{\underset{Y^{66}}{\overset{\vert}{L^{73}}}}{\overset{\overset{V^{40}}{\vert}}{C}}\text{—}L^{78}\text{—}\underset{\underset{Y^{67}}{\overset{\vert}{L^{74}}}}{\overset{\overset{V^{41}}{\vert}}{C}}\text{—}L^{79}\text{—}\underset{\underset{Y^{68}}{\overset{\vert}{L^{75}}}}{\overset{\overset{V^{42}}{\vert}}{C}}\text{—}L^{80}\text{—}\underset{\underset{Y^{69}}{\overset{\vert}{L^{76}}}}{\overset{\overset{V^{43}}{\vert}}{C}}\text{—}L^{77}\text{—}Y^{70}$$

wherein $Y^{31}$-$Y^{70}$ each independently represent an acyloxy group having 1-20 carbon atoms, an alkoxycarbonyl group having 2-20 carbon atoms, an amido group having 1-20 carbon atoms, a carbamoyl group having 1-20 carbon atoms or a hydroxyl group; $V^{31}$-$V^{43}$ each independently represent a hydrogen atom or an aliphatic group having 1-20 carbon atoms; and $L^{31}$-$L^{80}$ each independently represent a single bond or a divalent saturated linking group having 1-40 total atoms and 0-20 carbon atoms; and $V^{31}$-$V^{43}$ and $L^{31}$-$L^{80}$ each may further have a substituent, Formula (13)

$$Q^1\text{—}\overset{\overset{Q^2}{\vert}}{X}\text{—}Q^3$$

wherein $Q^1$, $Q^2$, and $Q^3$ each independently represent a group having a 5- or 6-membered hydrocarbon ring or a 5- or 6-membered heterocycle, and the ring may be combined with another ring to form a condensed ring, and Formula (14)

[Chemical structure showing a bicyclic phosphate compound with P=O, with substituents $R^1$, $R^2$, $R^3$, X, Y]

wherein $R^1$, $R^2$, and $R^3$ each independently represents a hydrogen atom or an alkyl group having 1-5 carbon atoms; X represents a single bond, —O—, —CO—, an alkylene group, or an arylene group; and Y represents a hydrogen atom, an alkyl group, an aryl group or an aralkyl group.

(4) The cellulose ester film of Item (1) exhibiting Rt of $$-20 \text{ nm} \leq Rt < 3 \text{ nm}.$$

(5) A polarizing plate having the cellulose ester film of any one of Items (1) to (4) on one surface of a polarizing film.

(6) The polarizing plate of Item (5) comprising a polarizing film containing polyvinyl alcohol, the polarizing film having a thickness of 10 to 20 μm.

(7) The polarizing plate of Item (5) comprising a polarizing film containing ethylene-modified polyvinyl alcohol.

(8) A display comprising the polarizing plate of any one of Items (5) to (7) and a direct backlight.

According to the present invention, it is possible to provide a cellulose ester film which hardly results in a rupture of the film during a polarizing plate production process employing a cellulose ester film of reduced optical anisotropy and also hardly results in variation of the retardation value. Further, it is possible to provide a in-plane switching mode crystal display fitted with a polarizing plate prepared by employing the above cellulose ester film, which results in excellent visibility even when the image area luminance varies.

The most preferred embodiment to practice the present invention will now be detailed, however the present invention is not limited thereby.

The features of cellulose ester film of the present invention are that the free volume radius and a half-value width, determined by a positron annihilation lifetime method, are 0.25-0.31 nm, and 0.04-0.1 nm, respectively, and Ro and Rt defined in the above formula are 0-10 nm and −30-+20, respectively.

It is desirable to adjust the luminance of the image area of displays based on the ambient brightness during viewing images. Namely, it is preferable that in a bright room, images are best viewed by increasing the luminance of the image area, while in a darker room, images are best viewed by decreasing the luminance of the image area. Accordingly, it is also preferable that the brightness of the room is automatically sensed by a sensor, whereby the luminance is automatically varied. However, it has been discovered that when luminance varies, problems occur in which visibility such as an image area contrast or color shift varies. The reasons for this are not fully understood, but it is assumed that the heat generated by the backlight varies, whereby the visibility varies.

The cellulose ester film of the present invention exhibits characteristics such that, as the above range of Ro and Rt shows, optical anisotropy is significantly decreased, and further, the free volume radius, determined via the positron annihilation lifetime spectroscopy, is 0.25-0.310 nm, while the half-value width is 0.04-0.1 nm, none of which values have been achieved by conventional cellulose ester films. Consequently, the above drawbacks may be overcome by employing a polarizing plate in which the cellulose ester film of the present invention is employed in the polarizing plate protective film, whereby it was discovered that it was possible to provide a display which results in decreased visibility variation even when luminance varies. Namely, it has become possible to provide a liquid crystal display, which automatically varies luminance based on the ambient brightness.

The present invention will now be detailed below.

The cellulose ester film of the present invention is characterized in that the free volume radius is 0.25-0.31 nm and the half-width is 0.04-0.1 nm, the free volume radius and the half-width being determined by positron annihilation lifetime spectroscopy.

The free volume radius in the present invention represents vacant area which is not occupied by the cellulose ester chain. This free volume radius can be measured using positron annihilation lifetime spectroscopy. More specifically, by measuring the time from injection of positrons into a cellulose ester film to the annihilation of the positrons, size and numerical concentration of free volume or atomic holes are nondestructively estimated from the annihilation lifetime of positrons.

<Measurement of Free Volume Radius by Positron Annihilation Lifetime Spectroscopy>

A positron annihilation lifetime and relative intensity were measured under the following measurement condition.

(Measurement Condition)

Positron source: 22NaCl (intensity: 1.85 MBq)

Gamma-ray detector: Plastic scintillator+Photomultiplier tube

Apparatus time resolution: 290 ps

Measurement temperature: 23° C.

Total number of counts: 1 million counts

Specimen size: 20 pieces of 20 mm×15 mm sized films were piled to prepare an about 2 mm thick sample. The sample was dried under vacuum 24 hours.

Irradiation area: About 10 mm in diameter

Time per channel: 23.3 ps/ch

According to the above measurement condition, positron annihilation lifetime spectroscopy was carried out. Using a nonlinear least-square method, three components of cellulose ester films were analyzed. When the annihilation times were referred to as, in small order, τ1, τ2 and τ3 and the corresponding intensities were referred to as I1, I2 and I3 (I1+I2+I3=100%), respectively, using the largest annihilation time τ3, a free volume radius R3 (nm) was determined using the following formula. The larger the τ3 value is, the larger the free volume is estimated to be.

$$\tau3=(1/2)[1-\{R3/(R3+0.166)\}+(1/2\pi)\sin\{2\pi R3/(R3+0.166)\}]-1$$

where, 0.166 (nm) represents the thickness of the electronic layer which is exuding from the wall of a hole.

The above measurement was repeated twice, and using the peak and the shape of the peak determined from the relative intensity and free volume radius, its average value and a full width at half maximum (half-width) were determined. In FIG. 1, a graph representing a typical relationship between relative intensity and free volume radius is shown. The relative intensity represents a relative existing probability of free volume. In FIG. 1, the unit of the relative intensity is arbitrary. The above mentioned half-width is, for example, the half-width shown in FIG. 1.

Herein, a full width at half maximum (half-width) refers to a width between the peak shape determined from the relative intensity and free volume radius shown in FIG. 1 at the level of the half value of the peak relative intensity represented in unit of nm.

Evaluation of a free volume in polymer by positron annihilation lifetime spectroscopy is explained in, for example, MATERIAL STAGE vol. 4, No. 5, 2004, pp. 21-25, The TRC News, No. 80 (July, 2002) PP. 20-22 (published by Toray Research Center Inc.), and "BUNSEKI", 1988, pp. 11-20".

The free volume radius of the cellulose ester film of the present invention is 0.250-0.310 nm and the half-width is 0.04-0.100 nm. The free volume radius of the film of the present invention preferably spread in the range of 0.20 nm-0.40 nm and the peak of the free volume radius lies in the range of 0.25-0.30 nm. No cellulose ester film having a peak of free volume radius less than 0.25 nm has been found so far. The cellulose ester film of the present invention having a free volume radius of 0.250-0.305 nm is preferable because it tends not cause rupture of the film. The half-width is preferably 0.040-0.095, more preferably 0.045-0.090 and still more preferably 0.070-0.090. No cellulose ester film exhibiting a half-width less than 0.040 nm has been found so far.

The method to control the free volume radius within the prescribed range is not specifically limited, however, it can be controlled by the following method.

A cellulose ester film having a free volume radius of 0.250-0.310 nm determined by positron annihilation lifetime spectroscopy is obtained by the following method: casting a dope containing at least a plasticizer and cellulose ester to form a web; stretching the web while the web still contains a solvent; drying the web until an amount of residual solvent decreases to 0.3% to obtain a cellulose ester film; treating the film at 105-170° C. under a rate of atmosphere replacement of 12 times/h or more or more preferably 12-45 times/h while the web is transported.

The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/h)

When the heat treatment temperature exceeds 155° C., or when it is lower than 105° C., the effect of the present invention tends not be acquired.

As the treatment temperature, it is still more preferable that the treatment temperature is in the range of 120-160° C. Further, preferable is that the heat treatment is carried out under the condition in which the rate of atmosphere replacement is 12 times/h or more. When it is less than 12 times/h, the effect of the present invention tends not be acquired.

When the rate of atmosphere replacement is 12 times/h or more, the concentration of the plasticizer evaporated from the cellulose ester film in the atmosphere is thoroughly reduced, accordingly, re-deposition of the plasticizer to the retardation film is also reduced. This is assumed to contribute in attaining the effect of the present invention. When the rate of atmosphere replacement is increased more than necessary, the production cost increases and due to the fluttering of the web, retardation patch increases. Accordingly, it is not recommended that the rate of atmosphere replacement is increased more than necessary, however, after the web was thoroughly dried and the amount of residual solvent is considerably decreased, it can be increased. However, the rate of atmosphere replacement of 45 times/h or more is not practical since the production cost drastically increases. The heat treatment under the rate of atmosphere replacement of 12 times/h or more is preferably carries out within 1 minute-1 hour. If the treatment time is less than 1 minute, the free volume radius within a prescribed range may be difficult to obtain, while, when it is not more than 1 hour, the change of retardation value is allowable.

Further, in this process, a pressurizing treatment of the retardation film in the thickness direction may also be effectively carried out to control the free energy volume radius within more preferable range. The pressure is preferably 0.5-10 kPa. The amount of residual solvent at the stage when the pressurizing treatment is carried out is preferably less than 0.3%. When the amount of residual solvent is larger, namely, 0.3% or more, the effect of the present invention cannot fully be reduced, although flatness of the cellulose ester film may be improved.

A conventional cellulose ester film which was not subjected to the above mentioned treatments showed a free volume radius larger than 0.315.

In order to decrease the optical anisotropy so that Ro and Rt, defined by the above formulas, reach the range of 0-10 nm and −3-+20 nm, respectively, it is preferable that the cellulose ester film of the present invention incorporates, as an additive, polymers synthesized employing monomers having an ethylenically unsaturated bond, or additives selected from those represented by above Formulas (1)-(14).

The following Polymers X and Y are most preferably cited as a polymer synthesized employing monomers incorporating an ethylenically unsaturated bond.

Polymer X includes polymers at a weight average molecular weight of 2,000-30,000, which are prepared by copolymerizing Ethylenically Unsaturated Monomer Xa incorporating neither an aromatic ring nor a hydrophilic group in the molecule, and Ethylenically Unsaturated Monomer Xb incorporating no aromatic ring but incorporating a hydrophilic group in the molecule. Polymer Y includes polymers at a weight average molecular weight of 500-3,000 prepared by polymerizing Ethylenically Unsaturated Monomer Y incorporating no aromatic ring. It is preferable that polymers such as Polymer X or Y, synthesized employing monomers incorporating the ethylenically unsaturated bond, are employed together with other additives and the compounds represented by Formulas (1)-(14).

It is preferable that the cellulose ester of the present invention simultaneously incorporates above Polymers X and Y. When Polymer X is employed together with Polymer Y, it is preferable that the weight average molecular weight of Polymer Y<the weight average molecular weight of Polymer X, and the weight average molecular weight of Polymer Y+500<the weight average molecular weight of Polymer X≦30,000.

<Polymer X and Polymer Y>

It is generally known that, a material having an aromatic ring in a monomer, specifically, in the primary chain exhibits positive birefringence in the same manner as a cellulose ester, accordingly, it is preferable to incorporate a material exhibiting negative birefringence into a cellulose ester film so that retardation value Rt of the cellulose ester film is not negated.

In Polymer X of the present invention, Xa is preferably an acryl or a methacryl monomer having neither an aromatic ring nor a hydrophilic group, and Xb is preferably an acryl or a methacryl monomer having no aromatic ring but having a hydrophilic group. In the present invention, polymer X is prepared via copolymerization using hydrophobic monomer Xa and hydrophilic monomer Xb. In Polymer X, these monomers are the predominant monomers, however, other monomers may be incorporated.

Polymer X of the present invention is represented by Formula (15).

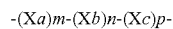   Formula (15)

Polymer X is more preferably a polymer represented by the following Formula (15-1).

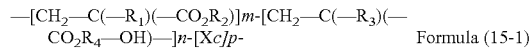   Formula (15-1)

wherein $R_1$ and $R_3$ each represents H, or $CH_3$; $R_2$ represents an alkyl group having 1-12 carbon atoms, $R_4$ represents —$CH_2$—, —$C_2H_4$— or —$C_3H_6$—, Xc represents a monomer unit polymerizable with Xa, Xb, and m, n and p each represents the molar ratio, provided that m≠0, n≠0, and m+m+p=100.

In the following, monomers as a monomer unit constituting Polymer X of the preset invention will be cited, however the present invention is not limited thereto.

Examples of Ethylenically Unsaturated Monomer Xa incorporating neither an aromatic ring nor a hydrophilic group in the molecule include: methyl acrylate, ethyl acrylate, propyl (i- or n-) acrylate, butyl (n-, i-, s-, or t-) acrylate, pentyl (n-, i-, or s-) acrylate, hexyl (n- or i-) acrylate, heptyl (n- or i-) acrylate, octyl (n- or i-) acrylate, nonyl (n- or i-) acrylate, myristyl (n- or i-) acrylate, 2-ethylhexyl acrylate, ε-caprolactone acrylate, 2-hydroxyethyl acrylate, and 2-ethoxyethyl acrylate, and those in which the above acrylate esters are converted to methacrylate esters. Of these, preferred are methyl acrylate, ethyl acrylate, methyl methacrylate, ethyl methacrylate, and propyl (i- or n-) methacrylate.

Preferred as Ethylenically Unsaturated Monomer Xb incorporating no aromatic ring but incorporating a hydrophilic group in the molecule are acrylic or methacrylic acid esters as a monomer unit incorporating a hydroxyl group. Examples include 2-hydroxyethyl acrylate, 2-hydroxypropyl acrylate, 3-hydroxypropyl acrylate, 4-hydroxybutyl acrylate, and 2-hydroxybutyl acrylate, as well as those in which the above acrylate esters are converted to methacrylate esters. Of these, preferable are 2-hydroxyethyl acrylate, 2-hydroxyethyl methacrylate, 2-hydroxypropyl acrylate and 3-hydroxypropyl acrylate.

The ratio of use of Hydrophobic Monomer Xa to Hydrophilic Monomer Xb during synthesis is preferably in the range of 99:1-65:35, but is more preferably in the range of 95:5-75:25. When the ratio of Hydrophobic Monomer Xa increases, compatibility with cellulose ester is enhanced while retardation value Rt in the film thickness direction increases. Further, when the ratio of Hydrophilic Monomer Xb is increased, the compatibility with cellulose ester is reduced, however, the effect to lower Rt is enhanced. Also, the ratio of Hydrophilic Monomer Xb in the above range is preferable, since it is thereby possible to prepare a cellulose ester film which exhibits excellent transparency. Xc is not specifically limited, provided that it is a polymerizable ethylenically unsaturated monomer other than Xa and Xb, however, it preferably does not contain an aromatic ring. The p value of Xc is 0-10. Xc may be a plurality of monomer units.

In order to synthesize such polymers, it is preferable to employ a method which does not excessively increase the molecular weight, but results as much as possible in uniform molecular weight since it is difficult to control the molecular weight employing a common polymerization method. Examples of such methods include a method in which peroxide polymerization initiators such as cumene peroxide or t-butylhydroperoxide are employed; a method in which polymerization initiators in a larger amount than the common polymerization is employed; a method in which other than polymerization initiators, chain transfer agents such as a mercapto compound or carbon tetrachloride are employed; a method in which other than polymerization initiators, polymerization terminating agents such as benzoquinone or dinitrobenzene are employed; and a method in which block polymerization is performed employing polymerization catalysts employing compounds incorporating one thiol group and a secondary hydroxyl group, or incorporating the above compound and organic metal compounds, described in JP-A Nos. 2000-128911 and 2000-344823. Of these, the methods described in the above patent documents are particularly preferred.

The hydroxyl group value of Polymer X is preferably 10-200 mg KOH/g, but is most preferably 30-150 mg KOH/g. (Measurement Method of Hydroxyl Group Value)

Hydroxyl group value, as described herein, is determined based on JIS K 0070 (1992), and is defined as mg of potassium hydroxide consumed to neutralize acetic acid bonded to a hydroxyl group when 1 g of the sample is acetylated. In practice, X g (approximately 1 g) of a sample, which has been accurately weighed, is placed in a flask, and precisely 20 ml of an acetylation reagent (prepared in such a manner that pyridine is added to 20 ml of acetic anhydride to reach a total volume of 400 ml) is added. An air cooling pipe is fitted to the opening of the flask and the flask is heated at 95-100° C. in a glycerin bath. After one hour and a half, the temperature is lowered and 1 ml of pure water is fed through the air cooling pipe, whereby acetic anhydride is decomposed to acetic acid. Subsequently, by employing a potentiometric titrator, titration is carried out via a 0.5 mol/L potassium hydroxide ethanol solution, and when the titration curve results in inflection, titration is terminated. Further, as a blank test, titration is carried out without adding the sample and the inflection point of the titration curve is recorded. The hydroxyl group value is calculated based on the following formula:

$$\text{Hydroxyl group value} = \{(B-C) \times f \times 28.05/X\} + D$$

wherein B represents the volume (ml) of the 0.5 mol/L potassium hydroxide methanol solution employed in the blank test; C represents the volume (ml) of the 0.5 mol/L potassium hydroxide methanol solution employed for titration; f represents the factor of the 0.5 mol/L potassium hydroxide methanol solution; and D represents the acid value, while 28.05 is ½ of 56.11 which is the amount of one mol of potassium hydroxide.

The weight average molecular weight of Polymer X is preferably 2,000-30,000, but is more preferably 2,000-25,000.

A large molecular weight is preferred since it results in advantages such that the dimensional change of cellulose ester films under high temperature and high humidity is significantly decreased and the resulting polarizing plate protective film exhibits reduced curling. When the weight average molecular weight exceeds 30,000, bleed-out under high temperature and high humidity, as well as haze formation immediately after casting, occurs due to poor compatibility with cellulose ester.

It is possible to control the weight average molecular weight of polymers of the present invention, employing conventional molecular weight controlling methods. Listed as one such method is incorporating chain transfer agents such as carbon tetrachloride, lauryl mercaptan, or octyl thioglycolate. The polymerization temperature is commonly room temperature to 130° C., but is preferably 50 to 100° C. It is also possible to control the weight average molecular weight by controlling the above temperature or the polymerization reaction time.

It is further possible to determine the weight average molecule weight, employing the following method.
(Method of Measurement of Molecular Weight)

The weight average molecular weight is determined employing gel permeation chromatography.

Measurement conditions are as follows:
Solvent: methylene chloride
Columns: SHODEX K806, K805, and K803G (produced by Showa Denko K.K., employed by connecting above three columns)
Column temperature: 25° C.
Sample concentration: 0.1% by weight
Detector: RI Model 504 (produced by GL Science Co.)
Pump: L6000 (produced by Hitachi, Ltd.)
Flow rate: 1.0 ml/min Calibration curve: a calibration curve based on 13 samples of standard POLYSTYRENE STK standard POLYSTYRENE (produced by TOHSOH Corp.) at an Mw of 500-1,000,000 is employed. Thirteen samples, at almost equal intervals, are employed.

Polymer Y, employed in the present invention, includes a polymer at a weight average molecular weight of 500 or more but 3,000 or less, prepared by polymerizing Ethylenically Unsaturated Monomer Ya having no aromatic ring. Preparation of a polymer having a weight average molecular weight of less than 500 is difficult because the amount of unreacted monomer increases. A polymer having a weight average molecular weight of at most 3,000 are preferably employed since retardation Rt is readily decreased. Ya is preferably an acryl or a methacryl monomer having no aromatic ring.

Polymer Y of the present invention is represented by the following Formula (16).

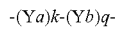  Formula (16)

Polymer Y is more preferably represented by Formula (16-1).

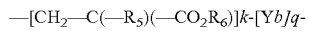  Formula (16-1)

wherein $R_5$ represents H or $CH_3$; $R_6$ represents an alkyl group having 1-12 carbon atoms or a cycloalkyl group; Yb represents a monomer unit polymerizable with Ya; k and q each represent a molar ratio, provided that k≠0 and k+q=100.

Yb is not specifically limited, provided that it is polymerizable with Ya. Yb may be a plurality of monomer unit. The value of q is preferably 0-30.

Examples of Ethylenically Unsaturated Monomer Ya constituting Polymer Y, prepared by polymerizing ethylenically unsaturated monomers having no aromatic ring, include: methyl acrylate, ethyl acrylate, propyl (i- or n-) acrylate, butyl (n-, i-, s-, or t-) acrylate, pentyl (n-, i-, or s-) acrylate, hexyl (n- or i-) acrylate, heptyl (n- or i-) acrylate, octyl (n- or i-) acrylate, nonyl (n- or i-) acrylate, myristyl (n- or i-) acrylate, cyclohexyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, or 2-hydroxybutyl acrylate, 2-methoxyethyl acrylate, 2-ethoxyethyl acrylate; methacrylate esters which are derived from the above acrylate esters by changing acrylate esters to methacrylate esters; unsaturated acids such as acrylic acid, methacrylic acid, maleic acid anhydride, crotonic acid and itaconic acid.

Yb is not specifically limited, however, preferable are vinyl esters such as vinyl acetate, vinyl propionate, vinyl butyrate, vinyl valerate, vinyl pivarate, vinyl caprate, vinyl laurate, vinyl myristate, vinyl palmate, vinyl stearate, vinyl cyclohexane carboxylate, vinyl octylate, vinyl methacrylate, vinyl crotonate, vinyl sorbate, and vinyl cinnamate. Yb may be a plurality of monomer unit.

Acryl based polymers are either homopolymers or copolymers of the above monomers. The content of methyl acrylate monomer units is preferably at least 30% by weight, and the content of methyl acrylate monomer units is preferably at least 40% by weight. Homopolymers of methyl acrylate or methyl methacrylate are particularly preferred.

Any of the polymers and acryl based polymers prepared by polymerizing the above ethylenically unsaturated monomers exhibit desired compatibility with cellulose ester, excellent productivity due to neither evaporation nor sublimation, desired retention as a polarizing plate protective film, minimal moisture vapor transmittance, and excellent dimensional stability.

It is preferable that the content of Polymer X and Polymer Y in cellulose ester films is preferably in the range satisfying following Formulas (i) and (ii):

$$5 \leq Xg+Yg \leq 35 \text{ (\% by weight)} \qquad \text{Formula (i)}$$

$$0.05 \leq Yg/(Xg+Yg) \leq 0.4 \qquad \text{Formula (ii)}$$

wherein Xg (% by weight) represents the content of Polymer X, while Yg (% by weight) represents the content of Polymer Y.

The preferred range of formula (1) is 10-25% by weight.

The total content of Polymer X and Polymer Y is preferably at least 5% by weight since it is possible to significantly decrease retardation value Rt. Further, when the total content exceeds 35% by weight, adhesion to polarizer PVA is degraded.

An increase of Polymer X markedly minimizes degradation of polarizers. However, since retardation value Rt tends to increase, the range to satisfy above Formula (ii) is preferred to achieve the desired effects of this invention.

Both Polymers X and Y are employed as a dope constituting component. They may be directly added and dissolved, or may be previously dissolved in organic solvents and then added to a dope.

Next, the compounds represented by Formula (1) will be described.

In Formula (1), the summation of the number of carbon atoms in $R^1$ and $R^2$ is preferably ten or more.

Examples of a preferable substituent represented by $R^1$ or $R^2$ include: a fluorine atom, an alkyl group, an aryl group, an alkoxy group, a sulfone group, and a sulfonamide group. Of these, specifically preferable are an alkyl group, an aryl group, an alkoxy group, a sulfone group and a sulfonamide group.

The alkyl group may be a normal chain alkyl group, a branched chain alkyl group or a cyclic alkyl group. Preferable are alkyl groups having 1-25 carbon atoms, more preferably having 6-25 carbon atoms and specifically preferably having 6 to 20 carbon atoms, examples of which include: a methyl group, an ethyl group, a propyl group, an isopropyl group, a butyl group, an isobutyl group, a t-butyl group, an amyl group, an isoamyl group, a t-amyl group, a hexyl group, a cyclohexyl group, a heptyl group, an octyl group, a bicyclooctyl group, a nonyl group, an adamantyl group, a decyl group, a t-octyl group, an undecyl group, a dodecyl group, a tridecyl group, a tetradecyl group, a pentadecyl group, a hexadecyl group, a heptadecyl group, an octadecyl group, a nonadecyl group and a didecyl group.

As the aryl group, preferable are those having 6-30 carbon atoms and specifically preferable are those having 6-24 carbon atoms, examples of which include: a phenyl group, a biphenyl group, a terphenyl group, a naphthyl group, a binaphthyl group, a triphenyl group.

Preferable examples of a compound represented by Formula (1) will be shown below, however, the present invention is not limited thereto.

A-1

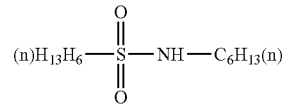

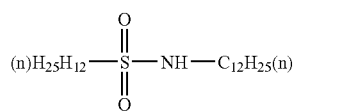
A-2
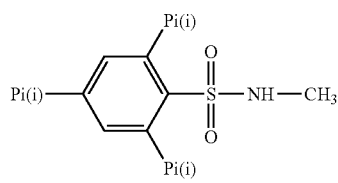
A-3
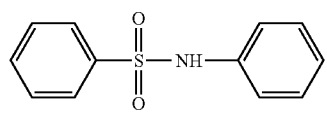
A-4
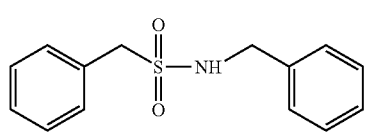
A-5
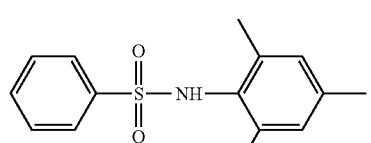
A-6
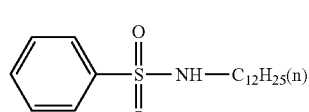
A-7
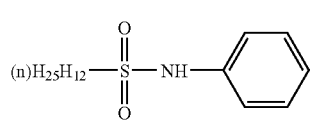
A-8
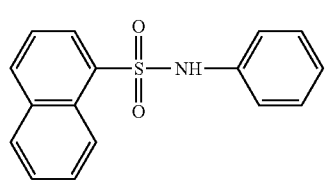
A-9
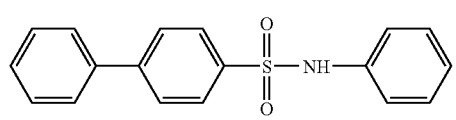
A-10
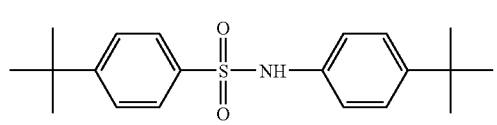
A-11
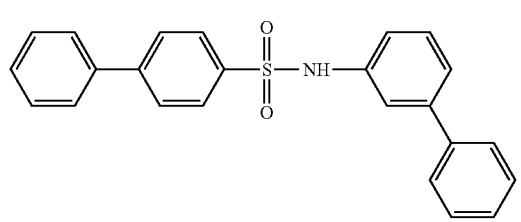
A-12
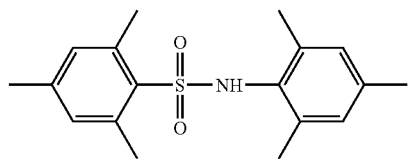
A-13
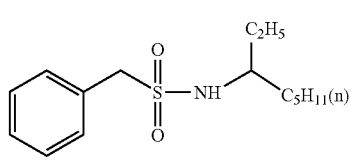
A-14
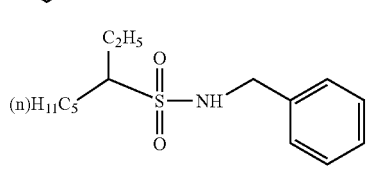
A-15
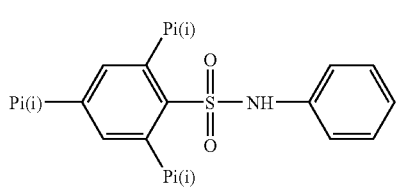
A-16
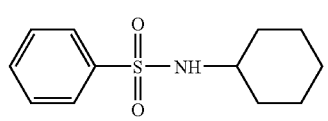
A-17
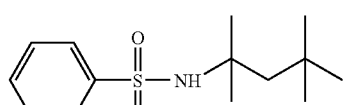
A-18
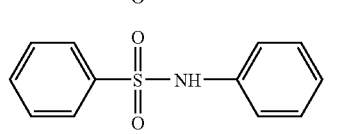
A-19
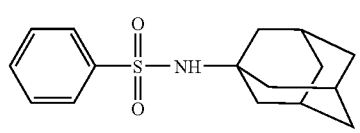
A-20
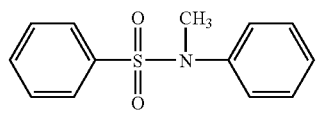
A-21
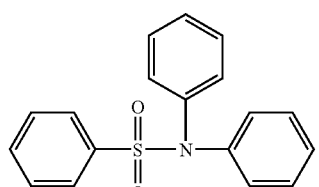
A-22
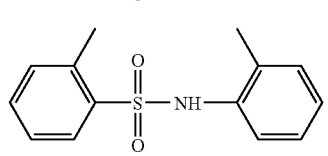
A-23

-continued

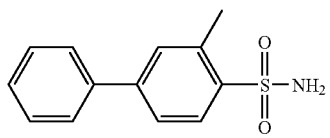
A-24

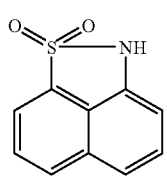
A-25

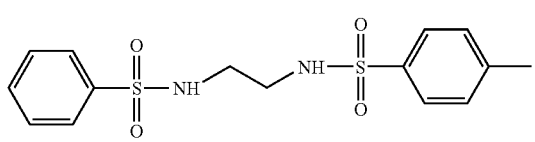
A-26

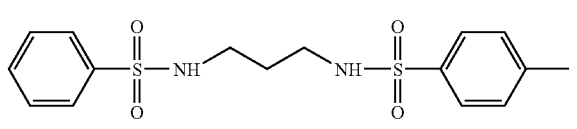
A-27

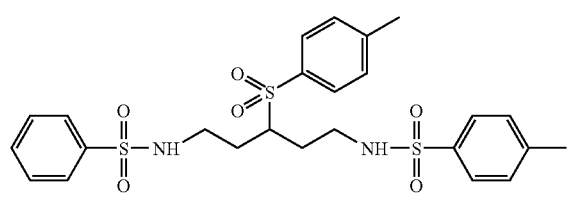
A-28

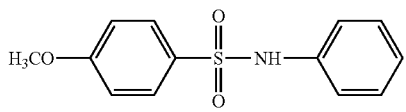
A-29

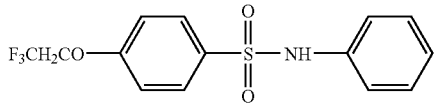
A-30

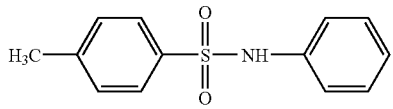
A-31

Next, the compounds represented by Formula (2) will be described. in detail.

X represents B, C—R(R representing a hydrogen atom or a substituent), N, P, or P=O. Preferably, X represents B, C—R (wherein as examples of R, preferable are an aryl group, a substituted or unsubstituted amino group, an alkoxy group, an aryloxy group, an acyl group, an alkoxy carbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom (for example, a fluorine atom, a chlorine atom, a bromine atom and an iodine atom) and a carboxyl group; more preferable are an aryl group, an alkoxy group, an aryloxy group, a hydroxy group and a halogen atom; further more preferable are an alkoxy group and a hydroxy group; and specifically preferable is a hydroxyl group), N and P=O, and more preferably X represents C—R or N, and specifically preferably X represents C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently represent a hydrogen atom or a substituent. As a substituent, the substituent T which will be described later is applicable. Preferable examples of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ include: an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxy group, a mercapto group, and a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocycle group and a silyl group, more preferably include: an alkyl group, an aryl group, a substituted or unsubstituted amino group, an alkoxy group, and an aryloxy group, and further more preferably include an alkyl group, an aryl group, and an alkoxy group, wherein the heterocycle group preferably has 1 to 30 carbon atoms and more preferably 1 to 12 carbon atoms, examples of the hetero atom include: a nitrogen atom, an oxygen atom, a sulfur atom, and a concrete examples of the hetero group include: an imidazolyl group, a pyridyl group, a quinolyl group, a furyl group, a piperidyl group, a morpholino group, a benzoxazolyl group, a benzimidazolyl group, a benzthiazolyl group.

These substituents may further be substituted. When two or more substituents are contained, those substituents may be the same or different. Moreover, the substituents may be combined to form a ring.

The above mentioned substituent R will now be explained. Examples of the substituent R include: an alkyl group (preferably having 1 to 20 carbon atoms, more preferably having 1 to 12 carbon atoms and still more preferably having 1 to 8 carbon atoms, and examples of an alkyl group include: a methyl group, an ethyl group, an iso-propyl group, a tert-butyl group, an n-octyl group, an n-decyl group, an n-hexadecyl group, a cyclopropyl group, a cyclopentyl group and a cyclohexyl group); an alkenyl group (preferably having 2 to 20 carbon atoms, more preferably having 2 to 12 carbon atoms and specifically preferably having 2 to 8 carbon atoms, and examples of the alkenyl group include: a vinyl group, an allyl group, a 2-butenyl group and 3-pentenyl group); an alkynyl group (preferably having 2 to 20 carbon atoms, more preferably having 2 to 12 carbon atoms and specifically preferably having 2 to 8 carbon atoms, and examples of the alkynyl group include: a propargyl group and a 3-pentynyl group); an aryl group (preferably having 6 to 30 carbon atoms, more preferably having 6 to 20 carbon atoms and specifically preferably having 6 to 12 carbon atoms, and examples of the aryl group include: a phenyl group, a p-methylphenyl group and a naphthyl group); a substituted or unsubstituted amino group (preferably having 0 to 20 carbon atoms, more preferably having 0 to 10 carbon atoms and specifically preferably having 0 to 6 carbon atoms, and examples of the amino group include: an amino group, a methylamino group, a dimethylamino group, a diethylamino group and a dibenzylamino group); an alkoxy group (preferably having 1 to 20 carbon atoms, more preferably having 1 to 12 carbon atoms and specifically preferably having 1 to 8 carbon atoms, and examples of the alkoxy group include: a methoxy group, an ethoxy group and a butoxy group); an aryloxy group (preferably having 1 to 20 carbon atoms, more preferably having 1 to 12 carbon atoms and specifically preferably having 1 to 8 carbon atoms, and examples of the aryloxy group include: a phenyloxy group and a 2-naphthyloxy group); an acyl group (preferably having 1 to 20 carbon atoms, more preferably having 1 to 16 carbon atoms and specifically preferably having 1 to 12 carbon atoms, and examples of the, acyl group include: an acetyl group, a benzoyl group, a formyl group and a pivaloyl group); an alkoxycarbonyl group (preferably having 2 to 20 carbon atoms, more preferably having 2 to 16 carbon atoms and specifically preferably having 2 to 12 carbon atoms, and examples of the alkoxycarbonyl group include: a methoxycarbonyl group and an ethoxycarbonyl group); an aryloxycarbonyl group (preferably having 7 to 20 carbon atoms, more preferably having 7 to 16 carbon atoms and specifically preferably having 7 to 10 carbon atoms, and a phenyloxycarbonyl group is cited as an example of the alkoxycarbonyl group); an acyloxy group (preferably having 2 to 20 carbon atoms, more preferably having 2 to 16 carbon atoms and specifically preferably having 2 to 10 carbon atoms, and examples of the acyloxy group include: an acetoxy group and a benzoyloxy group); an acylamino group (preferably having 2 to 20 carbon atoms, more preferably having 2 to 16 carbon atoms and specifically preferably having 2 to 10 carbon atoms, and examples of the acylamino group include: an acetylamino group and a benzoylamino group); an alkoxycarbonylamino group (preferably having 2 to 20 carbon atoms, more preferably having 2 to 16 carbon atoms and specifically preferably having 2 to 12 carbon atoms, and examples of the alkoxycarbonylamino group include: a methoxycarbonylamino group); an aryloxycarbonylamino group (preferably having 7 to 20 carbon atoms, more preferably having 7 to 16 carbon atoms and specifically preferably having 1 to 12 carbon atoms, and examples of the aryloxycarbonylamino group include: a phenyloxycarbonylamino group); a sulfonylamino group (preferably having 1 to 20 carbon atoms, more preferably having 1 to 16 carbon atoms and specifically preferably having 1 to 2 carbon atoms, and examples of the sulfonylamino group include: a methanesulfonylamino group and a benzenesulfonylamino group); a sulfamoyl group (preferably having 0 to 20 carbon atoms, more preferably having 0 to 16 carbon atoms and specifically preferably having 0 to 12 carbon atoms, and examples of the sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms and specifically preferably having 1 to 12 carbon atoms, and examples of the carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms and specifically preferably having 1 to 12 carbon atoms, and examples of the alkoxy group include: a methylthio group and an ethylthio group); an arylthio group (preferably having 6 to 20 carbon atoms, more preferably having 6 to 16 carbon atoms and specifically preferably having 6 to 12 carbon atoms, and examples of the arylthio group include: a phenylthio group); a sulfonyl group (preferably having 1 to 20 carbon atoms, more preferably having 1 to 16 carbon atoms and specifically preferably having 1 to 12 carbon atoms, and examples of the sulfonyl group include: a mesyl group and a tosyl group); a sulfinyl group (preferably having 1 to 20 carbon atoms, more preferably having 1 to 16 carbon atoms and specifically preferably having 1 to 12 carbon atoms, and examples of the sulfinyl group include: a methanesulfinyl group and a benzenesulfinyl group); an ureido group (preferably having 1 to 20 carbon atoms, more preferably having 1 to 16 carbon atoms and specifically preferably having 1 to 12 carbon atoms, and examples of the ureido group include: an ureido group, a methylureido group and a phenylureido group); a phosphoric acid amide group (preferably having 1 to 20 carbon atoms, more preferably having 1 to 16 carbon atoms and specifically preferably having 1 to 12 carbon atoms, and examples of the phosphoric acid amide group include: a diethyl phosphoric acid amide group and a phenyl phosphoric acid amide group);

a hydroxy group; a sulfhydryl group; a halogen atom (for example, a fluorine atom and a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms and more preferably having 1 to 12 carbon atoms, and examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzoxazolyl group, a benzimidazolyl group and a benzthiazolyl group); and a silyl group (preferably having 3 to 40 carbon atoms, more preferably having 3 to 30 carbon atoms and specifically preferably having 3 to 24 carbon atoms, and examples of the silyl group include: a trimethylsilyl group and a triphenylsilyl group). These substituents may further be substituted, and, when two or more substituents are included, they may be the same or different. Further, the substituents may be combined to form a ring.

The present invention will now explained in detail, below, using specific examples of a compound represented by Formula (2), however, the present invention is not limited thereto.

C-1

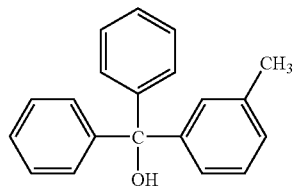

C-2

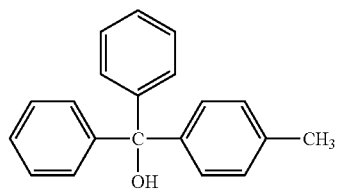

C-3

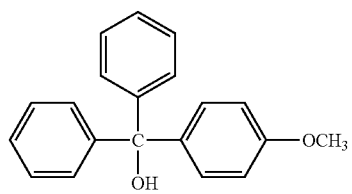

-continued
C-4
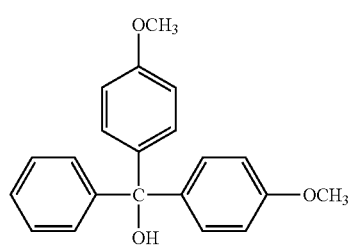
C-5
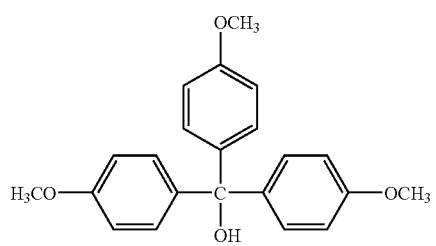
C-6
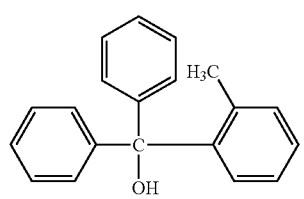
C-7
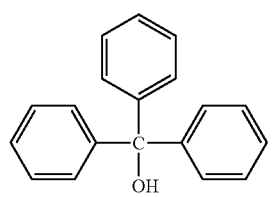
C-8
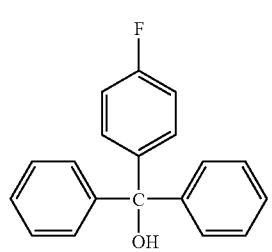
C-9
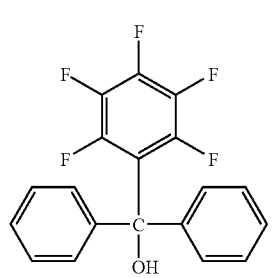
C-10
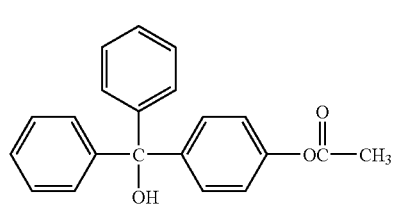
-continued
C-11
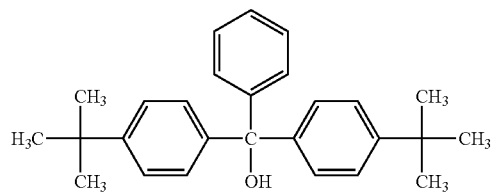
C-12
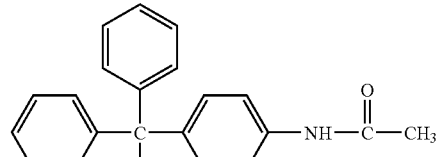
C-13
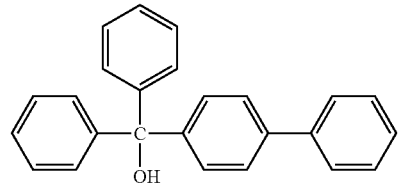
C-14
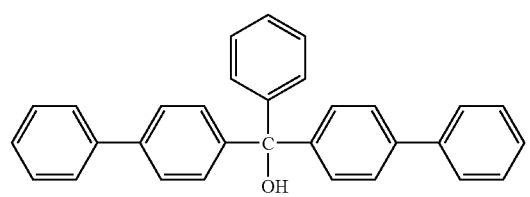
C-15
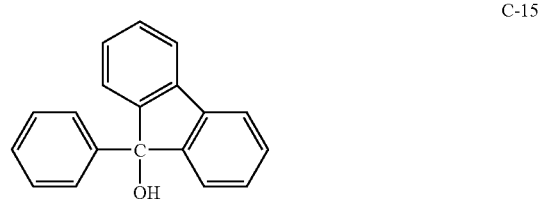
C-16
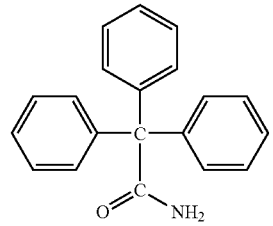
C-17
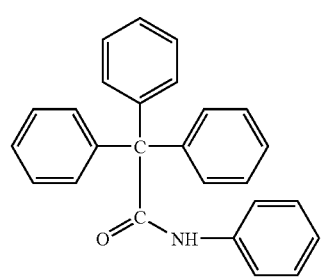

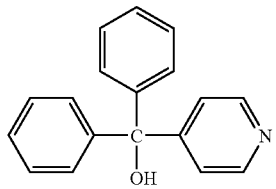
C-18

A polyalcohol ester is prepared by esterification of an aliphatic polyalcohol of dihydric or more and a monocarboxylic acid. Preferable is an aliphatic monocarboxylic acid ester.

The polyalcohol employed in the present invention is represented by the above mentioned Formula (3).

Examples of a preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, but the invention is not limited thereto. Specifically, triethylene glycol, tetraethylene glycol, dipropylene glycol, tripropylene glycol, sorbitol, trimethylol propane, xylitol, pentaerythritol and dipentaerythritol.

The monocarboxylic acid to be used in the polyalcohol ester is not specifically limited and a known aliphatic monocarboxylic acid, alicyclic monocarboxylic acid and aromatic monocarboxylic acid may be employed. Specifically, aliphatic monocarboxylic acid and aromatic monocarboxylic acid are preferable, because the moisture permeability and the retainability are improved. Examples of the preferable monocarboxylic acid are listed below but the present invention is not limited thereto.

A straight or branched chain carboxylic acid having 1 to 32 carbon atoms is preferably employed as an aliphatic monocarboxylic acid. The number of carbon atoms is more preferably from 1-20, and specifically preferably from 1-10. The use of acetic acid is preferable for raising the compatibility with a cellulose ester, and the mixing of acetic acid with another carboxylic acid is also preferable.

As the preferable aliphatic monocarboxylic acid, saturated fatty acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanoic acid, arachic acid, behenic acid, lignocelic acid, cerotic acid, heptacosanoic acid, montanic acid, melisic acid and lacceric acid; and unsaturated fatty acids such as undecylenic acid, oleic acid, sorbic acid, linolic acid, linolenic acid and arachidonic acid can be exemplified. Examples of preferable alicyclic monocarboxylic acid include cyclopentene carboxylic acid, cyclohexane carboxylic acid, cyclooctane carboxylic acid and derivatives thereof. Examples of preferable aromatic monocarboxylic acid include: ones formed by introducing an alkyl group into the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives of them, and benzoic acid is specifically preferable.

The molecular weight of the polyalcohol is preferably from 300 to 1,500, and more preferably from 350 to 1000. Larger molecular weight is preferable because it is less volatile, while smaller molecular weight is preferable with respect to the moisture permeability and compatibility with cellulose ester. The carboxylic acid to be employed in the polyalcohol ester may be one kind or a mixture of two or more kinds of them. All the OH groups of the polyalcohol may be esterified or a part of the OH groups may be left unesterified. Specific examples of a polyalcohol will be shown below:

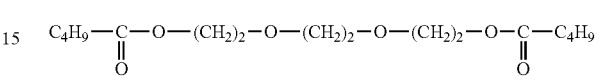
B-1

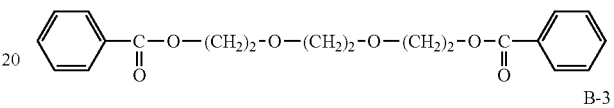
B-2

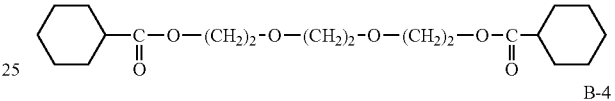
B-3

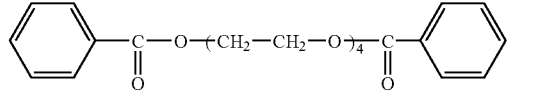
B-4

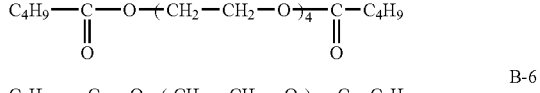
B-5

B-6

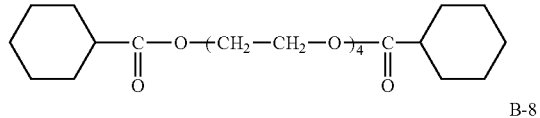
B-7

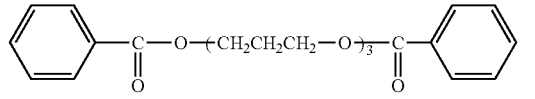
B-8

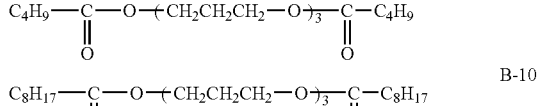
B-9

B-10

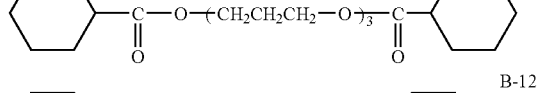
B-11

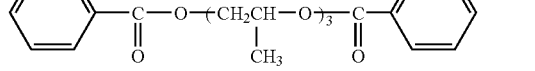
B-12

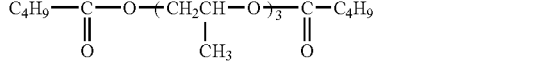
B-13

B-14
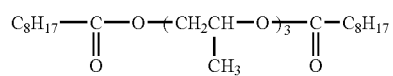
B-15
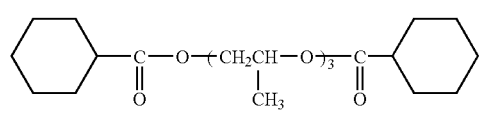
B-16
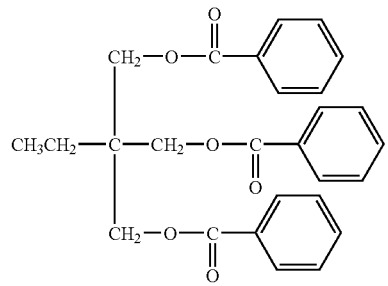
B-17
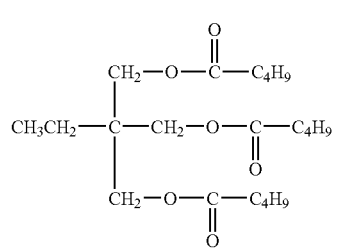
B-18
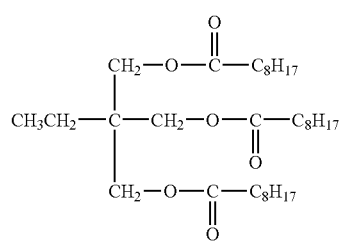
B-19
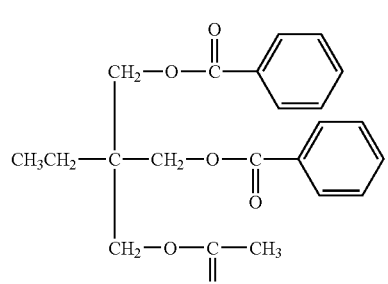
B-20
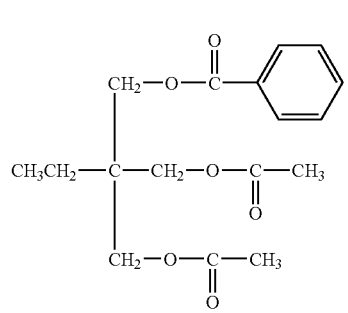
B-21
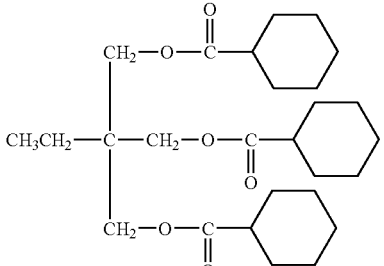
B-22
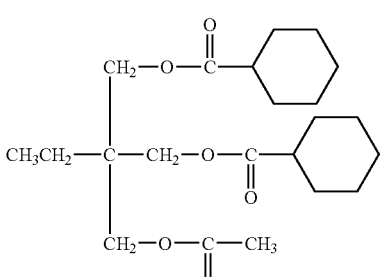
B-23
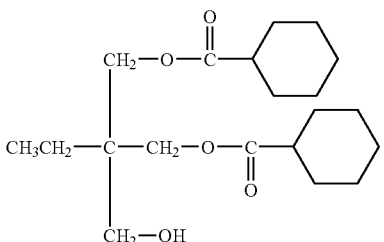
B-24
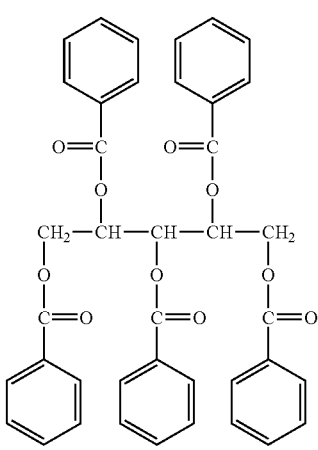

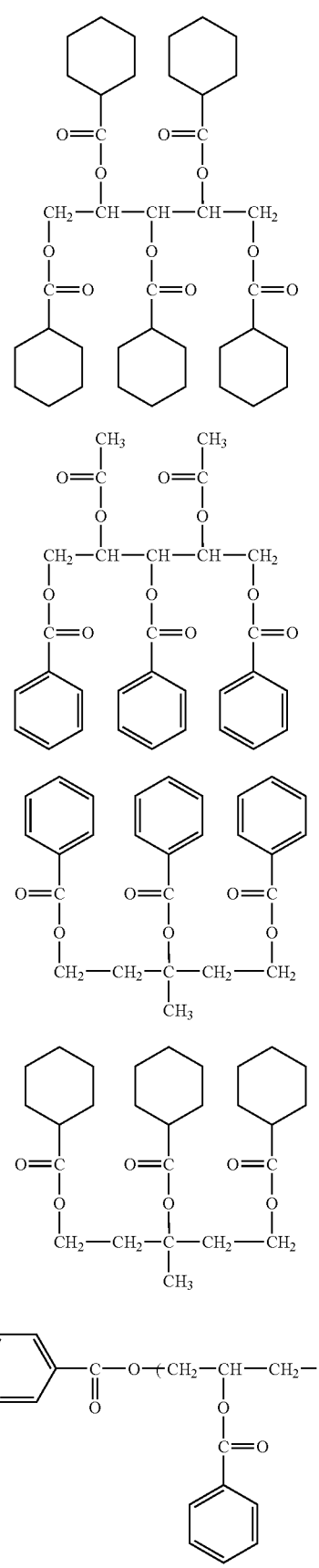
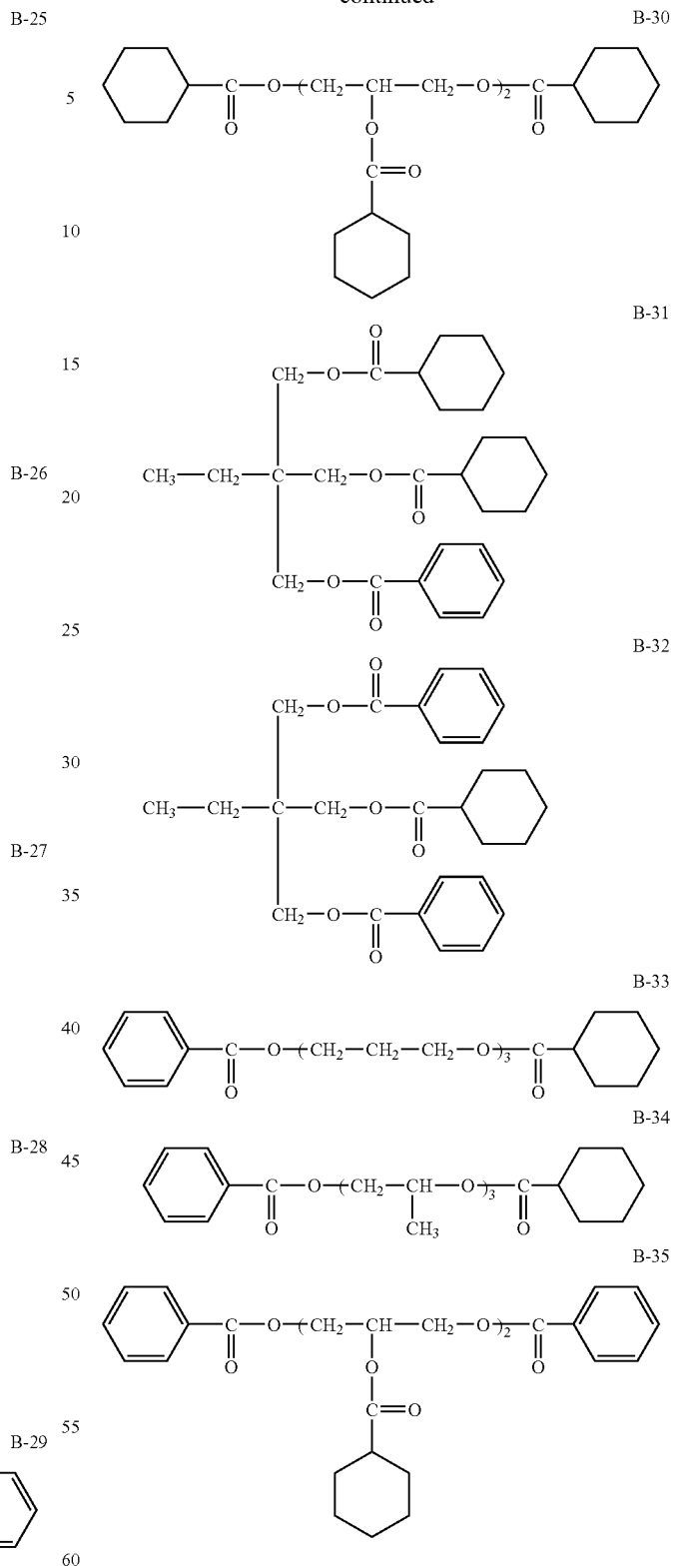
In addition, a trimethylolpropanetriacetate and a pentaerythritoltetraacetate are used preferably. The compound represented by one of Formulas (1)-(3) is preferably used in an amount of 0.01-30 weight parts or more preferably 0.5-25 weight parts in 100 weight parts of cellulose ester. The compound may be added in a dope after dissolved in an organic solvent such as an alcohol, methylene chloride or dioxolane, may be directly added in a dope.

The compounds represented by Formulas (4)-(12) will now be explained.

In Formulas (4)-(12), $Y^{31}$-$Y^{70}$ each independently represent an acyloxy group having 1-20 carbon atoms, an alkoxycarbonyl group having 2-20 carbon atoms, an amide group having 1-20 carbon atoms, a carbamoyl group having 1-20 carbon atoms or a hydroxy group. $V^{31}$-$V^{43}$, each independently represent a hydrogen atom or an aliphatic group having 1-20 carbon atoms. $L^{31}$-$L^{80}$ each independently represent a single bond or a saturated linking group having total atom number of 0-40 and having 0-20 carbon atoms. $V^{31}$-$V^{43}$, and $L^{31}$-$L^{80}$ may further have a substituent.

An acyloxy group preferably has 1-16 carbon atoms and more preferably 2-12 carbon atoms. Examples of an acyloxy group include: acetoxy, propionyloxy, butyryloxy, vleryloxy, isovaleryloxy, 2,2-dimethylpropionyloxy, 2-methylbutyryloxy, hexanoiloxy, 2,2-dimethylbutyryloxy, heptanoiloxy, cyclohexyl carbonyloxy, 2-ethylhexanoiloxy, octanoyloxy, decanoyloxy, dodecanoiloxy, phenylacetoxy and 1-naphthoyloxy, 2-naphthoyloxy and 1-adamantanecarbonyloxy.

An alkoxycarbonyl group preferably has 2-16 carbon atoms and more preferably has 2-12 carbon atoms. Examples of an alkoxycarbonyl group include: methoxycarbonyl, ethoxycarbonyl, propyloxycarbonyl, isopropyloxycarbonyl, butoxycarbonyl, t-butoxycarbonyl, isobutyloxycarbonyl, sec-butyloxycarbonyl, pentyloxycarbonyl, t-amyl oxycarbonyl, hexyloxycarbonyl, cyclohexyloxycarbonyl, 2-ethylhexyloxycarbonyl, 1-ethylpropyloxycarbonyl, octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl and hexadecyloxycarbonyl.

An amide group preferably has 1-16 carbon atoms and more preferably has 1-12 carbon atoms. Examples of an amide group include: acetoamido, propioneamido, butylamido, isobutylamido, pentanamido, 2,2-dimethylpropioneamido, 3-methylbutylamido, 3-methylbutylamido, capronamido, 2,2-dimethylbutylamido, heptaneamido, cyclohexylcarboxamido, 2-ethylcapronamido, 2-ethylbutaneamido, caprylamido, nonaneamido, 1-adamantanecarboxamido, 2-adamantanecarboxamido, decaneamido, tridecaneamido, hexadecaneamido, and heptadecaneamido.

A carbamoyl group preferably has 2-16 carbon atoms and more preferably has 2-12 carbon atoms. Examples of a carbamoyl group include methylcarbamoyl, dimethylcarbamoyl, ethylcarbamoyl, diethylcarbamoyl, propylcarbamoyl, isopropylcarbamoyl, butylcarbamoyl, t-butylcarbamoyl, isobutylcarbamoyl, sec-butylcarbamoyl, pentylcarbamoyl, t-amylcarbamoyl, hexylcarbamoyl, cyclohexylcarbamoyl, 2-ethylhexylcarbamoyl, 2-ethylbutylcarbamoyl, t-octylcarbamoyl, heptylcarbamoyl, octylcarbamoyl, 1-adamantylcarbamoyl, 2-adamantylcarbamoyl, decylcarbamoyl, dodecylcarbamoyl, tetradecylcarbamoyl and hexadecylcarbamoyl.

Examples of the substituent of $Y^{31}$-$Y^{70}$ include: a halogen atom (a fluorine atom, a chlorine atom, a bromine atom and an iodine atom), a normal chain, branched chain or cyclo alkyl group (including a bicyclo alkyl group or an activated methine group), an alkenyl group, an alkynyl group, an aryl group, a heterocycle group, an acyl group, an alkoxycarbonyl group, an aryloxycarbonyl group, a heterocycle-oxycarbonyl group, a carbamoyl group, an N-acylcarbamoyl group, an N-sulfonylcarbamoyl group, an N-carbamoylcarbamoyl group, an N-sulfamoylcarbamoyl group, a carbazoyl group, a carboxy group or its salt, an oxalyl group, an oxamoil group, a cyano groups a carbonimideyl group (a carbonimidoyl group), a formyl group, a hydroxyl group, an alkoxy group (including a group in which an ethyleneoxy group or a propyleneoxy group unit is repeated), an aryloxy group, a heterocycleoxy group, an acyloxy group, an alkoxycarbonyloxy group, an aryloxycarbonyloxy group, a carbamoyloxy group, a sulfonyloxy group, an amino group, an alkylamino group, an arylamino group, a heterocycle-amino group, an amido group, a sulfonamido group, an ureido group, a thioureido group, an imide group, an alkoxycarbonylamino group, an aryloxycarbonylamino group, a sulfamoylamino group, a semicarbazide group, an ammonio group, the oxamoylamino group, an N-alkylsulfonylureido group, an N-arylsulfonylureido group, an N-acylureido group, an N-acylsulfamoylamino group, a heterocycle group containing a quarternarized nitrogen atom (for example, a pyrizinio group, imidazolio group, quinolinio group and iso-quinolinio group), an isocyano group, an imino group, an alkylsulfonyl group, an arylsulfonyl group, an alkylsulfinyl group, an arylsulfinyl group, a sulfo group and its salt, a sulfamoyl group, an N-acylsulfamoyl group, an N-sulfonylsulfamoyl group and its salt, a phosphino group, a phosphinyl group, a phosphinyloxy group, a phosphinylamino group, a silyl group and a phosphate group.

$Y^{31}$-$Y^{70}$ may form a substituent formed by combining the above-mentioned substituent. Examples of a combined substituent include: an ethoxyethoxyethyl group, a hydroxyethoxyethyl group and an ethoxycarbonylethyl group.

The aliphatic group represented by $V^{31}$-$V^{43}$ preferably has 1-16 carbon atoms and more preferably has 1-12 carbon atoms. Still more preferable is a linear, branched or cycloalkyl group, alkenyl group or alkynyl group.

Example of an alkyl group include: methyl, ethyl, propyl, isopropyl, butyl, isobutyl, sec-butyl t-butyl, pentyl, t-amyl, hexyl, octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamantyl, 2-adamantyl, and bicyclo[2.2.2]octane-3-yl.

Examples of an alkenyl group include: vinyl, allyl, prenyl, geranyl, oleyl, 2-cyclopentene-1-yl and 2-cyclohexene-1-yl.

Examples of an alkynyl group include: ethynyl and propargyl.

The examples of the substituent represented by of $V^{31}$-$V^{43}$ are common to the examples of the substituent represented by $Y^{31}$-$Y^{70}$.

Examples of the linking group represented by $L^{31}$-$L^{80}$ include: an alkylene group (for example, methylene, ethylene, propylene, trimethylene, tetramethylene, pentamethylene, hexamethylene, methylethylene and ethylethylene), a divalent cyclic group (for example, cis-1,4-cyclohexylene, trans-1,4-cyclohexylene and 1,3-cyclopentylidene), an ether group, a thioether group, an ester group, an amide group, a sulfone group, a sulfoxide group, a sulfide group, a sulfonamide group, an ureylene group and a thioureylene group.

Two or more linking groups may be combined to form a divalent complex linking group may be formed. Examples of such a complex linking group include: —(CH$_2$)$_2$—O—(CH$_2$)$_2$—, —(CH$_2$)$_2$—O—(CH$_2$)$_2$—O—(CH$_2$)—, —(CH$_2$)$_2$—S—(CH$_2$)$_2$— and —(CH$_2$)$_2$—O—CO—(CH$_2$)$_2$—.

$L^{31}$ to $L^{80}$ may further have a substituent, and examples of such a substituent include those cited as the substituents which may substitute $R^{11}$-$R^{13}$.

Examples of a compound represented by Formula (4)-(12) include: a citrate ester (for example, O-acetyl triethyl citrate, and O-acetyl tributyl citrate, acetyl triethyl citrate, acetyl tributyl citrate, O-acetyl tri(ethyloxycarbonylmethylene) citrate); an oleate ester (for example, ethyl oleate, butyl oleate, 2-ethylhexyl oleate, phenyl oleate, cyclohexyl oleate, octyl oleate); a ricinoleate ester (for example, methylacetyl ricinoleate); a sebacate ester (for example, dibutyl sebacate); a carboxylate ester of glycerin (for example, triacetin and tributyrin); a glycolate (for example, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate and octylphthalyloctyl glycolate); a pentaerythritol carboxylate ester (for example, pentaerythritol tetraacetate and pentaerythritol tetrabutyrate); a dipentaerythritol carboxylate ester (for example, dipentaerythritol hexaacetate, dipentaerythritol hexabutyrate and dipentaerythritol tetraacetate); a carboxylate ester of trimethylolpropane (for example, trimethylolpropane triacetate, trimethylolpropane diacetate monopropionate, trimethylolpropane tripropionate, trimethylolpropane tributyrate, trimethylolpropane tripyvaloate, a trimethylolpropane tri(t-butyl acetate), trimethylolpropane di-2-ethylhexanate, trimethylolpropane tetra-2-ethylhexanate, trimethylolpropane diacetate monooctanate and trimethylolpropane tri(cyclohexanecarboxylate)); a pyprolidone carboxylate ester (for example, 2-pyrrolidone-5-carboxylic acid methyl ester, 2-pyrrolidone-5-carboxylic acid ethyl ester, 2-pyrrolidone-5-carboxylic acid butyl ester and 2-pyrrolidone-5-carboxylic acid 2-ethylhexyl ester); a cyclohexane dicarboxylic acid ester (an example, cis-1,2-cyclohexane dicarboxylic acid dibutyl ester, trans-1,2-cyclohexane dicarboxylic acid dibutyl ester, cis-1,4-cyclohexane dicarboxylic acid dibutyl ester and trans-1,4-cyclohexane dicarboxylic acid dibutyl ester); and a xylitol carboxylate ester (for example, xylitol pentaacetate, xylitol tetraacetate and xylitol pentapropionate) are included.

Glycerol ester has been disclosed in JP-A No. 11-246704 official gazette. Diglycerol ester has been disclosed in JP-A No. 2000-63560. Citrate has been disclosed in JP-A No. 11-92574.

In Formula (13), $Q^1$, $Q^2$, and $Q^3$ each independently represent a group having a 5-membered ring or a 6-membered ring. The ring include a hydrocarbon ring or a hetero ring, and may form a condensed ring together with another ring.

The hydrocarbon ring includes, preferably, a substituted or unsubstituted cyclohexane ring, a substituted or unsubstituted cyclopentane ring and an aromatic hydrocarbon ring, but more preferably an aromatic hydrocarbon ring.

A single ring or dicyclic aromatic hydrocarbon having 6-30 carbon atoms is preferable (for example, benzene ring or naphthalene ring). The number of carbon atoms is more preferably 6-20. Of these, benzene ring is the most preferable.

The heterocycle preferably contains an oxygen atom, a nitrogen atom, or a sulfur atom as a hetero atom. The heterocycle preferably has aromaticity.

Examples of a heterocycle include: furan, pyrrole, thiophene, imidazole, pyrazole, pyridine, pyrazine, pyridazine, triazole, triazine, indole, indazole, purine, thiazoline, thiazole, a thiadiazole, oxazoline, oxazole, oxydiazole, quinoline, isoquinoline, phthalazine, naphthylisine, quinoxaline, quinazoline, cinnoline, pteridine, acridine, phenanthroline, phenazine, tetrazole, benzimidazole benzoxazole, benzthiazole, benzotriazole, and tetrazaindene.

Of these, preferable are pyridine, triazine, and quinoline.

$Q^1$, $Q^2$ and $Q^3$ may have a substituent.

Example of a substituent include: an alkyl group, an alkenyl group, an alkynyl group, an aryl group, an amino group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamido group, a sulfamoyl group, a substituted sulfamoyl group, a carbamoyl group, a substitution carbamoyl group, an alkylthio group, an arylthio group, a sulfonyl group, a sulfinyl group, an ureido group, a phosphoric acid amido group, a hydroxyl group, a mercapto group, a halogen atom (a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocycle group and a silyl group. These substituents may further have a substituent and a plurality of substituents may be the same or different. Further, the substituents may be combined to form a ring.

As for the number of carbon atoms of an alkyl group, preferable is 1-20, more preferably 1-12 and still more preferably 1-8. Examples of an alkyl group include: methyl, ethyl, isopropyl, tert-butyl octyl, decyl, hexadecyl, cyclopropyl, cyclopentyl and cyclohexyl.

The alkenyl group preferably has 2-20 carbon atoms, more preferably 2-12 carbon atoms and most preferably 2-8 carbon atoms. Examples of an alkenyl group include: vinyl, allyl, 2-butenyl and 3-pentenyl.

The alkynyl group preferably has 2-20 carbon atoms, more preferably 2-12 carbon atoms and most preferably 2-8 carbon atoms. Examples of an alkynyl group include: propargyl and 3-pentynyl.

The aryl group preferably has 6-30 carbon atoms, more preferably 6-20 carbon atoms and most preferably 6-12 carbon atoms. Examples of an aryl group include: phenyl, p-methylphenyl and naphthyl.

The amino group preferably has 1-20 carbon atoms, more preferably 1-10 carbon atoms and most preferably 1-6 carbon atoms. Examples of an amino group include: methylamino, dimethylamino, diethylamino and dibenzylamino.

The alkoxy group preferably has 1-20 carbon atoms, more preferably 1-12 carbon atoms and most preferably 1-8 carbon atoms. Examples of an alkoxy group include: methoxy, ethoxy and butoxy.

The aryloxy group preferably has 6-20 carbon atoms, more preferably 6-16 carbon atoms and most preferably 6-12 carbon atoms. Examples of an aryloxy group include: phenyloxy and 2-naphthyloxy.

The acyl group preferably has 1-20 carbon atoms, more preferably 1-16 carbon atoms and most preferably 1-12 carbon atoms. Examples of an acyl group include: acetyl, benzoyl, formyl and pivaloyl.

The alkoxycarbonyl group preferably has 2-20 carbon atoms, more preferably 2-16 carbon atoms and most preferably 2-12 carbon atoms. Examples of an alkoxycarbonyl group include: methoxycarbonyl and ethoxycarbonyl.

The aryloxycarbonyl group preferably has 7-20 carbon atoms, more preferably 7-16 carbon atoms and most preferably 7-10 carbon atoms. Examples of an aryloxycarbonyl group include: phenyloxycarbonyl.

The acyloxy group preferably has 2-20 carbon atoms, more preferably 2-16 carbon atoms and most preferably 2-10 carbon atoms. Examples of an acyloxy group include: acetoxy and benzoyloxy.

The amido group preferably has 2-20 carbon atoms, more preferably 2-16 carbon atoms and most preferably 2-10 carbon atoms. Examples of an amido group include: acetoamido and benzamido.

The alkoxycarbonylamino group preferably has 2-20 carbon atoms, more preferably 2-16 carbon atoms and most preferably 2-12 carbon atoms. Examples of an alkoxycarbonylamino group include: methoxycarbonylamino.

The aryloxycarbonylamino group preferably has 7-20 carbon atoms, more preferably 7-16 carbon atoms and most preferably 7-12 carbon atoms. Examples of an aryloxycarbonylamino group include: phenyloxycarbonylamino.

The sulfonamido group preferably has 1-20 carbon atoms, more preferably 1-16 carbon atoms and most preferably 1-12 carbon atoms. Examples of a sulfonamido group include: methanesulfonamide and benzenesulfonamide. The substituted sulfamoyl group preferably has 1-20 carbon atoms, more preferably 1-16 carbon atoms and most preferably 1-12 carbon atoms. Examples of a substituted sulfamoyl group include: methylsulfamoyl, dimethylsulfamoyl and phenylsulfamoyl.

The substituted carbamoyl group preferably has 2-20 carbon atoms, more preferably 2-16 carbon atoms and most preferably 2-12 carbon atoms. Examples of a substituted carbamoyl group include: carbamoyl, methylcarbamoyl, diethylcarbamoyl and phenylcarbamoyl.

The alkylthio group preferably has 1-20 carbon atoms, more preferably 1-16 carbon atoms and most preferably 1-carbon atoms. Examples of an alkylthio group include: methylthio and ethylthio.

The arylthio group preferably has 6-20 carbon atoms, more preferably 6-16 carbon atoms and most preferably 6-carbon atoms. Examples of an arylthio group include: phenylthio.

The sulfonyl group preferably has 1-20 carbon atoms, more preferably 1-16 carbon atoms and most preferably 1-12 carbon atoms. Examples of a sulfonyl group include: mesyl and tosyl.

The sulfinyl group preferably has 1-20 carbon atoms, more preferably 1-16 carbon atoms and most preferably 1-12 carbon atoms. Examples of a sulfinyl group include: methanesulfinyl and benzenesulfinyl.

The ureido group preferably has 1-20 carbon atoms, more preferably 1-16 carbon atoms and most preferably 1-12 carbon atoms. Examples of an ureido group include: ureido, methylureido and phenylureido.

The phosphoric acid amido group preferably has 1-20 carbon atoms, more preferably 1-16 carbon atoms and most preferably 1-12 carbon atoms. Examples of a phosphoric acid amido group include: diethyl phosphoric acid amido and phenyl phosphoric acid amido.

The heterocycle group preferably has 1-30 carbon atoms and more preferably 1-12 carbon atoms. Examples of a hetero atom include: a nitrogen atom, an oxygen atom and a sulfur atom. Examples of a heterocycle group include: imidazolyl, pyridyl, quinolyl, furyl, piperidyl, morpholino, benzoxazolyl, benzimidazolyl and benzthiazolyl.

The silyl group preferably has 3-40 carbon atoms, more preferably 3-30 carbon atoms and most preferably 3-24 carbon atoms. Examples of a silyl group include: trimethylsilyl and triphenylsilyl.

The compounds represented by Formula (13) will now be described.

In Formula (13), X represents a tervalent group selected from B, C—R (R represents a hydrogen atom or a substituent), N, P, and P═O. As for X, B, C—R, and N are preferable, more preferable are C—R and N, and most preferable is C—R.

Example of the substituent, R include: an aryl group, an amino group, a substituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (for example, a fluorine atom, a chlorine atom, a bromine atom and an iodine atom) and a carboxyl group. Of these, preferable are an aryl group, an alkoxy group, an aryloxy group, a hydroxyl group and a halogen atom, more preferable are an alkoxy group and a hydroxyl group, and most preferable is a hydroxyl group.

The compound represented by Formula (13) is preferably a compound represented by Formula (a).

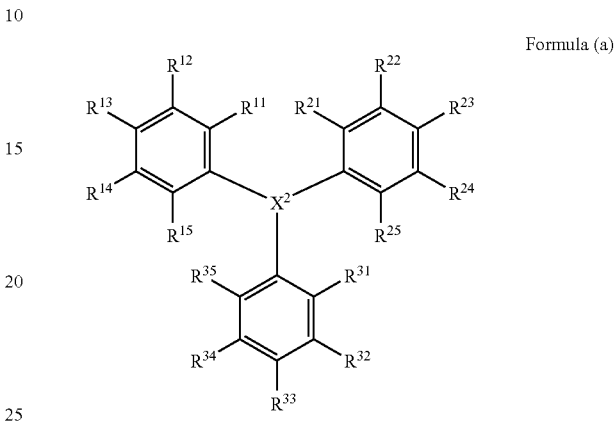

Formula (a)

In Formula (a), $X^2$ represents a tervalent group selected from B, C—R (R represents a hydrogen atom or a substituent), N. The detail of $X^2$ is common to that of X in Formula (13).

In Formula (a), $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent.

The detail of the substituent is common to that of the substituent, $Q^1$, $Q^2$ and $Q^3$ in Formula (13).

Preferable examples of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ include: an alkyl group, an alkenyl group, an alkynyl group, an aryl group, an amino group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamide group, a sulfamoyl group, a substituted sulfamoyl group, a carbamoyl group, a substituted carbamoyl group, an alkylthio group, an arylthio group, a sulfonyl group, a sulfinyl group, an ureido group, a phosphoric acid amido group, a hydroxyl group, a mercapto group and a halogen atom (a fluorine atom, a chlorine atom a bromine atom and an iodine atom), a cyano group, a sulfo group, a carboxyl group, a nitro group, a hydroxamic acid group, a sulfino group, a hydrazino group, an imino group, a heterocycle group and a silyl group. More preferable are an alkyl group, an aryl group, an amino group, a substituted amino group, an alkoxy group and an aryloxy group, and most preferable are an alkyl group, an aryl group and an alkoxy group.

These substituents may further have a substituent, and a plurality of substituents may be the same or different. Further, the substituents may be combined to form a ring. In Formula (14), preferably, $R^1$, $R^2$, and $R^3$ each independently represent a hydrogen atom or an alkyl group having 1-5 carbon atoms. Specifically preferably, at least one of $R^1$, $R^2$, and $R^3$ is an alkyl group having 1-3 carbon atoms (for example, methyl, ethyl, propyl, isopropyl, butyl amyl and isoamyl). X preferably represents at least one divalent linking group selected from a single bond, —O—, —CO—, an alkylene group (preferably having 1 to 6 carbon atoms, and more preferably having 1-3 carbon atoms, for example, methylene, ethylene and propylene), an arylene group (preferably having 6 to 24 carbon atoms, and more preferably having 6-12 carbon atoms, for example, phenylene, biphenylene and naphtylene). More preferably, X represents at least one divalent linking group selected from —O—, an alkylene group and an arylene group. Y is preferably a hydrogen atom; an alkyl group (preferably having 2 to 25 carbon atoms, and more preferably having 2-20 carbon atoms, for example, ethyl, isopropyl, t-butyl, hexyl, 2-ethylhexyl, t-octyl, dodecyl, cyclohexyl, dicyclohexyl and adamantyl); an aryl group (preferably having 6 to 24 carbon atoms, and more preferably having 6-18 carbon atoms, for example, phenyl, biphenyl, terphenyl and naphthyl); or an aralkyl group (preferably having 7 to 30 carbon atoms, and more preferably having 7-20 carbon atoms, for example, benzyl, cresyl, t-butylphenyl, diphenylmethyl and triphenylmethyl). Specifically preferably, Y is an alkyl group, an aryl group or an aralkyl group. As a combination of —X—Y, —X—Y preferably has a total carbon number of 0-40, more preferably 1-30, and most preferably 1-25.

Preferable examples of a compound represented by Formula (14) will be shown below, however, the present invention is not limited thereto.

PL-1
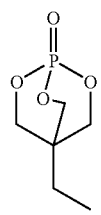

PL-2
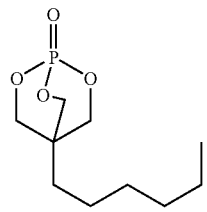

PL-3
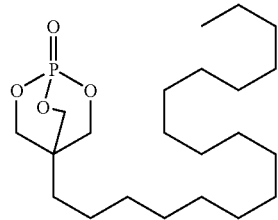

PL-4
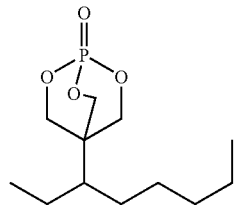

PL-5
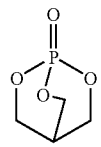

-continued

PL-6
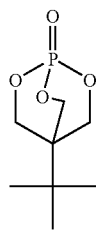

PL-7
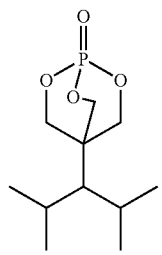

PL-8
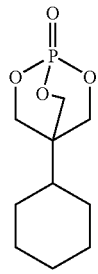

PL-9
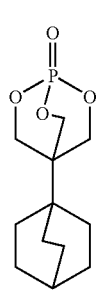

PL-10
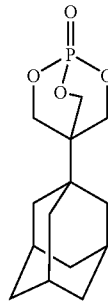

PL-11
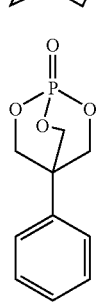

-continued
PL-12
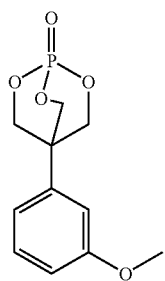
PL-13
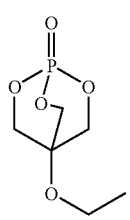
PL-14
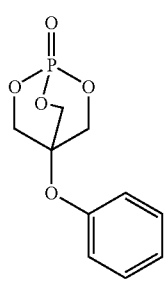
PL-15
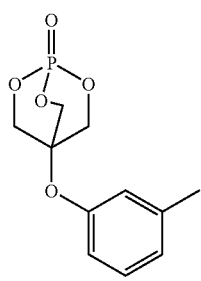
PL-16
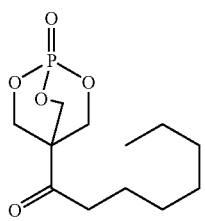
PL-17
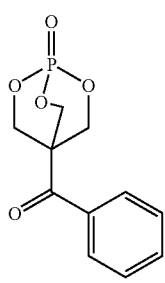
-continued
PL-18
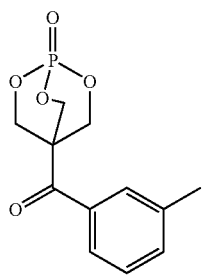
PL-19
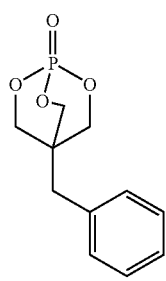
PL-20
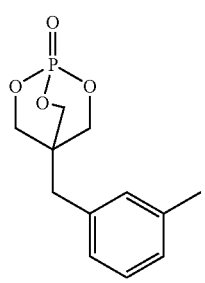
PL-21
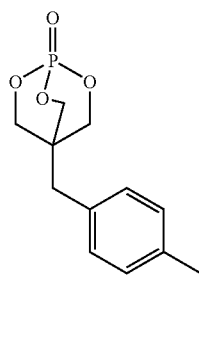
PL-22
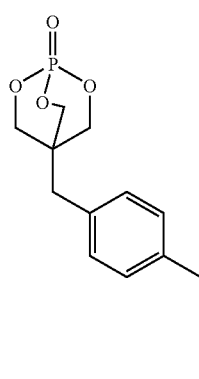

PL-23 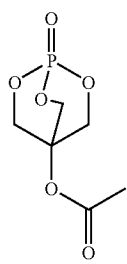
PL-24 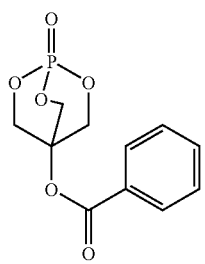
PL-25 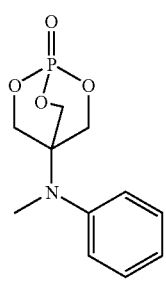
PL-26 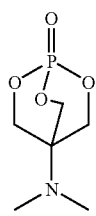
PL-27 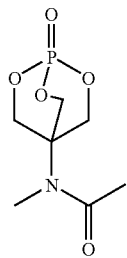
PL-28 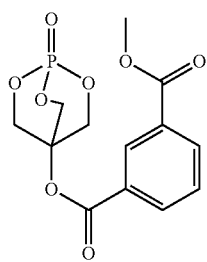
PL-29 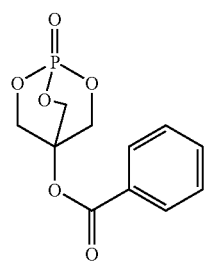
PL-30 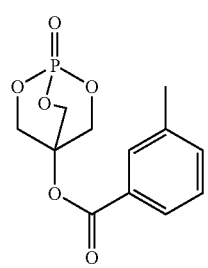
PL-31 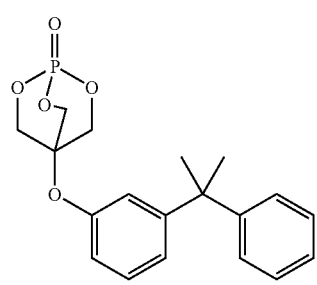
PL-32 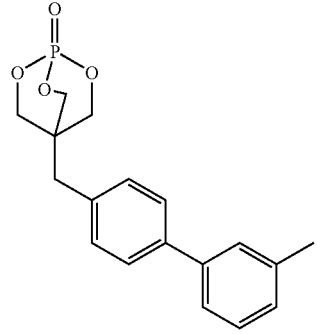
PL-33 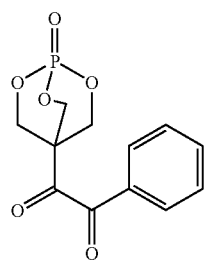

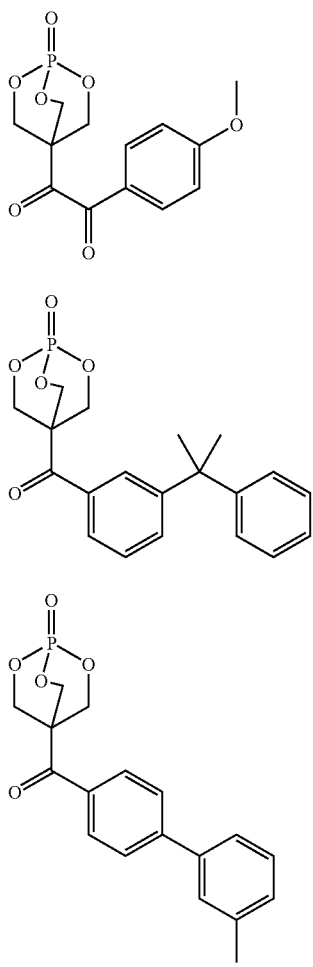

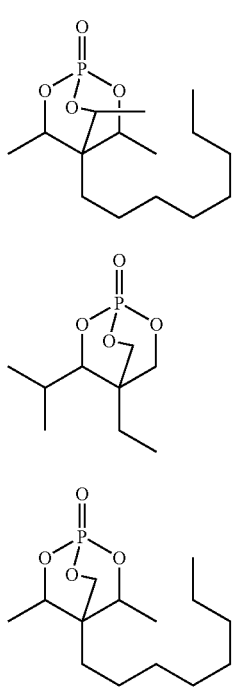

PL-34

PL-35

PL-36

PL-37

PL-38

PL-49

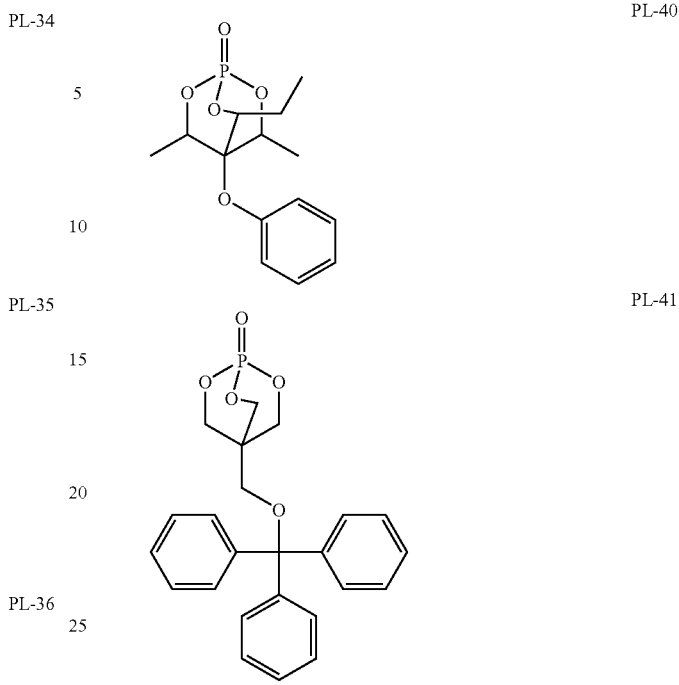

PL-40

PL-41

In addition, it is preferable to add the following compound to the cellulose ester of the present invention.

Formula (17)

(in the formula, $Q^1$ and $Q^2$ each independently represent an aromatic ring, $X^1$ and $X^2$ represent a hydrogen atom or a substituent, provided that at least one of $X^1$ and $X^2$ represents a cyano group, a carbonyl group, a sulfonyl group or an aromatic heterocycle.) The aromatic ring represented by $X^1$ or $X^2$ may be an aromatic hydrocarbon ring or an aromatic heterocycle. These rings may be a single ring or may be combined with another ring to form a condensed ring.

The aromatic hydrocarbon ring is preferably monocyclic or bicyclic and preferably having 6-30 carbon atoms (for example, a benzene ring, a naphthalene ring). More preferably, the aromatic hydrocarbon ring has 6 to 20 carbon atoms, and still more preferably 6-12 carbon atoms. Specifically preferably the aromatic hydrocarbon is benzene.

The aromatic heterocycle preferably contains a nitrogen atom or a sulfur atom. Examples of the heterocycle include: thiophene, imidazole, pyrazole, pyridine, pyrazine, pyridazine, triazole, triazine, indole, indazole, purine, thiazoline, thiazole, a thiadiazole, oxazoline, oxazole, oxydiazole, quinoline, isoquinoline, phthalazine, naphthylidine, quinoxaline, a quinazoline, cinnoline, pteridine, acridine, phenanthroline, phenazine, tetrazole, benzimidazole, benzoxazole, benzthiazole, benzotriazole, tetrazaindene. Preferable aromatic heterocycle includes pyridine, triazine and quinoline.

The aromatic ring represented by $Q^1$ or $Q^2$ is preferably an aromatic hydrocarbon ring and more preferably a benzene ring.

$Q^1$ and $Q^2$ may further have a substituent, and the substituent is preferably substituent T which will be described below. Examples of substituent T include: an alkyl group (preferably having 1 to 20 carbon atoms, more preferably having 1 to 12 carbon atoms and still more preferably having 1 to 8 carbon atoms, and examples of an alkyl group include: a methyl group, an ethyl group, an iso-propyl group, a tert-butyl group, an n-octyl group, an n-decyl group, an n-hexadecyl group, a cyclopropyl group, a cyclopentyl group and a cyclohexyl group); an alkenyl group (preferably having 2 to 20 carbon atoms, more preferably having 2 to 12 carbon atoms and specifically preferably having 2 to 8 carbon atoms, and examples of the alkenyl group include: a vinyl group, an allyl group, a 2-butenyl group and 3-pentenyl group); an alkynyl group (preferably having 2 to 20 carbon atoms, more preferably having 2 to 12 carbon atoms and specifically preferably having 2 to 8 carbon atoms, and examples of the alkynyl group include: a propargyl group and a 3-pentynyl group); an aryl group (preferably having 6 to 30 carbon atoms, more preferably having 6 to 20 carbon atoms and specifically preferably having 6 to 12 carbon atoms, and examples of the aryl group include: a phenyl group, a p-methylphenyl group and a naphthyl group); a substituted or unsubstituted amino group (preferably having 0 to 20 carbon atoms, more preferably having 0 to 10 carbon atoms and specifically preferably having 0 to 6 carbon atoms, and examples of the amino group include: an amino group, a methylamino group, a dimethylamino group, a diethylamino group and a dibenzylamino group); an alkoxy group (preferably having 1 to 20 carbon atoms, more preferably having 1 to 12 carbon atoms and specifically preferably having 1 to 8 carbon atoms, and examples of the alkoxy group include: a methoxy group, an ethoxy group and a butoxy group); an aryloxy group (preferably having 1 to 20 carbon atoms, more preferably having 1 to 12 carbon atoms and specifically preferably having 1 to 8 carbon atoms, and examples of the aryloxy group include: a phenyloxy group and a 2-naphthyloxy group); an acyl group (preferably having 1 to 20 carbon atoms, more preferably having 1 to 16 carbon atoms and specifically preferably having 1 to 12 carbon atoms, and examples of the, acyl group include: an acetyl group, a benzoyl group, a formyl group and a pivaloyl group); an alkoxycarbonyl group (preferably having 2 to 20 carbon atoms, more preferably having 2 to 16 carbon atoms and specifically preferably having 2 to 12 carbon atoms, and examples of the alkoxycarbonyl group include: a methoxycarbonyl group and an ethoxycarbonyl group); an aryloxycarbonyl group (preferably having 7 to 20 carbon atoms, more preferably having 7 to 16 carbon atoms and specifically preferably having 7 to 10 carbon atoms, and a phenyloxycarbonyl group is cited as an example of the alkoxycarbonyl group); an acyloxy group (preferably having 2 to 20 carbon atoms, more preferably having 2 to 16 carbon atoms and specifically preferably having 2 to 10 carbon atoms, and examples of the acyloxy group include: an acetoxy group and a benzoyloxy group); an acylamino group (preferably having 2 to 20 carbon atoms, more preferably having 2 to 16 carbon atoms and specifically preferably having 2 to 10 carbon atoms, and examples of the acylamino group include: an acetylamino group and a benzoylamino group); an alkoxycarbonylamino group (preferably having 2 to 20 carbon atoms, more preferably having 2 to 16 carbon atoms and specifically preferably having 2 to 12 carbon atoms, and examples of the alkoxycarbonylamino group include: a methoxycarbonylamino group); an aryloxycarbonylamino group (preferably having 7 to 20 carbon atoms, more preferably having 7 to 16 carbon atoms and specifically preferably having 1 to 12 carbon atoms, and examples of the aryloxycarbonylamino group include: a phenyloxycarbonylamino group); a sulfonylamino group (preferably having 1 to 20 carbon atoms, more preferably having 1 to 16 carbon atoms and specifically preferably having 1 to 2 carbon atoms, and examples of the sulfonylamino group include: a methanesulfonylamino group and a benzensulfonylamino group); a sulfamoyl group (preferably having 0 to 20 carbon atoms, more preferably having 0 to 16 carbon atoms and specifically preferably having 0 to 12 carbon atoms, and examples of the sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms and specifically preferably having 1 to 12 carbon atoms, and examples of the carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms and specifically preferably having 1 to 12 carbon atoms, and examples of the alkoxy group include: a methylthio group and an ethylthio group); an arylthio group (preferably having 6 to 20 carbon atoms, more preferably having 6 to 16 carbon atoms and specifically preferably having 6 to 12 carbon atoms, and examples of the arylthio group include: a phenylthio group); a sulfonyl group (preferably having 1 to 20 carbon atoms, more preferably having 1 to 16 carbon atoms and specifically preferably having 1 to 12 carbon atoms, and examples of the sulfonyl group include: a mesyl group and a tosyl group); a sulfinyl group (preferably having 1 to 20 carbon atoms, more preferably having 1 to 16 carbon atoms and specifically preferably having 1 to 12 carbon atoms, and examples of the sulfinyl group include: a methanesulfinyl group and a benzenesulfinyl group); an ureido group (preferably having 1 to 20 carbon atoms, more preferably having 1 to 16 carbon atoms and specifically preferably having 1 to 12 carbon atoms, and examples of the ureido group include: an ureido group, a methylureido group and a phenylureido group); a phosphoric acid amide group (preferably having 1 to 20 carbon atoms, more preferably having 1 to 16 carbon atoms and specifically preferably having 1 to 12 carbon atoms, and examples of the phosphoric acid amide group include: a diethyl phosphoric acid amide group and a phenyl phosphoric acid amide group);

a hydroxy group; a sulfhydryl group; a halogen atom (for example, a fluorine atom and a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms and more preferably having 1 to 12 carbon atoms, and examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzoxazolyl group, a benzimidazolyl group and a benzthiazolyl group); and a silyl group (preferably having 3 to 40 carbon atoms, more preferably having 3 to 30 carbon atoms and specifically preferably having 3 to 24 carbon atoms, and examples of the silyl group include: a trimethylsilyl group and a triphenylsilyl group). These substituents may further be substituted, and, when two or more substituents are included, they may be the same or different. Further, the substituents may be combined to form a ring.

$X^1$ and $X^2$ each represent a hydrogen atom or a substituent, and at least one of them represents a cyano group, a carbonyl group, a sulfonyl group or an aromatic heterocycle group. Examples of $X^1$ and $X^2$ include the above-mentioned substituent T. The substituents $X^1$ and $X^2$ may further be substituted with other substituent, and, if possible, may be combined to form a condensed ring.

As $X^1$ and $X^2$, preferable are: a hydrogen atom, an alkyl group, an aryl group, a cyano group, a nitro group, a carbonyl group, a sulfonyl group and an aromatic heterocycle group; more preferable are: a cyano group, a carbonyl group, a sulfonyl group and an aromatic heterocycle group; still more preferable are: a cyano group and a carbonyl group; and specifically preferable are: a cyano group and an alkoxycarbonyl group (—C(=O)OR (R represents an alkyl group having 1-20 carbon atoms, an aryl group having 6-12 carbon atoms or combination thereof)).

Preferable as Formula (17) includes a compound represented by Formula (18).

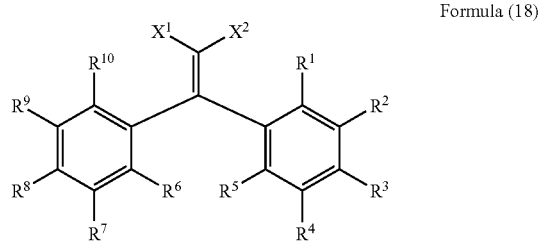

Formula (18)

(in the formula, $R^1$, $R^2$, $R^3$, $R^4$, $R^5$, $R^6$, $R^7$, $R^8$, $R^9$ and $R^{10}$ each independently represent a hydrogen atom or a substituent, $X^1$ and $X^2$ are common to $X^1$ and $X^2$ in Formula (17) and the preferable range is also common) independently among a formula, respectively.)

$R^1$, $R^2$, $R^3$, $R^4$, $R^5$, $R^6$, $R^7$, $R^8$, $R^9$ and $R^{10}$ each independently represent a hydrogen atom or a substituent and examples thereof include the above-mentioned substituent T. These substituents may further be substituted with other substituent. These substituents may be fused each other to form a ring.

As $R^1$, $R^2$, $R^4$, $R^5$, $R^6$, $R^7$, $R^9$ and $R^{10}$, preferable are: a hydrogen atom, an alkyl group, an alkenyl group, an alkynyl group, an aryl group, a substituted or unsubstituted amino group, an alkoxy group, an aryloxy group, a hydroxy group and a halogen atom; more preferable are: a hydrogen atom, an alkyl group, an aryl group, an alkyloxy group, an aryloxy group and a halogen atom; still more preferable are: a hydrogen atom and an alkyl group having 1-12 carbon atoms; specifically preferable are: a hydrogen atom and a methyl group; and most preferable is a hydrogen atom.

As $R^3$ and $R^8$, preferable are: a hydrogen atom, an alkyl group, an alkenyl group, an alkynyl group, an aryl group, a substituted or unsubstituted amino group, an alkoxy group, an aryloxy group, a hydroxy group and a halogen atom; more preferable are: a hydrogen atom, an alkyl group having 1-20 carbon atoms, an amino group having 0-20 carbon atoms, an alkoxy group having 1-12 carbon atoms, an aryloxy group having 6-12 carbon atoms and a halogen atom; still more preferable are: a hydrogen atom and an alkyl group having 1-12 carbon atoms and an alkoxy group having 1-12 carbon atoms; and specifically preferable is a hydrogen atom.

Preferable as Formula (17) includes a compound represented by Formula (19).

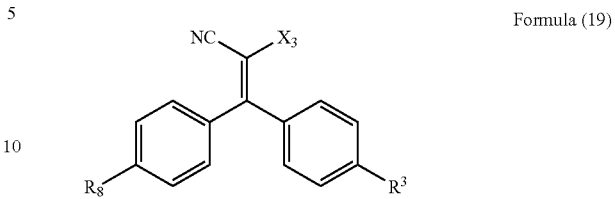

Formula (19)

(in the formula, $R^3$ and $R^8$ are common to $R^3$ and $R^8$ in Formula (17) and the preferable range is also common, and $X^3$ represents a hydrogen atom or a substituent)

$X^3$ represents a hydrogen atom or a substituent and examples thereof include the above-mentioned substituent T. As $X^3$, preferable are: a hydrogen atom, an alkyl group, an aryl group, a cyano group, a nitro group, a carbonyl group, a sulfonyl group and an aromatic heterocycle group; more preferable are: a cyano group, a carbonyl group, a sulfonyl group and an aromatic heterocycle group; still more preferable are: a cyano group and a carbonyl group; and specifically preferable are: a cyano group and an alkoxycarbonyl group (—C(=O)OR (R represents an alkyl group having 1-20 carbon atoms, an aryl group having 6-12 carbon atoms or combination thereof)).

Preferable as Formula (17) includes a compound represented by Formula (20).

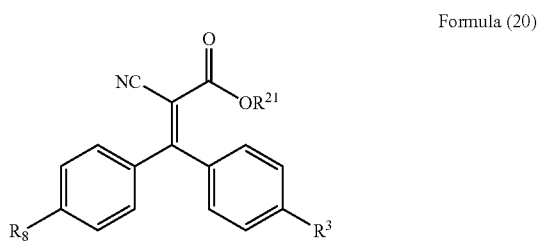

Formula (20)

(in the formula, $R^3$ and $R^8$ are common to $R^3$ and $R^8$ in Formula (18) and the preferable range is also common, and $R^{21}$ represents an alkyl group having 1 to 20 carbon atoms)

When both $R^3$ and $R^8$ each are a hydrogen atom, preferable as $R^{21}$ is an alkyl group having 2 to 12 carbon atoms, more preferable is an alkyl group having 4 to 12 carbon atoms, still more preferable is an alkyl group having 6 to 12 carbon atoms, specifically preferable is an n-octyl group, a tert-octyl group, a 2-ethylhexyl group, an n-decyl group or an n-dodecyl group, and most preferable is a 2-ethylhexyl group.

When $R^3$ and $R^8$ each are a group other than a hydrogen atom, preferable as $R^{21}$ is an alkyl group having a molecular weight of not less than 300 and having not more than 20 carbon atoms.

A compound represented by Formula (17) can be prepared according to the method described in Journal of American Chemical Society, Vol. 63, p 3452 (1941).

Examples of a compound represented by Formula (17) will be shown below, however, the present invention is not limited thereto.

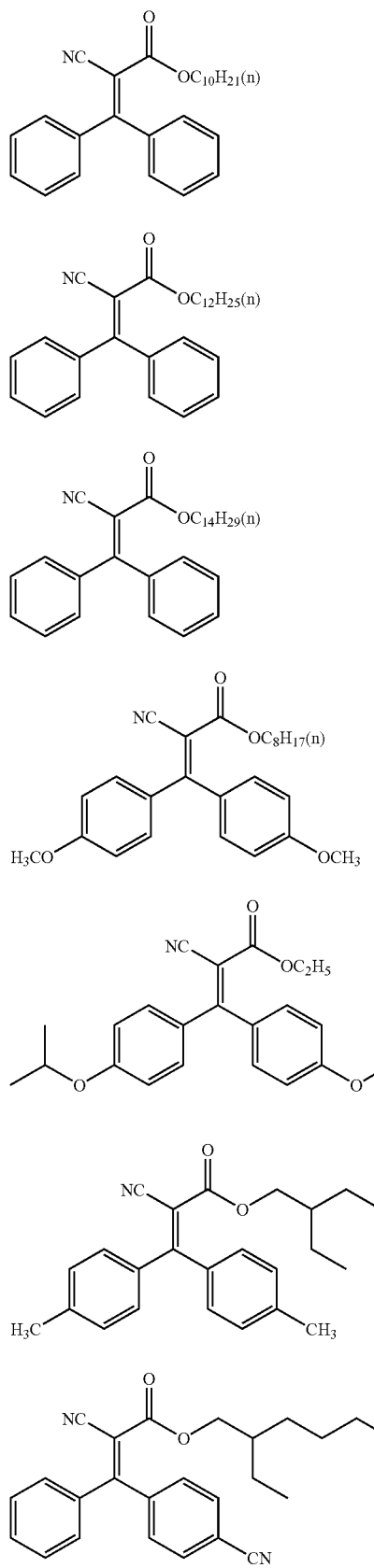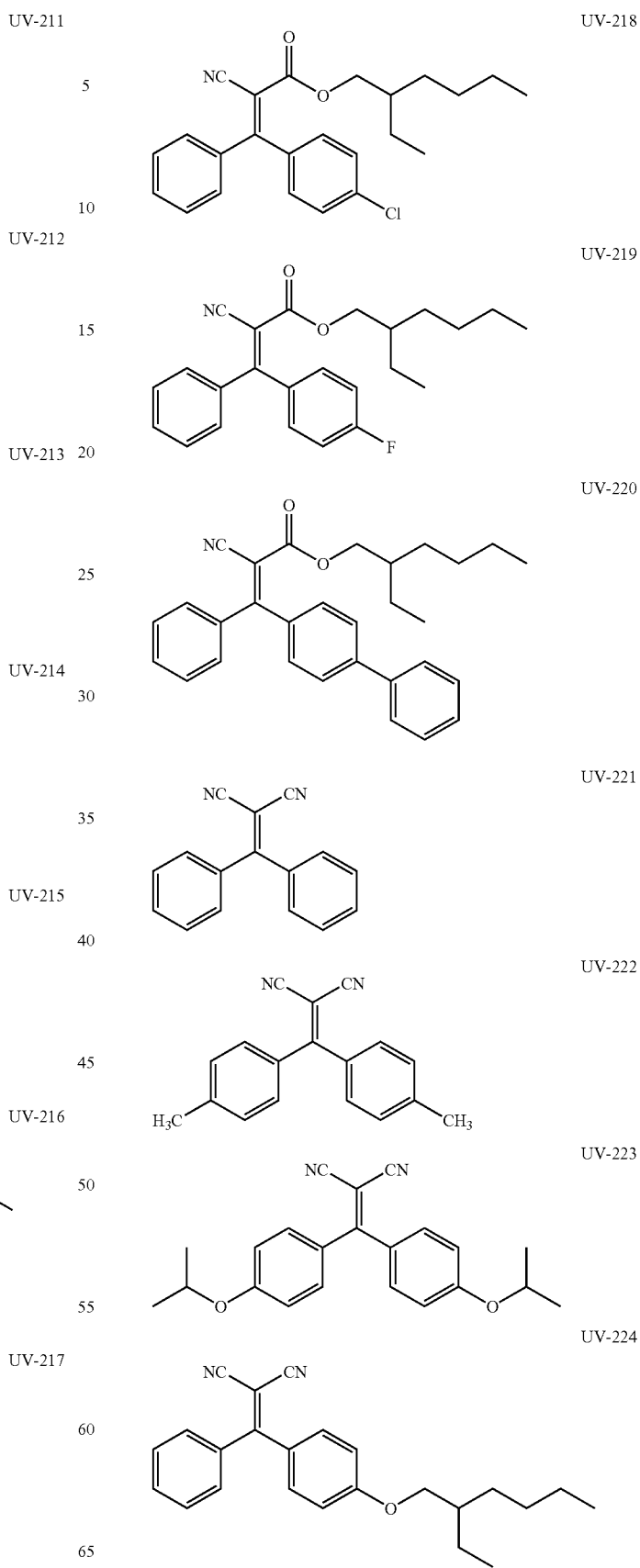

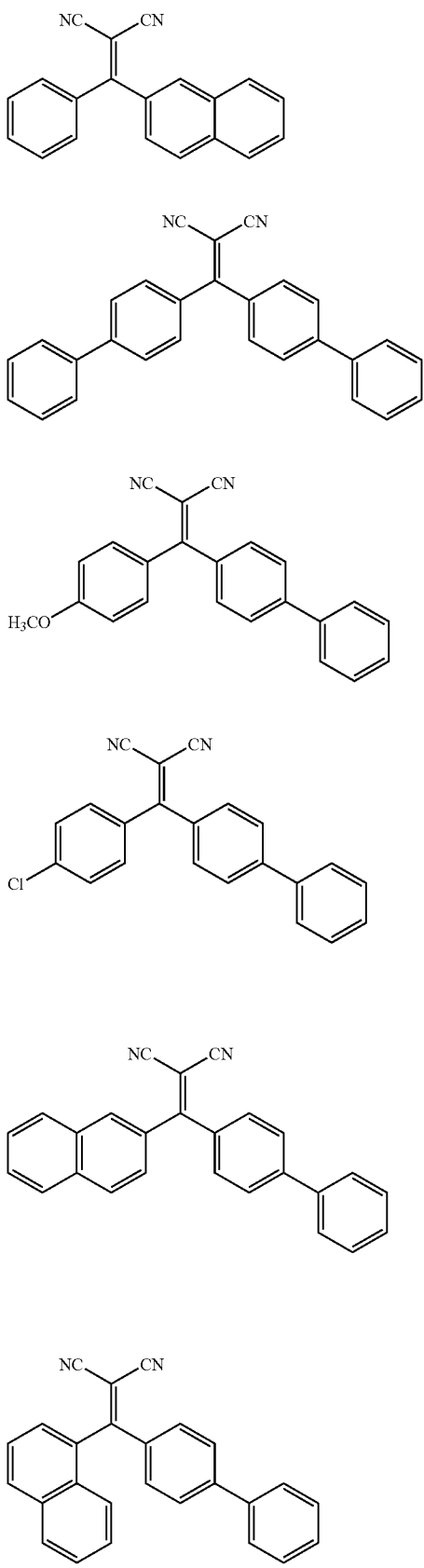

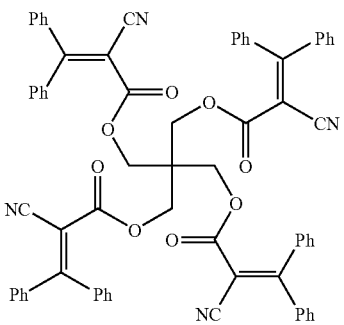

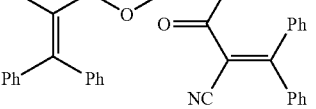

These compounds can be incorporated with the content of 0.1-15 wt % in the cellulose ester film of the present invention.

(Cellulose Ester)

The cellulose ester employed in the present invention is preferably a lower fatty acid ester of cellulose. The lower fatty acids in lower fatty acid esters of cellulose, as described herein, refers to fatty acids having at most 6 carbon atoms. It is possible to employ, for example, cellulose acetate, cellulose propionate, and cellulose butyrate, as well as mixed fatty acid esters such as cellulose acetate propionate or cellulose acetate butyrate, described in JP-A Nos. 10-45804 and 8-231761 and U.S. Pat. No. 2,319,052. Of the above, lower fatty acid esters, which are particularly preferred, are cellulose triacetate and acetate propionate. These cellulose esters may be employed individually or in combinations.

In the case of cellulose triacetate, one at an average degree of acetylation (the amount of bonded acetic acid) of 54.0-62.5% is preferably employed, but one at an average degree of acetification of 58.0-62.5 is more preferred.

Preferred cellulose esters other than cellulose triacetate are those which simultaneously satisfy following Formulas (I) and (II), provided that X represents the degree of substitution by an acetyl group and Y represents degree of substitution by a fatty acid ester having 3-22 carbon atoms. Specifically preferable is a cellulose ester in which Y contains a propionyl group or a butyryl group.

$$2.8 \leq X+Y \leq 3.0 \quad (I)$$

$$1.0 \leq X \leq 2.95 \quad (II)$$

wherein X represents the degree of substitution by an acetyl group, and Y represents the degree of substitution by a fatty acid ester group having 3-22 carbon atoms.

Glucose units under β-1,4 bond, which constitute cellulose, incorporate a free hydroxyl group at positions 2, 3, and 6. Cellulose acylate is a polymer in which some or all of these hydroxyl groups are substituted with an acyl group (namely, being esterified). The degree (the degree of substitution is 1 for 100% esterification) of acyl substitution refers to the ratio of esterification of cellulose at each of positions 2, 3 and 6. Further, when the hydroxyl groups at positions 2, 3 and 6 are substituted with Y, the ratio is at least 28%. However, the above ratio is preferably at least 30% of the whole hydroxyl groups, is more preferably 31%, but is most preferably at least 32%.

Further, a cellulose acylated film is also preferred in which the total degree of substitution of X and Y at position 6 of cellulose acylate is commonly at least 0.8, is preferably 0.85, but is more preferably 0.90.

Synthesis of these cellulose acrylates which exhibit a large degree of substitution at position 6 is described in JP-A Nos. 11-5851, 20002-212338, and 2002-338601.

Acyl groups having 3-22 carbon atoms of the cellulose acylate of the present invention may be either an aliphatic group or an aryl group, and are not particularly limited. Examples include alkylcarbonyl ester, alkenylcarbonyl ester, aromatic carbonyl ester and aromatic alkylcarbonyl ester of cellulose, each of which may further incorporate a substituted group. Cited as preferred groups may be propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl groups. Of these, preferred are propionyl, butanoyl, dodecanoyl, octadecanoyl, t-butanoyl, oleoyl, benzoyl, naphthylcarbonyl, and cinnamoyl groups.

Further, of these, preferred is cellulose acetate propionate, which satisfies $0 \leq X \leq 2.95$ and $0.1 \leq Y \leq 2.0$. Any portion which is not substituted with an acyl group is commonly present as a hydroxyl group. These are synthesized by methods known in the art.

Cellulose esters, which are synthesized employing, as a raw material, cotton linter, wood pulp, or kenaf, may be employed individually or in combinations. Specifically, it is preferable that cellulose esters synthesized employing cotton linter (hereinafter also referred to simply as linter) are employed individually or in combinations.

As the molecular weight of cellulose ester increases, the variation ratio of the elastic modulus, due to heat, decreases. When the molecular weight increases excessively, the viscosity of the resultant cellulose ester-dissolved solution increases excessively, whereby productivity is degraded. The molecular weight of cellulose esters is preferably 30,000-200,000 in terms of number average molecular weight (Mn), but is more preferably 40,000-170,000.

Cellulose esters preferably exhibit the following characteristics. When 1 g of cellulose ester is charged into 20 ml of pure water (at an electric conductivity of at most 1 μs/cm and a pH of 6.8) and the resulting mixture is stirred at 25° C. for one hour under a nitrogen atmosphere, the resulting pH and electric conductivity are preferably 6-7 and 1-100 μS/cm, respectively. When the pH is less than 6, the degradation of cellulose tends to be accelerated by residual organic acids during heat-melting. When the pH is at least 7, hydrolysis may be accelerated. Further, an electric conductivity of at least 100 μS/cm is considered to be a factor to degrade cellulose during heating due to the presence of a relatively large amount of residual ions.

(Plasticizer)

In the dope used for forming the cellulose ester film of the present invention, a plasticizer, an ultraviolet (UV) absorber or an antioxidant may be incorporated. These additives are preferably incorporated so as not to notably increase the Rt value.

In the cellulose ester film of the present invention, the following plasticizers are applicable.

Phosphate ester plasticizer: Specific examples of the phosphate ester plasticizer include phosphoric acid alkyl esters such as triacetyl phosphate and tributyl phosphate; phosphoric acid cycloalkyl esters such as tricyclopentyl phosphate and cyclohexyl phosphate; and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mix of an alkyl group, a cycloalkyl group and an aryl group, and the substituent groups may be bonded to each other via covalent bond.

Examples of the phosphoric acid ester also include phosphate esters, for example: alkylenebis(dialkylphosphate) such as ethylenebis(dimethylphosphate) or butylenebis(diethylphosphate); alkylenebis(diarylphosphate) such as ethylenebis(diphenylphosphate) or propylenebis(dinaphtylphosphate); arylenebis(dialkylphosphate) such as phenylenebis (dibutylphosphate) or biphenylenebis(dioctylphosphate); and arylenebis(diarylphosphates) such as phenylenebis (diphenylphosphate) or naphtylenebis(ditriylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphate ester may be a part of the polymer or may be systematically included as a pendant. It may also be introduced into a part of the molecular structure of the additive such as the antioxidant, the acid scavenger, the ultraviolet light absorber. Of the compounds listed above, aryl phosphate ester and arylenebis(diarylphosphate) are preferable, and more specifically, triphenyl phosphate and phenylenebis(diphenylphosphate) are preferable.

Ethylene glycol ester plasticizer: Specific examples of an ethylene glycol ester plasticizer include: ethylene glycol alkyl ester plasticizers such as ethylene glycol diacetate and ethylene glycol dibutyrate; ethylene glycol cycloalkyl ester plasticizers such as ethylene glycol dicyclopropyl carboxylate and ethylene glycol dicyclohexyl carboxylate; and ethylene glycol aryl ester plasticizers such as ethylene glycol dibenzoate and ethylene glycol di-4-methyl benzoate. These alkylate groups, cycloalkylate groups and arylate groups may be the same or different and may further be substituted. The substituent groups may be a mixture of alkylate groups, cycloalkylate groups and arylate groups, and the substituent groups may be bonded to each other via covalent linkage. Further, the ethylene glycol portions may be substituted and the ethylene glycol ester part of the structure may be part of the polymer or may be systematically included as a pendant. It may also be introduced into a part of the molecular structure of the additives such as an antioxidant, an acid scavenger, and an ultraviolet light absorber.

Glycerin ester plasticizers: Examples of a glycerin ester plasticizer include: glycerin alkyl esters such as triacetin, tributylin, glycerin diacetate caprylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin 4-methylbenzoate; diglycerin alkyl esters such as diglycerin tetraacetylate, diglycerin tetrapropionate, digylcerin acetate tri caprylate and diglycerin tetralaurate; diglycerin cycloalkyl esters such as diglycerin tetracylobutyl carboxylate and diglycerin tetracylopentyl carboxylate; and diglycerin aryl esters such as diglycerin tetrabenzoate and diglycerin 3-methyl benzoate. These alkylate groups, cycloalkyl carboxylate groups and arylate groups may be same or different and may further be substituted. The substituent groups may be a mixture of an alkylate group, a cycloalkyl carboxylate group and an arylate groups, and the substituent groups may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of the additive such as an antioxidant, an acid scavenger, and an ultraviolet light absorber.

Polyalcohol ester plasticizers: Specific examples of polyalcohol ester plasticizers include the polyalcohol ester plasticizers disclosed in JP-A 2003-12823, paragraphs 30-33.

These alkylate groups, cycloalkyl carboxylate groups and arylate groups may be the same or different and may be further be substituted. The alkylate groups, cycloalkyl carboxylate groups and arylate groups may be mixed, and the substituent groups may be bonded to each other via covalent bond. Furthermore, the polyhydric alcohol portion may be substituted and a partial structure of the polyhydric alcohol may be a part of the polymer or may be systematically included as a pendant. It may also be introduced into a part of the molecular structure of the additives such as an antioxidant, an acid scavenger or an ultraviolet light absorber.

Dicarboxylic acid ester plasticizer: Specific examples of a dicarboxylic acid ester plasticizer include: alkyl dicarboxylic acid cycloalkyl ester plasticizers such as didodecyl malonate (C1), dioctyl adipate (C4) and dibutyl cebacate (C8); alkyl dicarboxylic acid cycloalkyl ester plasticizers such as dicyclopentyl succinate and dicyclohexyl adipate; alkyl dicarboxylic acid aryl ester plasticizers such as diphenyl succinate and di-4-methyl phenyl glutarate; cycloalkyl dicarboxylic acid alkyl ester plasticizers such as dihexyl-1,4-cyclohexane dicarboxylate and didecyl bicyclo [2.2.1]heptane-2,3-dicarboxylate; cycloalkyl dicarboxylic acid cycloalkyl ester plasticizers such as dicyclohexyl-1,2-cyclobutane dicarboxylate and dicyclopropyl-1,2-cyclohexyl dicarboxylate; cycloalkyl dicarboxylic acid aryl ester plasticizers such as diphenyl-1,1-cyclopropyl dicarboxylate and di-2-naphthyl-1,4-cyclohexane dicarboxylate; aryl dicarboxylic acid alkyl ester plasticizers such as diethyl phthalate, dimethyl phthalate, dioctyl phthalate, dibutyl phthalate and di-2-ethylhexyl phthalate; aryl dicarboxylic acid cycloalkyl ester plasticizers such as dicyclopropyl phthalate and dicyclohexyl phthalate; and aryl dicarboxylic acid aryl ester plasticizers such as diphenyl phthalate and di-4-methylphenyl phthalate. These alkoxy groups and cycloalkoxy groups may be the same or different, and may also be monosubstituted and the substitution groups may be further substituted. The alkyl groups and the cycloalkyl groups may be mixed, and the substituent groups may be bonded to each other via covalent bond. Furthermore, the aromatic ring of the phthalic acid may be substituted and may be a multimer such as a dimer, a trimer or a tetramer. The phthalic acid ester part of the structure may be a part of the polymer or may be systematically included as a pendant. It may also be introduced into a part of the molecular structure of the additives such as an antioxidant, an acid scavenger and an ultraviolet light absorber.

Polyhydric carboxylic acid ester plasticizers: Specific examples of polyhydric carboxylic acid ester plasticizers include: alkyl polyhydric carboxylic acid alkyl ester plasticizers such as tridodecyl tricarbalate and tributyl-meso-butane-1,2,3,4,-tetracarboxylate; alkyl polyhydric carboxylic acid cycloalkyl ester plasticizers such as tricyclohexyl tricarbalate and tricyclopopyl-2-hydroxy-1,2,3-propane tricarboxylate; alkyl polyhydric carboxylic acid aryl ester plasticizers such as triphenyl-2-hydroxyl-1,2,3-propane tricarboxylate, tetra-3-methylphenyl tetrahydrofuran-2,3,4,5-tetracarboxylate; cycloalkyl polyhydric carboxylic acid alkyl ester plasticizers such as tetrahexyl-1,2,3,4-cyclobutane tetracarboxylate and tetrabutyl-1,2,3,4,-dicyclopentane tetracarboxylate; cycloalkyl polyhydric carboxylic acid cycloalkyl ester plasticizers such as tetracyclopropyl-1,2,3,4-cyclobutane tetracarboxylate and tricyclohexyl-1,3,5-cyclohexyl tricarboxylate; cycloalkyl polyhydric carboxylic acid aryl ester plasticizers such as triphenyl-1,3,5-cyclohexyl tricarboxylate, hexa-4-methylphenyl-1,2,3,4,5,6-cyclohexyl hexacarboxylate; aryl polyhdric carboxylic acid alkyl ester based plasticizers such as tridodecyl benzene-1,2,4-tricarboxylate and tetraoctylbenzene-1,2,4,5-tetracarboxylate; aryl polyhdric carboxylic acid cycloalkyl ester plasticizers such as tricyclopentyl benzene-1,3,5-tricarboxylate and tetracyclohexyl benzene-1,2,3,5 tetracarboxylate; and aryl polyhdric carboxylic acid aryl ester plasticizers such as triphenyl benzene-1,3,5-tetracarboxylate and hexa-4-methylphenyl benzene-1,2,3,4,5,6-hexacarboxylate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be a polymer such as a dimer, trimer, tetramer and the like. The phthalic acid ester part of the structure may be a part of the polymer or may be systematically included as a pendant. It may also be introduced into a part of the molecular structure of the additive such as an antioxidant, an acid scavenger and an ultraviolet light absorber.

(UV Absorber)

The cellulose ester film of the present invention may not contain a UV absorber, and when UV absorbing property is provided, a UV absorber may be contained. A UV absorber has a role to prevent deterioration of liquid crystals or a polarizing film when used outdoor, however, when the cellulose ester film of the present invention is used between a polarizing film and a liquid crystal cell as a polarizing plate protective film, a UV absorber may not be incorporated in order to have, for example, a higher transmittance of visible rays.

A UV absorber preferably has an excellent ability to absorb UV rays of which wavelength is not more than 370 nm, while the absorbance for visible rays with a wavelength of 400 nm or more is as small as possible, and the transmittance is preferably 50% or more. Specifically, the transmittance at the wavelength of 370 nm is preferably 10% or less and more preferably 5% or less. Examples of a UV absorber usable in the present invention include: oxybenzophenone, benzotriazole, salicylate ester, benzophenone, cyanoacrylate, triazine and a nickel complex. Of these, preferable compounds include benzotriazole because of little coloring. Examples of preferably usable UV absorber include: TINUVIN 109, TINUVIN 171, TINUVIN 326, TINUVIN 327 and TINUVIN 328 produced by Ciba Specialty Chemicals Inc. Since a low molecular weight UV absorber tends to deposit on the web or evaporate while the film is produced, like a plasticizer, the content is preferably 1-10% by weight.

In the present invention, a polymer UV absorber is preferably incorporated in the cellulose ester film since the polymer UV absorber is more difficult to deposit than the above mentioned low molecular weight UV absorber, whereby UV rays are thoroughly blocked without losing dimensional stability, retention of the UV absorber, anti-permeability, while preventing phase separation of the UV absorber in the film. As a polymer UV absorber usable in the present invention, the polymer UV absorbers disclosed in JP-A No. 6-148430 and polymers containing a UV absorbing monomer can be used without limitation.

It is preferable in the present invention that a UV absorbing copolymer (also referred to as a polymer UV absorber)

obtained from a UV absorbing monomer represented by Formula (21) is incorporated in the cellulose ester film.

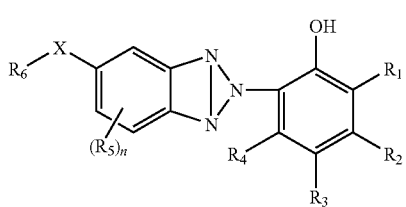

Formula (21)

(in the formula, n represents an integer of 0-3, $R_1$-$R_5$ each represent a hydrogen atom, a halogen atom or a substituent, X represents —COO—, $CONR_7$—, —OCO— or —$NR_7CO$—, $R_6$ and $R_7$ each represent a hydrogen atom, an alkyl group or an aryl group, provided that the group represented by $R_6$ contains a polymerizable group as a substructure)

In Formula (21), n represents an integer of 0-3, and when n is 2 or more, plural $R_5$ may be the same or different to each other and may be combined to form a 5-7 membered ring.

$R_1$-$R_5$ each represent a hydrogen atom, a halogen atom or a substituent. Examples of a halogen atom include: a fluorine atom, a chlorine atom, a bromine atom and an iodine atom. Of these, preferable is a fluorine atom or a chlorine atom. Examples of a substituent include: alkyl groups (for example, a methyl group, an ethyl group, an isopropyl group, a hydroxyethyl group, a methoxymethyl group, a trifluoromethyl group and a t-butyl group), alkenyl groups (for example, a vinyl group, an allyl group and a 3-butene-1-yl group), aryl groups (for example, a phenyl group, a naphthyl group, a p-tolyl group and a p-chlorophenyl group), heterocycle groups (for example, a pyridyl group, a benzimidazolyl group, a benzthiazolyl group and a benzoxazolyl group), alkoxy groups (for example, a methoxy group, an ethoxy group, an isopropoxy group and a n-butoxy group), aryloxy groups, (for example, a phenoxy group), heterocycleoxy groups (for example, a 1-phenyltetrazole-5-oxy group and a 2-tetrahydropyranyloxy group), acyloxy groups (for example, an acetoxy group, a pivaloyloxy group and a benzoyloxy group), acyl groups (for example, an acetyl group, a propanoyl group and a butyroyl group), alkoxycarbonyl groups (for example, a methoxycarbonyl group and an ethoxycarbonyl group), aryloxycarbonyl groups (for example, a phenoxycarbonyl group), carbamoyl groups (for example, a methylcarbamoyl group, an ethylcarbamoyl group and a dimethylcarbamoyl group), amino groups, alkylamino groups (for example, a methylamino group, an ethylamino group and a diethylamino group), anilino groups (for example, an anilino group and a N-methylanilino group), acylamino groups (for example, an acetylamino group and a propionylamino group), a hydroxyl group, cyano groups, nitro groups, sulfonamide groups (for example, a methanesulfonamide group and a benzenesulfonamide group), sulfamoylamino groups (for example, a dimethylsulfamoylamino group), sulfonyl groups (for example, a methanesulfonyl group, a butanesulfonyl group and a phenylsulfonyl group), sulfamoyl groups (for example, an ethylsulfamoyl group and a dimethylsulfamoyl group), sulfonylamino groups (for example, a methanesulfonylamino group and a benzenesulfonylamino group), ureido groups (for example, a 3-methylureido group, a 3,3-dimethylureido group and a 1,3-dimethylureido group), imide groups (for example, a phthalimide group), silyl groups (for example, a trimethylsilyl group, a triethylsilyl group and a t-butyldimethylsilyl group), alkylthio groups (for example, a methylthio group, an ethylthio group and an n-butylthio group), and arylthio groups (for example, a phenylthio group). Of these, preferable are, for example, alkyl groups and an aryl groups.

In Formula (21), the groups represented by $R_1$-$R_5$ each may be further substituted, if possible and neighboring groups of $R_1$-$R_4$ may be combined to form a 5-7 membered ring.

$R_6$ represents a hydrogen atom, an alkyl group, a cycloalkyl group, an alkenyl group or an alkynyl group. Examples of an alkyl group include: a methyl group, an ethyl group, a propyl group, an isopropyl group, an n-butyl group, an isobutyl group, a t-butyl group, an amyl group, an isoamyl group and a hexyl group. The above alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include: saturated cyclohydrocarbon groups such as a cyclopentyl group, a cyclohexyl group, a norbornyl group and an adamantyl group, which may be further substituted or may not be substituted.

Examples of an alkenyl group include: a vinyl group, an allyl group, 1-methyl-2-propenyl group, a 3-butenyl group, a 3-methyl-2 butenyl group and an oleyl group. Of these, preferable are a vinyl group or a 1-methyl-2-propenyl group.

Examples of an alkynyl group include: an ethynyl group, a butadiyl group, a propargyl group, a 1-methyl-2-propynyl group, a 2-butyny group, a 1,1-dimethyl-2-propynyl group. Of these, preferable are, for example, an ethynyl group and a propargyl group.

$R_7$ represents a hydrogen atom, an alkyl group and a cycloalkyl group. Examples of an alkyl group include: a methyl group, an ethyl group, a propyl group, an isopropyl group, a n-butyl group, an isobutyl group, a t-butyl group, an amyl group, an isoamyl group and a hexyl group. Each of these alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), anilino groups (for example, an anilino group and an N-methyl anilino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include saturated cyclic hydrocarbons, such as a cyclopentyl group, a cyclohexyl group, a norbornyl group, and an adamantyl group, which may be further substituted or may not be substituted.

In the present invention, the polymerizable group includes an unsaturated ethylenic polymerizable group or a bifunctional condensation-polymerizable group, and preferably an unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group and a vinyl ether group and preferably the vinyl group, the acryloyl group, the methacryloyl group, the acrylamido group and the methacrylamido group. To have a polymerizable group as a substructure means that the polymerizable groups are bonded directly or through a linking group of divalent or more. Examples of a linking group of divalent or more include: alkylene groups (such as a methylene group, a 1,2-ethylene group, a 1,3-propylene group, a 1,4-butylene group and a cyclohexane-1,4-diyl group); alkenylene groups (such as an ethene-1,2-diyl group and a butadiene-1,4-diyl group); alkynylene groups (such as an ethyne-1,2-diyl group, a butane-1,3-diyl-1,4-diyl); and hetero atom linking groups (an oxygen atom, a sulfur atom, a nitrogen atom, a silicon atom and a phosphor atom). Of these, preferable are, for example, an alkylene group and a hetero atom linking group. These groups may be combined to form a composite bonding group. The weight average molecular weight of the polymer derived from the UV absorbing monomer is 2,000-30,000, and preferably 5,000-20,000.

The weight average molecular weight of the UV absorbing copolymer can be controlled by known molecular weight controlling methods. For controlling the molecular weight, for example, a method can be applied in which a chain transfer agent such as carbon tetrachloride, laurylmercaptane or octyl thioglycolate is employed. The polymerization is usually performed at a temperature of from a room temperature to 130° C., and preferably 50-100° C.

The UV absorbing polymer employed in the present invention may be a homopolymer derived from a UV absorbing monomer or may be a copolymer derived from the UV absorbing monomer and another polymerizable monomer. Examples of the other monomer capable of polymerizing include unsaturated compounds, for example, styrene derivatives (such as styrene, α-methylstyrene, o-methylstyrene, m-methylstyrene, p-methylstyrene and vinylnephthalene); acrylate derivatives (such as methyl acrylate, ethyl acrylate, propyl acrylate, butyl acrylate, i-butyl acrylate, t-butyl acrylate, octyl acrylate, cyclohexyl acrylate and benzyl acrylate); methacrylate derivatives (such as methyl methacrylate, ethyl methacrylate, propyl methacrylate, butyl methacrylate, i-butyl methacrylate, t-butyl methacrylate, octyl methacrylate and cyclohexyl methacrylate); alkyl vinyl ethers (such as methyl vinyl ether, ethyl vinyl ether and butyl vinyl ether); alkyl vinyl esters (such as vinyl formate, vinyl acetate, vinyl butyrate, vinyl capronate and vinyl stearate); crotonic acid; maleic acid; fumaric acid; itaconic acid; acrylonitrile; methacrylonitrile; vinyl chloride; vinylidene chloride; acrylamide; and methacrylamide. Of these, for example, methyl acrylate, methyl methacrylate and vinyl acetate are preferred.

It is also preferable that the component other than the UV absorbing monomer in the polymer derived from the UV absorbing monomer contains a hydrophilic ethylenically unsaturated monomer.

As the hydrophilic ethylenically unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide, an N-substituted (meth)acrylamido such as N,N-dimethyl(meth)acrylate, N-vinylpyrrolidone and N-vinyloxazolidone are employable.

As the hydrophilic ethylenically unsaturated monomer, a (meth)acrylate having a hydroxyl group or a carboxyl group in the molecule thereof is preferable, and 2-hydroxyethyl methacrylate, 2-hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent. However, UV absorbing latex obtained via emulsion polymerization is not preferable to be used as an optical film.

The mixing ratio of the UV absorbing monomer, the polymerizable monomer capable of polymerizing with the UV absorbing monomer and the hydrophilic ethylenically unsaturated monomer is suitably determined considering the compatibility of the obtained UV absorbing copolymer with the other transparent polymer and the influence on the transparency and the mechanical strength of the optical compensating film.

The content of the UV absorbing monomer in the polymer derived from the UV absorbing monomer is preferably 1-70%, and more preferably 5-60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical compensating film is difficulty obtained sometimes since the compatibility of the polymer with another polymer is lowered. Also, the workability in the film forming process and productivity are reduced due to the decrease in solubility in the solvent.

The hydrophilic ethylenically unsaturated monomer is preferably contained in the UV absorbing copolymer in a ratio of from 0.1 to 50% by weight. When the content is less than 0.1%, the improvement effect on the compatibility of the hydrophilic ethylenically unsaturated monomer cannot be obtained and when the content is more than 50% by weight, the isolation and purification of the copolymer becomes impossible. More preferable content of the hydrophilic ethylenically unsaturated monomer is from 0.5 to 20% by weight. When the hydrophilic group is substituted to the UV absorbing monomer itself, it is preferable that the total content of the hydrophilic UV absorbing monomer and the hydrophilic ethylenically unsaturated monomer is within the above-mentioned range.

For satisfying the content of the UV absorbing monomer and the hydrophilic monomer, it is preferable that the an ethylenically unsaturated monomer having no hydrophilicity is further copolymerized additionally to the above two monomers.

Two or more kinds of each of the UV absorbing monomer and hydrophilic or non-hydrophilic ethylenically unsaturated monomer may be mixed and copolymerized.

Typical examples of the UV absorbing monomer to be preferably employed in the present invention are listed below, but the monomer is not limited thereto.

MUV-1

MUV-2

MUV-3

MUV-4

-continued

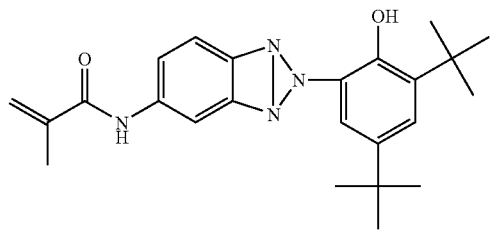

MUV-5

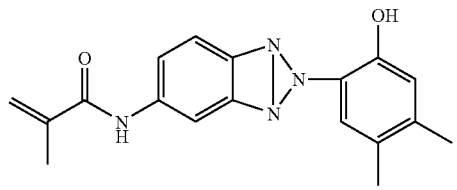

MUV-6

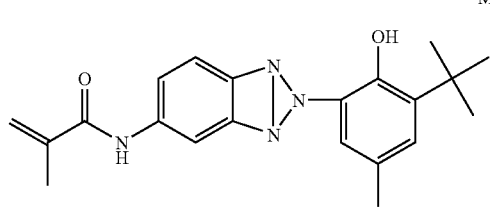

MUV-7

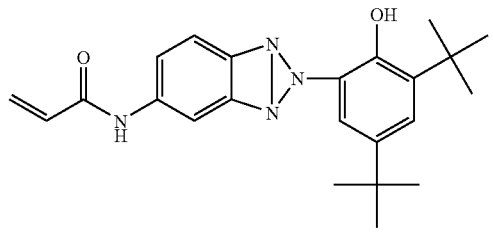

MUV-8

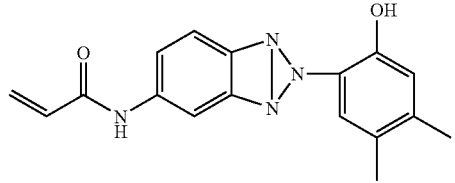

MUV-9

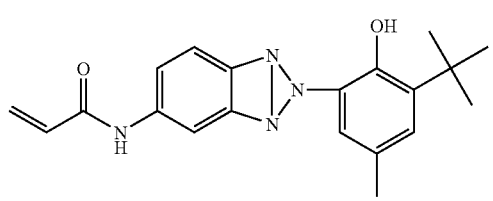

MUV-10

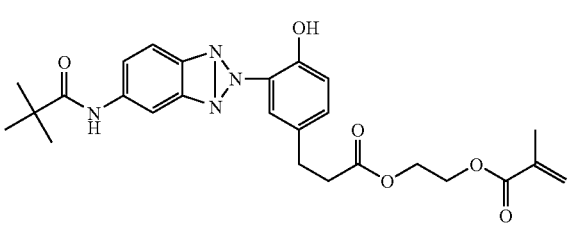

MUV-11

MUV-12
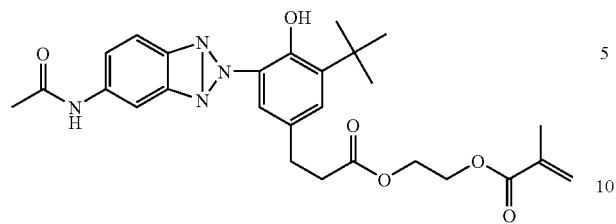
MUV-13
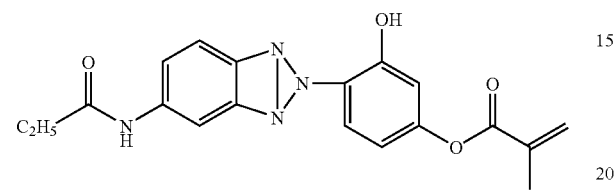
MUV-14
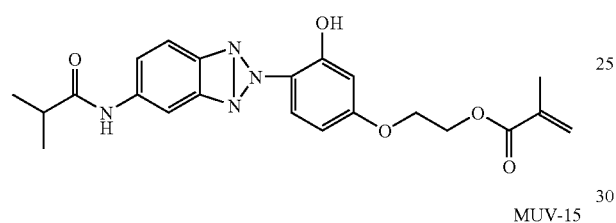
MUV-15
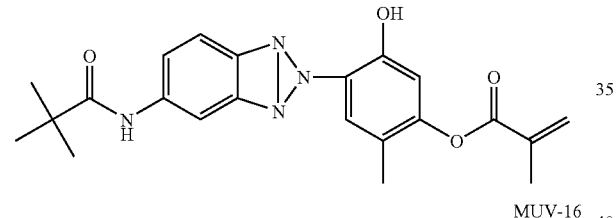
MUV-16
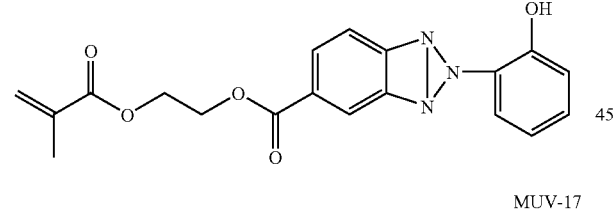
MUV-17
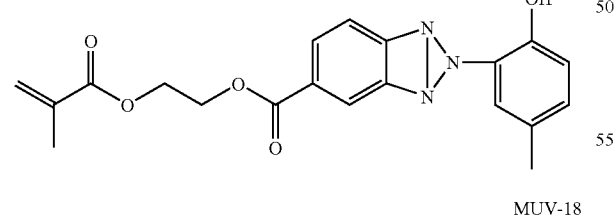
MUV-18
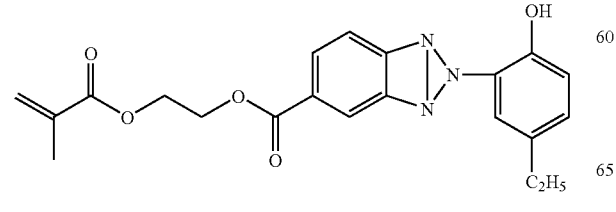
MUV-19
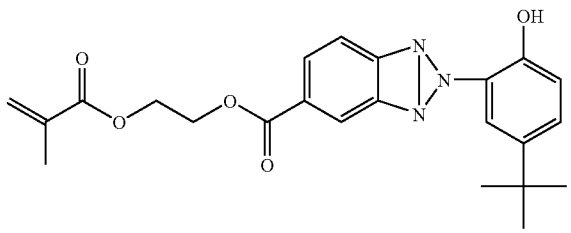
MUV-20
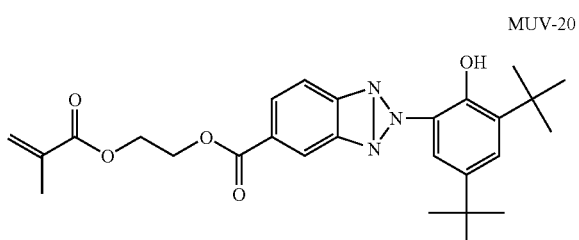
MUV-21
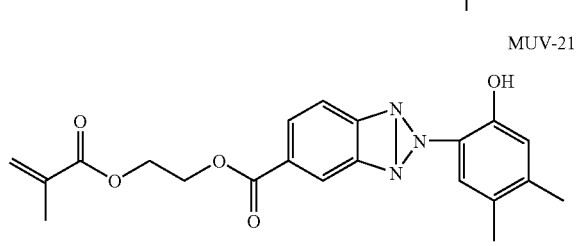
MUV-22
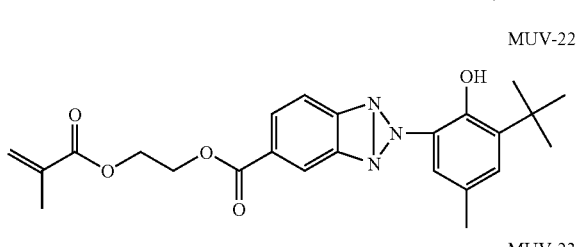
MUV-23
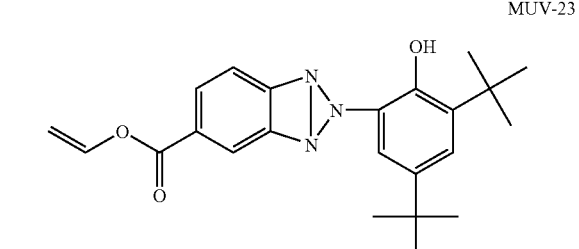
MUV-24
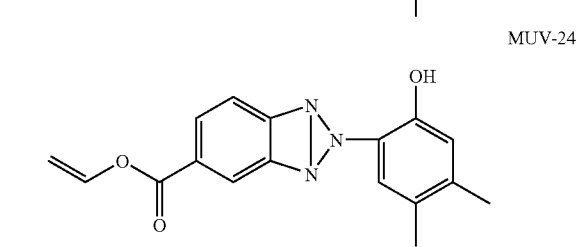
MUV-25
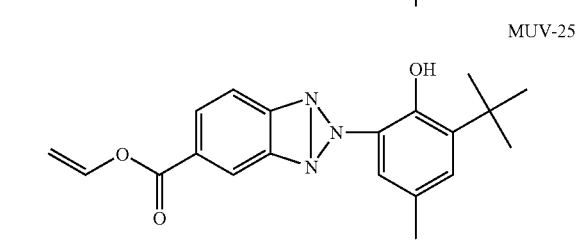

-continued
MUV-26
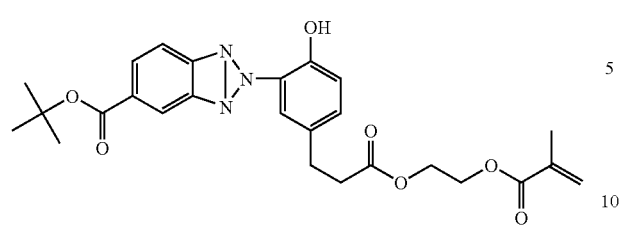
MUV-27
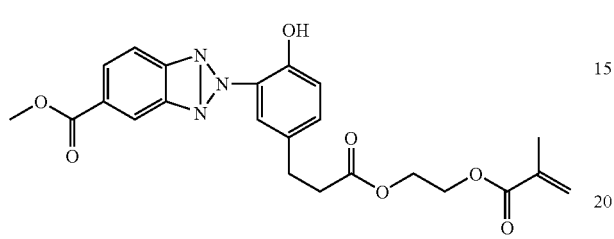
MUV-28
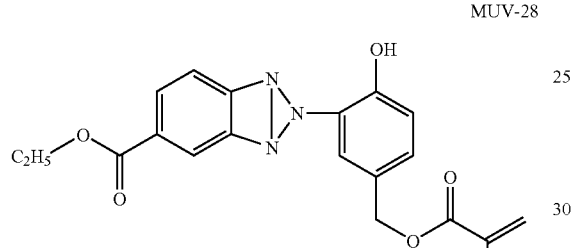
MUV-29
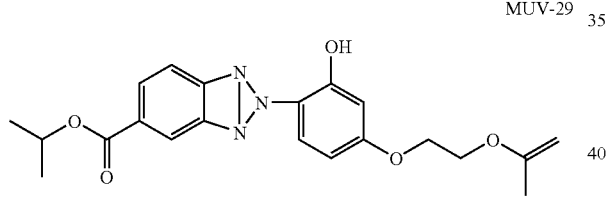
MUV-30
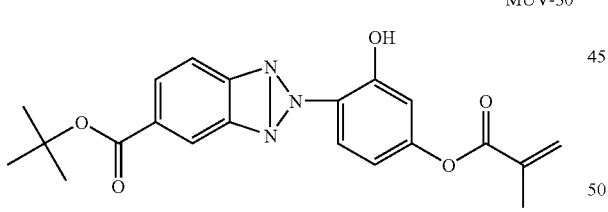
MUV-31
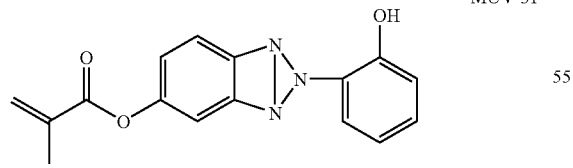
MUV-32
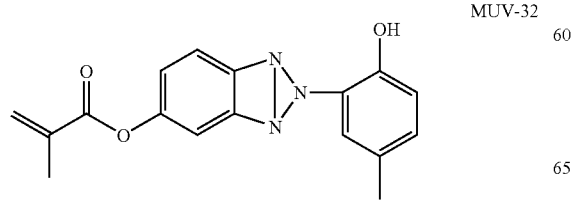
-continued
MUV-33
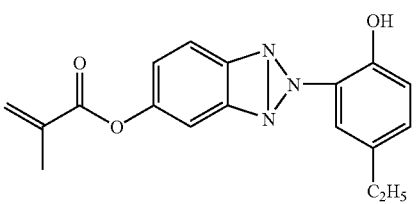
MUV-34
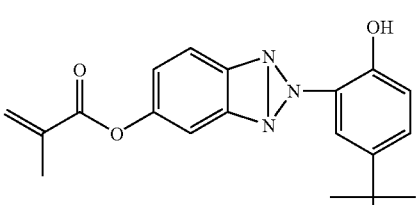
MUV-35
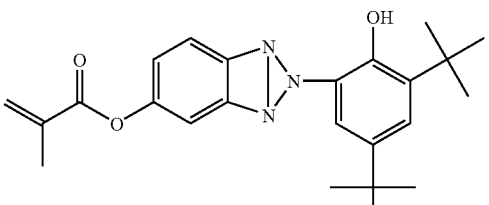
MUV-36
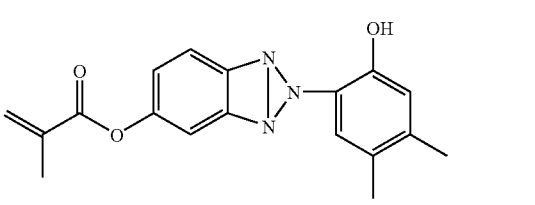
MUV-37
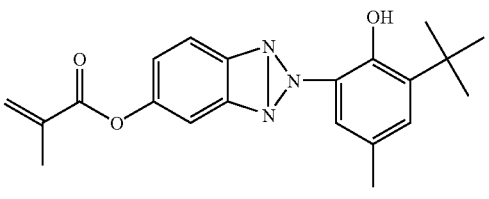
MUV-38
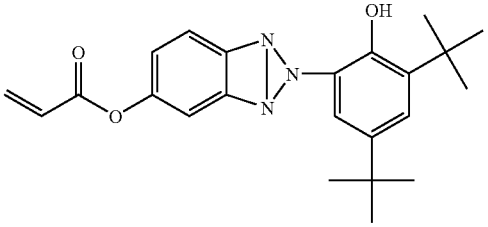
MUV-39
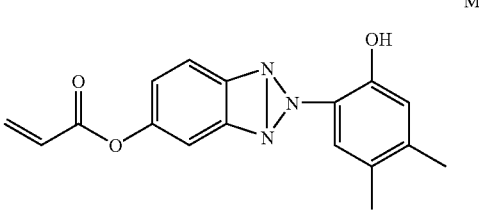

MUV-40
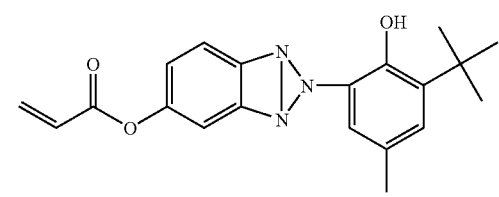
MUV-41
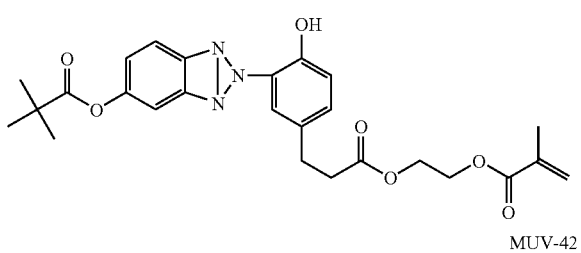
MUV-42
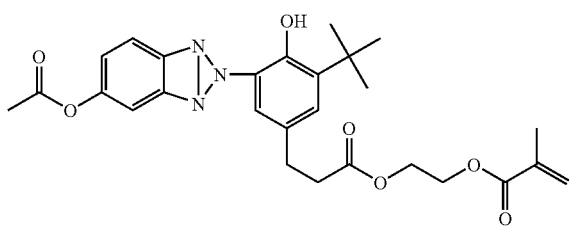
MUV-43
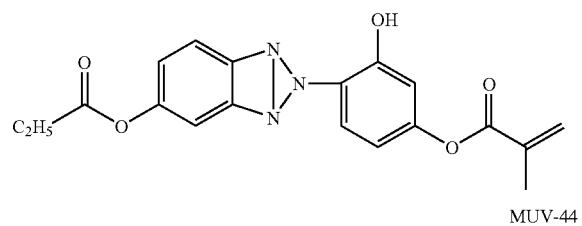
MUV-44
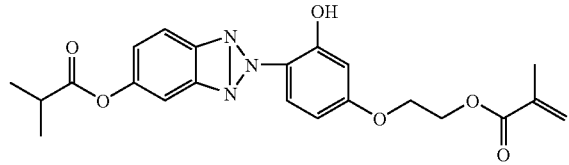
MUV-45
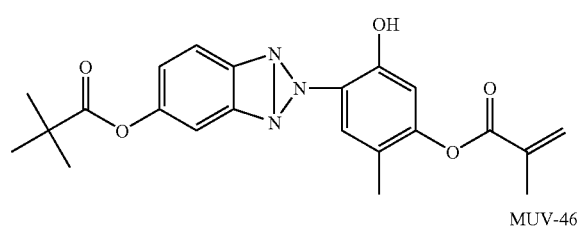
MUV-46
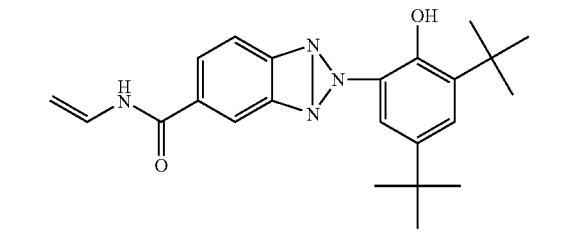
MUV-47
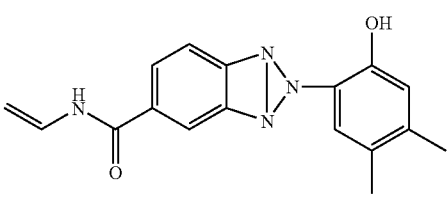
MUV-48
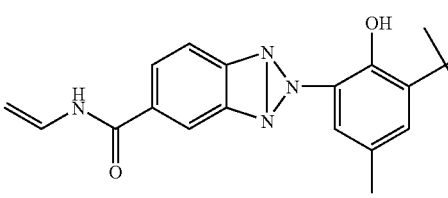
MUV-49
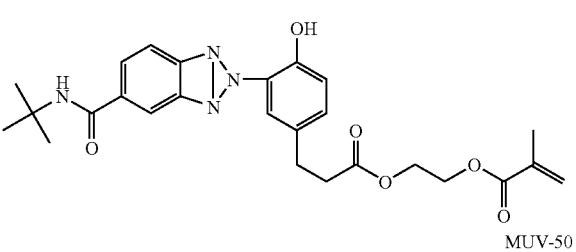
MUV-50
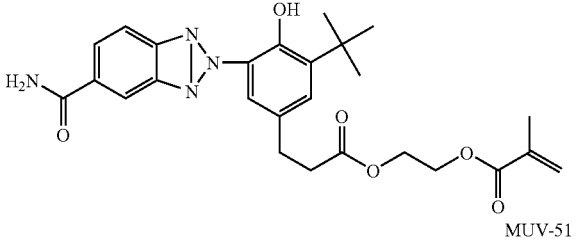
MUV-51
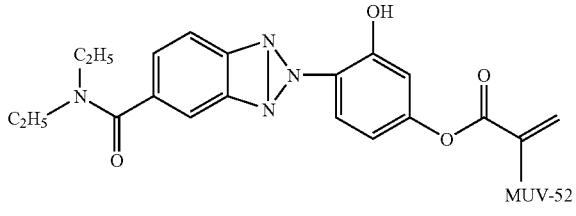
MUV-52
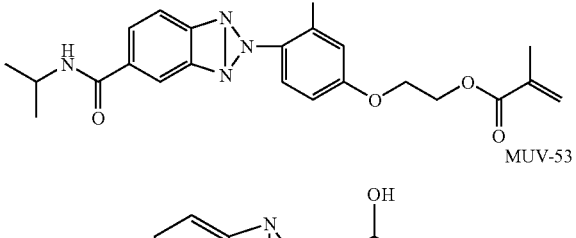
MUV-53
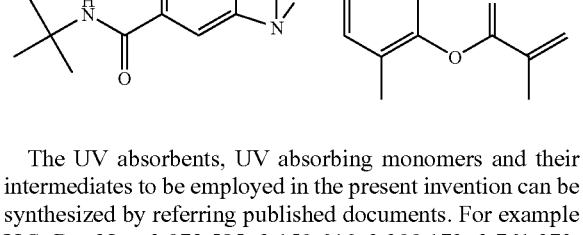
The UV absorbents, UV absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, JP-A Nos. 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the present invention can be employed together with a low or high molecular weight compound or an inorganic compound according to necessity on the occasion of mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

The ultraviolet light absorber and the ultraviolet light absorbing polymer used in this invention may be added to a cellulose ester film by being included in the cellulose ester film or by being coated on the cellulose ester film. In the case of inclusion in the cellulose ester film, direct addition and in-line addition are favorable. The in-line addition is a method in which the ultraviolet light absorber and the ultraviolet light absorbing polymer are dissolved beforehand in an organic solvent (such as methanol, ethanol, methylene chloride) and dissolved, and then added to the dope composition using an in-line mixer or the like.

The amount of the ultraviolet light absorber and the ultraviolet light absorbing polymer used in this invention is not fixed and depends of type of compound and the conditions for use. However, in the case of the ultraviolet light absorber, for 1 $m^2$ of optical film, the amount is preferably in the range of 0.2-3.0 g, more preferably 0.4-2.0 g and 0.5-1.5 g is particularly preferable. In the case of the ultraviolet light absorbing polymer, for 1 $m^2$ of optical film, it is preferably in the range of 0.6-9.0 g, more preferably 1.2-6.0 g and even more preferably 1.5-3.0 g.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1% is particularly preferable.

As UV absorbent monomers available on the market, 1-(2-benzotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene RUVA-93, each manufactured by Ootsuka Chemical Co., Ltd., and similar compounds are employable in the present invention. They are preferably employed solely or in a state of polymer or copolymer but not limited thereto. For example, a polymer UV absorbent available on the market PUVA-30M, manufactured by Ootsuka Chemical Co., Ltd., is preferably employed. The UV absorbent may be used in combination of two or more kinds thereof. The method for adding the ultraviolet light absorber to the dope may be by dissolving the ultraviolet light absorber in an organic solvent such as alcohol, methyl chloride, dioxolane or methyl acetate, and then adding it to the dope, or alternatively the ultraviolet light absorber may be directly added to the dope composition.

An antioxidant may be included in the cellulose ester film of this invention. For example as described in JP-A No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose ester.

In the present invention, it is preferable that a particle matting agent is included in the cellulose ester film, and examples of the particle matting agent include particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked particles of high molecular weigh polymers Of these, silicon dioxide is preferable in view of reduced haze in the film. The average particle diameter of the secondary particles from among the particles is preferably in the range of 0.01-1.0 μm and the amount of these particles included is preferably in the range of 0.005-0.3 percent by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form unevenness of 0.01-1.0 μm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

The method to produce the polarizing plate protective film of the present invention will now be described. The cellulose ester film of the present invention may be prepared via a solvent-casting method or a melt-casting method, however, specifically preferable is a solvent-casting method.

The method for preparing the cellulose ester dope of the present invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in JP-A No. 9-95544, No. 9-95557, or No. 9-95538; and various dissolution methods performed under high pressure as disclosed in JP-A No. 11-21379. After dissolution, the dope is filtered with a filtering material and then defoamed and sent to the next step. The cellulose ester concentration in the dope is between 10 and 35 percent by weight, and more preferably between 15 and 25 percent. In order to include the polymer useful in the present invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetate, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. However, there is a tendency for non-chlorine organic solvents to be more preferable based on recent environmental issues. Lower alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of the present invention is a mixture of a good solvent and a poor solvent for cellulose ester in view of production efficiency, and a favorable range of proportion for mixing the good solvent and the poor solvent is 70-98 percent by weight of the good solvent and 2-30 percent by weight of the poor solvent. A good solvent in the present invention is defined as a solvent that will dissolve the cellulose ester that is used on its own while a poor solvent is one that does not dissolve the cellulose ester on its own. The poor solvent used with the dope of the present invention is not particularly limited, but examples of the solvent that is preferably used include methanol, ethanol, n-butanol, cyclohexane, acetone, cyclohexanone and the like. Selection of the organic solvent for the polymer used in the present invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container may be used, which is capable of withstanding a prescribed pressure, and which can be heated under pressure and in which stirring can be performed.

In the present invention, by filtering the cellulose ester dope, foreign matter, particularly foreign matter that can be mistakenly identified as images in the liquid crystal image display, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of the present invention is preferably in the range not more than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of the present invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of acetylation in raw material for the cellulose ester, sometimes causes foreign material obstruction (sometimes called luminance point hereinafter). A polarizer was placed between two cellulose ester film samples arranged in a crossed state (crossed Nicol state). The luminance point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and luminance appears as spots. Actual damage when the cellulose ester film is used as a liquid crystal image display is large to the extent that that the diameter of the luminance point is large, and the diameter of the luminance point should be no greater than 50 μm, preferably no greater than 10 μm, and still more preferably no greater than 8 μm. It is to be noted that the diameter of the luminance point is the diameter that is measured when the luminance point is approximated to a perfect circle. If the diameter of the luminance point defined here is 400/cm² or less, there are no problems in terms of practical use, the diameter is preferably 300/cm² or less, and more preferably 200/cm² or less. In order to reduce the amount and size of these luminance spots, it is necessary to properly filter fine foreign material. Also, as described in JP-A No. 2000-137115, the method in which a crushed cellulose ester film which has been formed are added again in the proportion of the dope and used as the materials for the cellulose ester and the additives is preferably used as the luminance spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in the present invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 180 percent by weight. The residual solvent amount in the present invention when the film is peeled is preferably 20-40 percent by weight or 60-150 percent by weight, and 80-140 percent by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in the present invention is expressed by the formula below.

$$\text{Residual solvent amount (percent by weight)} = \{(M-N)/N\} \times 100$$

In the formula, M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0 percent by weight or less, and more preferably 1.0 percent by weight or less, and still more preferably 0.5 percent by weight or less.

In the drying process, the web is dried by employing a method in which the web is conveyed through rolls placed in a staggered way and drying device or a tenter drying device in which the web is conveyed while holding both edges of the web using clips and maintaining web width or slightly stretching the web in the width direction. In the present invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C. A longer drying time at a higher temperature is preferable to decrease Ro and Rt.

The cellulose ester film of the present invention is preferably stretched by 1% both in MD (the film transport direction) and TD (the transverse direction orthogonal to MD), in order to obtain sufficient flatness of the film. For obtaining a small in-plane retardation values, the stretching ratios in MD and in TD are preferably similar, however, the ratios may be different, provided that the total stretching ratio in the MD and TD directions is controlled small, in order to have smaller Rt. Also, in order to have a smaller Rt, every stretching is preferably carried out at a higher temperature.

The stretching operation may be performed in a plurality of stages and the web is preferably stretched biaxially in the casting direction and the width direction. Furthermore, biaxial stretching may be performed simultaneously or stepwise. In this case stepwise means that, for example, stretching in different directions can be performed sequentially, or stretching in the same direction can be performed in many stages and then the stretching in the different direction is added at the end of any of those stages.

The width of the cellulose ester film is not less than 1.3 m, and preferably in the range of 1.4-4 m in view of productivity in that a large liquid crystal display is obtained. The length of the film wound in a roll is preferably 100-10000 m and more preferably 500-6000 m.

The cellulose ester film of the present invention is suitable to prepare a polarizing plate employed in the In-Plane-Switching mode type (also called an IPS mode type) liquid crystal display. Retardation values Ro and Rt are preferably in the range of 0 nm≦Ro≦10 nm and −30 nm≦Rt≦20 nm, but are more preferably 0 nm≦Ro≦5 nm and −20 nm≦Rt≦3 nm. By controlling the retardation values Ro and Rt within 0≦Ro≦5 nm and −20≦Rt≦3 nm, obtained is a cellulose ester film which, further, tends not to be suffered from rupture problem and provides excellent visibility. The Ro and Rt values are specifically preferably $0 \leqq Ro \leqq 5$ nm and $-20 \leqq Rt \leqq 0$ nm. Since $nx \geqq ny$ in Formula (a), Ro never has a negative value.

$$Ro=(nx-ny) \times d \qquad \text{Formula (a)}$$

$$Rt=\{(nx+ny)/2-nz\} \times d \qquad \text{Formula (b)}$$

wherein Ro represents the in-plane retardation value of the film; Rt represents the retardation value in the film thickness direction; nx represents the in-plane refractive index of the film in the advanced axis direction; nz represents the refractive index in the film thickness direction (each of the refractive indices determined at a wavelength of 590 nm); and d represents thickness (nm) of the film.

It is possible to determine retardation values Ro and Rt employing an automatic double refractometer. For example, determination is performed at 23° C. and 55% relative humidity employing KOBRA-21 ADH (produced by Oji Scientific Instruments).

Further, any variation of Ro in the lateral or longitudinal direction of film is preferably within ±5 nm, is more preferably within ±3 nm, is still more preferably within ±1 nm, but is most preferably within ±0.3 nm.

Further, the variation of Rt in the lateral or longitudinal direction of film is preferably within ±5 nm, is more preferably within ±3 nm, but is most preferably within ±1 nm.

The variation of Ro and Rt is preferably within the above range over the total length of a long-length film, and also between successive rolls.

The variation of Rt prior to and after heat treatment for 300 hours at 80° C. and 90% relative humidity is preferably within ±10 nm, is more preferably within ±5 nm, but is most preferably within ±1 nm.

(Wavelength Dispersion Characteristic of Ro)
(Wavelength Dispersion Characteristic)

By employing an automatic birefringence analyzer KOBURA-21 ADH (produced by Oji Scientific Instruments), in-plane retardation values at wavelengths of 450, 590, and 650 nm were determined at 23° C. and 55% Relative humidity. Each of the recorded values was designated as R450, R590, and R650, respectively.

Preferred ranges are: 0.7<R450/R590<1.5 and 0.7<R650/R590<1.5, while more preferred ranges are: 0.8<R450/R590<1.0, and 1.0<R650/R590<1.3.

(Stability of Rt Against Humidity)

In regard to Rt stability in humility, any variation of Rt between 20% and 80% relative humidity at 23° C. is preferably at most 30 nm, is more preferably at most 20 nm, but is most preferably at most 10 nm.

(Stability of Rt Against Temperature)

The variation of Rt between 10-60° C. is preferably ±10 nm while utilizing the value determined at 20° C. and 55% relative humidly as a standard, is more preferably ±5 nm, but is most preferably ±1 nm.

(Stability of Ro Against Temperature)

The variation of Ro between 10-60° C. is preferably 10 nm while utilizing the value determined at 20° C. and 55% relative humidly as a standard, is more preferably ±5 nm, but is most preferably ±1 nm.

(Orientation Angle)

When Ro is at most 5 nm, particularly 0-1 nm, the orientation angle is not particularly limited. However, the orientations angle is commonly within 10 degrees against the lateral or longitudinal direction of long-lengths of film, is preferably within 5 degrees, more preferably within ±1 degree, but is most preferably within ±0.1 degree.

Orientation angle, as described herein, refers to the delayed phase axis direction (the angle to the traverse direction during film casting) on the plane of cellulose ester film. It is possible to determine the orientation angle employing an automatic birefringence analyzer KOBURA-21 ADH (produced by Oji Scientific Instruments).

(Photoelastic Coefficient)

The photoelastic coefficient of the cellulose ester film employed in the present invention is preferably $1 \times 10^{-14}$-$1 \times 10^{-9}$ $Pa^{-1}$, but is more preferably $5 \times 10^{-12}$-$2 \times 10^{-11}$. It is possible to determine the photoelastic coefficient under conditions of 23° C. and 55% relative humidity, employing an ELLIPSOMETER M-150 produced by JASCO Corp. Commercial TAC films exhibit a photoelastic coefficient of approximately $1 \times 10^{-11}$ $Pa^{-1}$.

(Dimensional Stability)

Dimensional variation in the longitudinal and traverse directions of long lengths of film prior to and after allowing the film to stand at 90° C. of no humidity for 100 hours is preferably within ±0.5%, is more preferably within ±0.3%, but is most preferably ±0.1%. It is preferable that the film exhibits the same variation as above even after 500 hours of the above treatment.

Dimensional variation in the longitudinal and lateral directions of a long length of film prior to and after allowing the film to stand at 60° C. and relative humidity 90% for 100 hours is preferably within ±1%, is more preferably within ±1%, is still more preferably within 0.3%, is yet more preferably within 0.3%, but is most preferably ±0.1%. It is preferable that the film exhibits the same variation ranges as above even after 500 hours of the above treatment.

The above dimensional variation ratio was determined as follows. After re-humidifying a sample film in a room maintained at temperature 23° C. and 55% relative humidity for 4 hours, markings at an interval of about 10 cm in the lateral and longitudinal directions were made employing a common cutter, and the distance (L1) between the markings was measured. Subsequently, the resulting film was allowed to stand in an incubator maintained at 60° C. and 90% relative humidity for 24 hours. After rehumidifying the film in the room maintained at 23° C. and 55% relative humidity, the distance (L2) between the markings was recorded. The dimensional variation ratio was evaluated based on the following formula.

$$\text{Dimensional variation ratio (\%)}=\{(L2-L1)/L1\} \times 100$$

The dimensional variation ratio was also determined in the same manner as above, except that the storage conditions of 60° C. and 90% relative humidity for 24 hours were changed to those of 90° C. and no humidity for 24 hours.

(Water-Vapor Permeability)

Water-vapor permeability at 40° C. and 90% relative humidity is preferably 1-1,500 $g/m^2 \cdot 24$ hours, is more preferably 5-1,200 $g/m^2 \cdot 24$ hour, and is still more preferably 10-1,000 $g/m^2 \cdot 24$ hours.

(Light Transmittance)

The transmittance at 500 nm of the cellulose ester film of the present invention is preferably 85-100%, is more preferably 90-100%, but is most preferably 92-100%. Further, transmittance at 400 nm is preferably 40-100%, is more preferably 50-100%, but is most preferably 60-100%. (Determination of Light Transmittance) Transmittance T was determined as follows. Spectral transmittance $\tau$ ($\lambda$) in the wavelength range of 350-700 nm of each sample was recorded at an interval of 10 nm, employing a spectrophotometer U-3400 (produced by Hitachi, Ltd.), whereby the transmittance values at specific wavelengths were obtained.

(Absorbability of Ultraviolet Radiation)

Light transmittance at 380 nm of a cellulose ester film incorporating no UV absorbers is preferably at least 50%, is more preferably at least 80%, but is most preferably at least 90%. When UV absorbers are incorporated, transmittance at 380 nm is preferably less than 50%, is more preferably 0-15%, is still more preferably 0-10%, but is most preferably less than 5%. It is possible to readily control the absorbability of ultraviolet radiation by varying the type and addition amount of additives such as UV absorbers, plasticizers, resins, or minute particles.

In the same manner as above, it is also possible to determine the absorbability of ultraviolet radiation, employing a spectrophotometer, U-3400 (produced by Hitachi. Ltd.).

(Haze)

The haze of the cellulose ester film of the present invention, when determined by stacking up three sheets, is preferably at most 5%, is more preferably at most 2%, but is most preferably at most 1%. It is possible to determine the haze value based on JIS K 6714, employing a haze meter (1001 Type DP, produced by Nippon Denshoku Industries Co., Ltd.).

(Elastic Modulus)

The elastic modulus of the cellulose ester film of the present invention is preferably 1-6 GPa, but is more preferably 2-5 GPa.

Elastic moduli in the traverse direction (TD) and manufacturing direction (MD) of long-lengths of film may be the same or different. It is preferable that $0.5 \leq$ MD elastic modulus/TD elastic modulus $\leq 2$; it is more preferable that $0.7 \leq$ MD elastic modulus/TD elastic modulus $\leq 1.4$; but is still more preferable that $0.9 \leq$ MD elastic modulus/TD elastic modulus $\leq 1.1$.

(Elongation at Break)

The elongation at break of the cellulose ester film of the present invention is preferably in the range of 10-90% at 23° C. and 55% relative humility, but is more preferably in the range of 20-80%. Further, the break stress is preferably in the range of 50-200 Mpa.

(Elastic Modulus, Elongation at Break, and Break Stress of Films) Measurement was carried out at 23° C. and 55% relative humidity according to the method described in JIS K 7127. The above values were determined as follows. A sample sheet was cut into 10 mm wide and 130 mm long strips.

Subsequently, tests were carried out in such a manner that at an appropriate temperature, the distance between chucks was set at 100 mm and pulling was carried out at a rate of 100 mm/minute.

(Tear Strength)

The tear strength of the cellulose ester film of the present invention is preferably 1-50 g, is more preferably 3-30 g, but is most preferably 5-25 g. It is possible to determine the tear strength as follows. After rehumidifying a film sheet at 23° C. and 55% relative humidity for 24 hours, the resulting sheet is cut into strips of 50 mm wide×64 mm, and it is possible to measure the tear strength of the strip based on ISO 6383/2-1983.

The range is preferably 0.5<Htd/Hmd<2, but is more preferably 0.7<Htd/Hmd<1.3, wherein Htd represents the tear strength in the traverse direction (TD direction) and Hmd represents the tear strength in the manufacturing direction (MD direction). When cellulose ester film is stretched in the traverse direction, it is possible to control the ratio of tear strength of the film in the manufacturing direction (hereinafter referred to as the MD direction) employing the stretching direction, the stretching factor, and the stretching temperature.

(Contact Angle)

When the cellulose ester film of the present invention is employed as a polarizing plate protective film, in order to enhance adhesion properties to the polarizer, an alkali saponification treatment is occasionally carried out. It is preferable that a film which has been subjected to the alkali treatment is adhered onto a polarizer employing an aqueous polyvinyl alcohol solution as an adhesive. The contact angle of pure water on the surface of the film prior to saponification is preferably 40-80 degrees, but is more preferably 50-70 degrees. The contact angle after saponification treatment becomes preferably at most 30 degrees, but becomes more preferably 5-25 degrees. The contact angle on both surfaces of the film may be the same or slightly different. For example, it is possible that the content of additives in the surface which is brought into contact with a casting support (being a metal drum or belt) of additives is varied from the opposite side, whereby it is possible to differ the contact angle on both sides. It is possible to determine the surface which is to face the polarizer, based on the yield of the polarizing plate production, curling of the finished polarizing plates, and coatability of functional layers provided onto the cellulose ester film.

(Contact Angle after Saponification)

A sample was treated with 2.5 N NaOH at 50° C. for 2.5 minutes, and subsequently washed with pure water for 2.5 minutes. After the above treatment, the sample was rehumidified at 23° C. and 55% relative humidity for 24 hours, and the contact angle was determined employing a contact angle meter, Type CA-D, produced by Kyowa Interface Science Co., Ltd.

(Dissolution into a Saponification Solution)

When a large amount of additives in the film and their decomposition products by an alkali saponification is eluted, the saponification solution is stained and problems result due to foreign matter. Consequently, it is preferable to keep the elution as little as possible. Generally, it is possible to decrease the elution amount by reducing low molecular weight components or employing additives which exhibit excellent compatibility with cellulose ester. Additives, which hardly result in bleeding-out during high temperature processing or high temperate and high humidity processing, are preferred since they hardly elute into the saponification solution.

(Curling)

Curling of cellulose ester films in the longitudinal or traverse direction is preferably in the range of −20 to 20 l/m, is more preferably in the range of −15 to 15 l/m, but is most preferably in the range of −10 to 10 l/m.

The above curling is determined as follows. After allowing a film sheet to stand at 25° C. and 55% relative humidity for 24 hours, the resulting film sheet is cut into strips of 50 mm×2 mm. The strips are rehumidified at 23° C. and 55% relative humidity for 24 hours, and then the curling value of each of film strips is determined employing a radius of curvature. The numerical curl value is determined based on Method "A" of JIS K 7619.

The curling value is expressed by 1/R, where R represents the radius of curvature and meter is employed as the unit.

It is possible to determine adhesion of a polarizer to any of the sides of a cellulose ester film based on curling of the polarizing protective film employed on the opposite side and the entire polarizing plate including, if any, a hard coat layer, an antiglare layer, an antireflection layer, an optical anisotropic layer, a light scattering layer or a brightness enhancing film, and productivity of the polarizing plates.

(Water Absorption Ratio)

When a cellulose ester film is employed as a polarizing plate protective film, its water absorption ratio is preferably 1-5%. When the water absorption ratio is at least 1%, a polarizer adhered onto a protective film is readily dried during preparation of a polarizing plate, while when it is less than 5%, the resulting polarizing plate exhibits excellent durability.

(Measurement Method of the Water Absorption Ratio) A sample is cut to 10 cm×10 cm, and immersed into 23° C. water for 24 hours. After removal from the water, water droplets on both sides are immediately wiped off by using a filter paper and the weight is recorded and designated as W1. Subsequently, after rehumidifying the above film at 23° C. and 55% relative humidity for 24 hours, the resulting weight is recorded and designated as W0. Thus, the water absorption ratio during the immersion in water for 24 hours is calculated based on the following formula, employing each of the recorded values.

$$\text{Water absorption ratio (\%)} = \{(W1-W0)/W0\} \times 100$$

(Moisture Regain)

When a cellulose ester film is employed as a polarizing plate protective film, its moisture regain is preferably 1-4.5%. The moisture regain of at least 1% results in desired drying properties when a polarizer is adhered to a protective film and dried during preparation of a polarizing plate, while the moisture regain of less than 4.5% results in excellent durability of the polarizing plate.

(Measurement Method of Moisture Regain)

A sample is cut to 10 cm×10 cm, and rehumidified at 23° C. and 80% relative humidity for 48 hours. Thereafter, the weight is recorded and designated as W3. Subsequently, after drying the above film at 120° C. for 45 minutes, the resulting weight is recorded and designated as W2. Thus, the moisture regain is calculated based on the following formula, employing each of the recorded values.

$$\text{Moisture regain (\%)} = \{(W3-W2)/W2\} \times 100$$

(Layer Thickness)

It is preferable that the cellulose ester film is thin, because the resulting polarizing plate is also thin, and this contributes to easily produce a thin liquid crystal display. However if the film is too thin, transparency and tear strength deteriorate. The thickness of the cellulose ester film that achieves a balance between the two is preferably 10-100 μm, more preferably 10-80 μm and specifically preferably 10-70 μm. The variations in the thickness in the lateral direction and in the longitudinal direction are preferably ±5 μm, more preferably ±3 μm, still more preferably ±1 μm, further more preferably ±0.5 μm and specifically preferably ±0.1 μm, in an average thickness.

Layer thickness variation refers to the difference between the maximum value and the average value, or between the minimum value and the average value, wherein the average value is determined in such a manner that after rehumidifying a sample film at 23° C. and 55% RH for 24 hours, the thickness is determined at intervals of 10 mm, and then averaged.

(Surface Roughness (Ra) of Film)

(Center Line Mean Roughness (Ra) of Cellulose Ester Film)

When a cellulose ester film is employed as an LCD member, to minimize light leakage, a high degree of flatness is required. The center line mean roughness (Ra) is the value specified in JIS B 0601. Examples of the measurement methods include a needle contact method and an optical method.

Center line mean roughness (Ra) of the cellulose ester film of the present invention is preferably at most 20 nm, is more preferably at most 10 nm, but is most preferably at most 3 nm. It is possible to determine the center line mean roughness Ra employing a non-contact surface fine structure meter WYKO NT-2000.

(Image Clarity)

It is preferable that the image clarity of cellulose ester films is high. The above image clarity is defined in JIS K 7105. When determined employing a 1 mm slit, at least 90% is preferred, at least 95% is more preferred, but at least 99% is most preferred.

It is preferable that the cellulose ester film of the present invention results in minimal foreign matter bright spots. Foreign matter bright spots, as described herein, refer to the following type of spots. A cellulose ester film is placed between two polarizing plates arranged at right angles (crossed Nicols) and light is exposed on one side while is viewed from the other side. The foreign matter bright spots are those which are seen due to leakage of light from the light source. During this operation, a polarizing plate, which is employed for evaluation, is composed of a protective film which results in no foreign matter bright spots, whereby a glass plate is preferably employed to protect the polarizers. It is assumed that one of the causes of foreign matter bright spots is the presence of cellulose, incorporated in cellulose ester, which has undergone no acetylation. It is possible to reduce foreign matter bright spots by employing cellulose ester incorporating minimal foreign matter and filtering the cellulose ester solution. Further, as the film thickness decreases, the number of foreign matter bright spots per unit area tends to decrease. As the content of cellulose ester incorporated in films decreases, foreign matter bright spots also tends to decrease.

The number of foreign matter bright spots at a diameter of at least 0.01 mm is preferably at most $200/cm^2$, is more preferably at most $100/cm^2$, is still more preferably at most $50/cm^2$, is yet more preferably at most $10/cm^2$, but is most preferably $0/cm^2$. Further, the number of foreign matter bright spots at a dimer of 0.005-0.01 mm is preferably at most $200/cm^2$, is more preferably at most $100/cm^2$, is still more preferably $50/cm^2$, is yet more preferably $30/cm^2$, is further more preferably at most $10/cm^2$, but is most preferably $0/cm^2$.

(Determination of Foreign Matter Bright Spots)

A sample was interposed between two polarizers arranged at right angles (crossed Nicols) and light was exposed onto the exterior side of a polarizing plate. Subsequently, the other side of the polarizing plate was observed via a microscope (at a factor of 30 in terms of transmission light source) and the number of visible white spots per 25 $mm^2$ was recorded. Determination was conducted for 10 areas and the number of foreign matter bright spots for a total area of 250 $mm^2$ was recorded, and then the number of foreign matter bright spots/ $cm^2$ was calculated and employed for evaluation.

(Distribution of Additives in the Thickness Direction)

Additives such as plasticizers, resins, or UV absorbers may be incorporated uniformly or non-uniformly through the thickness direction of the film. For example, it is possible to decrease the content of plasticizers in the surface to 50-99.9% with respect to the average content of the plasticizers through the overall thickness, and it is also possible to increase the content of the plasticizes to 100.1-150% in the surface. An example case is that the concentration of additives near the surface is decreased by scattering them near the surface due to an increase in drying temperature. An example is that a cast film is peeled under drying condition to result in non-uniform content of residual solvents or non-uniform solvent compositions and subsequently the film is dried whereby the concentration distribution results due to migration and diffusion of additives through the thickness. The degree of distribution varies depending on additives. Further, it is possible to provide a layer incorporating additives in differing amounts on the surface via successive casting or co-casting. When additives intentionally or unintentionally results in a content distribution through the thickness, it is possible to determine the side onto which a functional layer is applied or to which a polarizer is adhered, upon considering the productivity of each of the converting processes and post processes.

It is preferable that the cellulose ester film of the present invention is employed as a liquid crystal display member due to its high water-vapor permeability and dimensional stability. The liquid crystal display member, as described herein, refers to a member employed in liquid crystal display units. Examples include a polarizing plate, a polarizing plate protective film, a retardation plate, a reflection plate, a viewing angle enhancing film, an optical compensation film, an antiglare film, a non-reflection film, an antistatic film, an antireflection film, a light diffusion film and a brightness enhancing film. Of these, it is preferable to employ a cellulose ester film as the polarizing plate, as the polarizing plate protective film, and as the antireflection film. Specifically, when employed in the uppermost surface of a liquid crystal display as a polarizing plate protective film, it is preferable to provide the antireflection layer on the film surface.

(Antireflection Layer)

The antireflection layer based on light diffraction, employed in the present invention, will now be described.

(Antireflection Layer Configuration)

It is possible to constitute the antireflection layer, employed in the present invention, employing a single layer configuration composed of only a low refractive index layer or a multi-refractive index layer. Layers are applied onto a hard coat layer (being a clear hard coat layer or an antiglare layer) on a transparent film substrate to decrease reflectance due to optical diffraction, while considering the refractive index, the layer thickness, the number of layers, and the order of layers. The antireflection layer may be composed of the combination of a high refractive index layer which exhibits a higher refractive index than the support and a low refractive index layer which exhibits a lower refractive index than the support. An antireflection layer composed of at least three refractive index layers is particularly preferred, in which three layers, which differ in refractive index, are coated in the order from the support of a medium refractive index layer (exhibiting a higher refractive index than the support or the hard coat layer and a lower refractive index than the high refractive index layer)/a high refractive index layer/a low refractive index layer. The hard coat layer may function as a high refractive index layer.

Examples of preferred layer configuration of the antireflection film of the present invention will now be described. Herein, "/" represents the arrangement of a layer upon a layer.

Back coat layer/support/hard coat layer/low refractive index layer

Back coat layer/support/hard coat layer/high refractive index layer/low refractive index layer Back coat layer/support/hard coat layer/medium refractive index layer/high refractive index layer/low refractive index layer Back coat layer/support/antistatic layer/hard coat layer/medium refractive index layer/high refractive index layer/low refractive index layer Antistatic layer/support/hard coat layer/medium refractive index layer/high refractive index layer/low refractive index layer Back coat layer/support/hard coat layer/high refractive index layer/low refractive index layer/high refractive index layer/low refractive index layer It is possible to further provide a stain resistance layer on the uppermost low refractive index layer. Fluorine-incorporating organic compounds are preferably employed in the stain resistance layer.

(Actinic Ray Curable Resin Layer)

In the present invention, a hard coat layer is preferably provided on the above-described cellulose ester film. The production method of an actinic ray curable resin layer employed as a hard coat layer will now be described.

An actinic ray curable resin layer is preferably employed as a hard coat layer to be used for the cellulose ester film of the present invention.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2-hydroxypropylacrylate, disclosed for example, in JP-A No. 59-151112.

Examples of the UV ray curable epoxyacrylate resin include those prepared by reacting an epoxyacrylate oligomer in the presence of a reactive diluting agent and a photoinitiator, disclosed for example, in JP-A No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a wire bar coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to apply tension to the film is not specifically limited and tension may be applied while the film is transported with back rolls or may be applied in a tenter in the lateral direction or in the biaxial directions of the film, whereby a cellulose ester film exhibiting a superior flatness can be obtained.

An organic solvent used for a coating solution of the UV curable-resin can be selected from, for example, hydrocarbons (toluene and xylene), alcohols (methanol, ethanol, isopropanol, butanol and cyclohexanol), ketones (acetone, methylethyl ketone and methylisobutyl ketone), esters (methyl acetate, ethyl acetate and methyl lactate), glycol ethers and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improve scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

The UV ray-curable resin layer is preferably irradiated with UV rays during or after drying. The duration of UV ray irradiation is preferably from 0.1 seconds to 5 minutes in order to secure the exposure amount from 5 to 150 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/m$^2$ on the irradiated surface.

The UV-cured resin layer thus obtained may preferably contain inorganic or organic microparticles in order to attain the characteristics of an anti-blocking property, scratch resistance, an antiglare property or a light diffusing property.

Examples of inorganic microparticles used in the hard coat layer include silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Examples of organic microparticles include: particles of polymethacrylic acid methyl acrylate resin, acryl-styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystyrene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 µm and specifically preferably from 0.01 to 1 µm. The microparticle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 µm. The center-line average roughness (Ra) is preferably measured by means of a surface roughness meter using interference of light, for example, RST/PLUS manufactured by WYKO Co., Ltd.

(Back Coat Layer)

A back coat layer is preferably provided on the surface reverse to the hard coat layer side surface of the hard coat film of the present invention. A back coat film is provided on a cellulose ester film to prevent curling which may occur when a hard coat layer or other layers is formed on a cellulose ester film by means of a coating method or by CVD. Namely, by adding a counter force to curl toward the back coat side, the force to curl may be balanced out. Also, a back coat layer preferably has a feature to prevent blocking. For this purpose, particles are preferably added to a coating composition of back coat layer.

Examples of particles preferably added to the back coat layer include inorganic particles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Particles containing silicon are preferably used to minimize the haze. Of these, silicon dioxide is specifically preferable.

These microparticles are available on the marketed with the product names of, for example, Aerosil R972, R972V, R974, R812, 200, 200V, 300, R202, OX50 and TT600 (produced by Nippon Aerosil Co., Ltd.), and can be used. Microparticles of zirconium oxide are also available on the market with the product names of Aerosil R976 and R811 (produced by Nippon Aerosil Co., Ltd.). Examples of polymer microparticles include: a silicone resin, a fluorine-containing resin and an acryl resin. Of these, preferable is a silicone resin, specifically, a silicone resin having 3-dimensional net work structure. Examples of a silicone resin include: TOSPERL 103, 105, 108, 120, 145, 3120 and 240, which are manufactured by Toshiba Silicone Co., Ltd.

Of these, Aerosil 200V and Aerosil R972V are specifically preferable, since a higher antiblocking property is obtained while keeping a low haze. The dynamic friction coefficient of the surface reverse to the hard coat layer side of the hard coat film of the present invention is preferably not more than 0.9 and more preferably in the range of 0.1-0.9 by using these antiblocking agents.

The content of microparticles contained in the back coat layer is preferably 0.1-50% by weight and more preferably 0.1-10% by weight based on the weight of the binder. The increase in haze after providing a back coat layer is preferably not more than 1%, more preferably not more than 0.5% and specifically preferably in the range of 0.0-0.1%.

The back coat layer is formed by coating a composition containing a solvent which dissolves or swells the cellulose ester film. As the solvent, in addition to the mixture of a solvent which dissolves the cellulose ester and a solvent which swells the cellulose ester, a solvent which does not dissolve the cellulose ester may also be added. The mixing ratio of these solvents and the amount of applied coating composition are determined depending on the kind of the resin or degree of the curl of the film.

A larger curl-preventing effect can be obtained by increasing the amount of a solvent which dissolves or swells the cellulose ester while decreasing the amount of a solvent which does not dissolve the cellulose ester. The mixing ratio is preferably as follows: (a solvent which dissolves or swells the cellulose ester):(a solvent which does not dissolve the cellulose ester)=10:0-1:9. Examples of a solvent which dissolves or swells a transparent resin film include: dioxane, acetone, methylethyl ketone, N,N-dimethylformamide, methyl acetate, ethylacetate, trichloroethylene, methylene chloride, ethylene chloride, tetrachloroethane, trichloroethane and chloroform. Examples of a solvent which does not dissolve a transparent resin film include: methanol, ethanol, n-propyl alcohol, i-propyl alcohol, n-butanol and hydrocarbons (such as toluene, xylene and cyclohexanol).

These coating compositions are applied on a transparent resin film preferably in a wet thickness of 1-100 µm or specifically preferably 5-30 µm by using, for example, a gravure coater, a dip coater, a reverse coater, a wire bar coater or a die coater. Examples of a binder resin of the back coat layer include: vinyl polymers and copolymers, such as, vinyl chloride-vinyl acetate copolymer, a polyvinyl chloride resin, a vinyl acetate resin, vinyl acetate-vinyl alcohol copolymer, partially hydrolyzed vinyl chloride-vinyl acetate copolymer, vinyl chloride-vinylidene chloride copolymer, vinyl chloride-acrylonitrile copolymer, ethylene-vinyl alcohol copolymer, chlorinated polyvinyl chloride, ethylene-vinyl chloride copolymer and ethylene-vinyl acetate copolymer; cellulose derivatives, such as, nitrocellulose, cellulose acetate propionate (preferably the acetylation degrees of 1.8-2.3, the propionyl substitution degree of 0.1-1.0), diacetyl cellulose and cellulose-acetate-butylate; rubber resins, such as, maleic acid-acrylic acid copolymer, acrylic ester copolymer, acrylonitrile-styrene copolymer, chlorinated polyethylene, acrylonitrile-chlorinated polyethylene-styrene copolymer, methylmethacrylate-butadiene-styrene copolymer, an acryl resin, a polyvinyl acetal resin, a polyvinyl butyral resin, a polyester polyurethane resin, a polyether polyurethane resin, a polycarbonate polyurethane resin, a polyester resin, a polyether resin, a polyamide resin, an amino resin, a styrene-butadiene resin, and a butadiene-acrylonitrile resin; silicone resins; and fluorine resins. However, the present invention is not limited thereto. Varieties of homopolymers and copolymers originated from acryl or methacryl monomers are available on the market and a preferable material can be selected from these, for example: Acrypet MD, VH, MF and V (produced by Mitsubishi Rayon Co., Ltd.), Hi Pearl M-4003, M-4005, M-4006, M-4202, M-5000, M-5001 and M-4501 (produced by Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (produced by Mitsubishi Rayon Co., Ltd.)

Specifically preferable are cellulose resins, for example, diacetyl cellulose and cellulose acetate propionate.

The back coat layer may be applied before or after providing a layer on the opposite side to the back coat layer (for example, a clear hard coat layer or other layer such as an antistatic layer), however, when the back coat layer also has a function of a blocking layer, the back coat layer is preferably applied earlier. Alternatively, the back coat layer may be applied twice before and after providing the hard coat layer.

<Low Refractive Index Layer>

In the low refractive index layer employed in the present invention, hollow silica particles are preferably used.

(Hollow Silica Particles)

Hollow silica particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of $2/3$-$1/10$ of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porosity of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of JP-A No. 7-133105, is suitably applied.

The hollow particles thus obtained have a low refractive index, since inside of them are vacant, and the refractive index of the low refractive index layer of the present invention, in which the hollow particles are employed, is preferably 1.30-1.50 and more preferably 1.35-1.44.

The content of the hollow silica particles having an outer shell and porous or hollow inside is preferably 10-80% by weight and more preferably 20-60% by weight based on the weight of the coating solution for the low refractive index layer.

(Tetraalkoxysilane Relating Compounds and Hydrolysis Products Thereof)

In the low refractive index layer of the present invention preferably contains a tetraalkoxysilane relating compounds or a hydrolysis product thereof as a sol-gel material.

As a material for the low refractive index layer of the present invention, silicon oxides having an organic group, other than the above inorganic compounds, are preferably used. These compounds are called a sol-gel material, and a metal alcolate, an organo-alkoxy metal compound and a hydrolysis product thereof are applicable. Specifically preferable are an alkoxysilane (such as tetramethoxysilane and tetraethoxysilane), alkyltrialkoxysilane (such as methyltrimethoxysilane and ethyltrimethoxysilane), aryltrialkoxysilane (such as phenyltrimethoxysilane), dialkyldialkoxysilane and diaryldialkoxysilane.

The low refractive index layer employed in the present invention preferably contains the above silicon-containing compound and a silane coupling agent.

Specific examples of a silane coupling agent include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane.

Further, examples of a silane coupling agent having an doubly substituted alkyl groups to silicon include: dimethyldimethoxysilane, phenylmethyldimethoxysilane, dimethyldiethoxysilane and phenylmethyldiethoxysilane.

Specific examples of a silane coupling agent include: KBM-303, KBM-403, KBM-402, KBM-403, KBM-1403, KBM-502, KBM-503, KBE-502, KBE-503, KBM-603, KBE-603, KBM-903, KBE-903, KBE-9103, KBM-802 and KBM-803.

It is preferable that these coupling agents have been preliminarily hydrolyzed employing water in a necessary amount. When the silane coupling agent is hydrolyzed, the surface of the above silicon oxide particles and the silicon oxide having organic groups becomes easier to react, whereby a stronger layer is formed. Further, it is preferable to previously mix hydrolyzed silane coupling agents into a liquid coating composition.

It is preferable that the low refractive index layer incorporates polymers in an amount of 5-50% by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymer is preferably 10-30% by weight based on the total weight of the low refractive index layer. In order to achieve adhesion of particles employing polymers, it is preferable that (1) polymers are combined with surface processing agents of the particles, (2) a polymer shell is formed around a particle used as a core, or (3) polymers are employed as a binder of the particles.

Binder polymers are preferably polymers having saturated hydrocarbon or polyether as a main chain, but is more preferably polymers having saturated hydrocarbon as a main chain. The above binder polymers are preferably subjected to crosslinking. It is preferable that the polymers having saturated hydrocarbon as a main chain is prepared employing a polymerization reaction of ethylenically unsaturated monomers. In order to prepare crosslinked binder polymers, it is preferable to employ a monomer having at least two ethylenically unsaturated groups. Listed as examples of monomers having at least two ethylenically unsaturated groups include: esters of polyalcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layer employed in the present invention may be a low refractive index layer which is formed by crosslinking of fluorine-containing resins (hereinafter referred to as "fluorine-containing resins prior to crosslinking") which undergo crosslinking by heat or by irradiation of ionizing radiation.

Preferably listed as fluorine containing resins prior to crosslinking are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene and perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). JP-A Nos. 10-25388 and 10-147739 describe that a crosslinked structure is introduced into the latter compounds by adding compounds having a group which reacts with the functional group in the polymer and at least one reacting group, after the copolymerization. Listed as examples of the crosslinking group include: acryloyl, methacryloyl, isocyanate, epoxy, aziridine, oxazoline, aldehyde, carbonyl, hydrazine, carboxyl, methylol and activated methylene. When fluorine containing polymers undergo thermal crosslinking due to the presence of a thermally reacting crosslinking group or the combinations of an ethylenically unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenically unsaturated group with photo-radical generating agents or an epoxy group with photolytically acid generating agents, the polymers are of an ionizing radiation curable type.

The used ratio of each monomer to form the fluorine containing copolymers prior to coating is as follows. The ratio of fluorine containing vinyl monomers is preferably 20-70 mol %, but is more preferably 40-70 mol %; the ratio of monomers which provide a crosslinking group is preferably 1-20 mol %, but is more preferably 5-20 mol %, and the ratio of the other monomers simultaneously employed is preferably 10-70 mol %, but is more preferably 10-50 mol %.

Each layer of the antireflection film may be formed via a coating method, for example, a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761, 791, 2,941,898, 3,508,947, 3,526,528 and "Yuji Harasaki: Coating Engineering, p. 253 (1973), published by Asakura Publishing Co., Ltd."

The thickness of the low refractive index layer is preferably 50-200 nm and more preferably 60-150 nm.

<High Refractive Index Layer and Medium Refractive Index Layer>

In the present invention, a high refractive index layer is preferably provided between a transparent substrate and a low refractive index layer in order to reduce the reflectance. Further, to provide a medium refractive index layer between a transparent substrate and a high refractive index layer is preferred with respect to reduction of the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. The thickness of each of a high refractive index layer and a medium refractive index layer is preferably 5 nm-1 µm, more preferably 10 nm-0.2 µm and most preferably 30 nm-0.1 µm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1 kg, more preferably not less than 2H and most preferably not less than 3H.

It is preferable that the medium and high refractive index layers used in the present invention are formed in such a manner that a liquid coating composition incorporating monomers or oligomers of organic titanium compounds represented by Formula (22) below, or hydrolyzed products thereof are coated and subsequently dried, and the resulting refractive index is 1.55-2.5.

$$Ti(OR_1)_4 \quad \text{Formula (22)}$$

wherein $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinked structure via reaction such as —Ti—O—Ti—, whereby a cured layer is formed.

Listed as preferred examples of monomers and oligomers of organic titanium compounds employed in the present invention include: $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, dimers—decamers of $Ti(O-n-C_3H_7)_4$, dimers—decamers of $Ti(O-i-C_3H_7)_4$, dimers—decamers of $Ti(O-n-C_4H_9)_4$. These may be employed individually or in combinations of at least two types. Of these, particularly preferred are $Ti(O-n-C_3H_7)_4$, $Ti(O-i-C_3H_7)_4$, $Ti(O-n-C_4H_9)_4$, dimers—decamers of $Ti(O-n-C_3H_7)_4$ and dimers—decamers of $Ti(O-n-C_4H_9)_4$.

The content of monomers and oligomers of organic titanium compounds employed in the present invention, as well as hydrolyzed products thereof is preferably 50.0-98.0 weight % with respect to solids incorporated in the liquid coating composition. The solid ratio is more preferably 50-90 weight %, but is still more preferably 55-90 weight %. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers used in the present invention preferably incorporate metal oxide particles as microparticles and further preferably incorporate binder polymers.

In the above method of preparing liquid coating compositions, when hydrolyzed/polymerized organic titanium compounds and metal oxide particles are combined, the both strongly adhere to each other, whereby it is possible to obtain a strong coating layer provided with hardness and uniform layer flexibility.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 m²/g as a value determined employing the BET method, is more preferably 20-200 m²/g, but is most preferably 30-150 m²/g.

Examples of metal oxide particles are metal oxides incorporating at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

The content of metal oxide particles in the high and medium refractive index layers is preferably 5-65 volume %, more preferably 10-60 volume % and still more preferably 20-55 volume %.

The above metal oxide particles are dispersed into a medium and fed to liquid coasting compositions to form a high refractive index layer and a medium refractive index layer. Preferably employed as dispersion medium of metal oxide particles is a liquid at a boiling point of 60-170° C. Specific examples of dispersion media include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexanone), halogenated hydrocarbons (for example, methylene chloride, chloroform, and carbon tetrachloride), aromatic hydrocarbons (for example, benzene, toluene, and xylene), amides (for example, dimethylformamide, diethylacetamide, and n-methylpyrrolidone), ethers (for example, diethyl ether, dioxane, and tetrahydrofuran), and ether alcohols (for example, 1-methoxy-2-propanol). Of these, particularly preferred are toluene, xylene, methyl ethyl ketone, methyl isobutyl ketone, cyclohexane and butanol.

Further, it is possible to disperse metal oxide particles into a medium employing a dispersing machine. Listed as examples of a dispersing machine include: a sand grinder mill (for example, a bead mill with pins), a high speed impeller mill, a pebble mill, a roller mill, an attritor, and a colloid mill. Of these, particularly preferred are the sand grinder and the high speed impeller mill. Preliminary dispersion may be performed. Listed as examples which are used for the preliminary dispersion include a ball mill, a three-roller mill, a kneader, and an extruder.

It is preferable to employ polymers having a crosslinked structure (hereinafter referred to as a crosslinked polymer) as a binder polymer in the high refractive index and medium refractive index layers. Listed as examples of the crosslinked polymers include: polymers having a saturated hydrocarbon chain such as polyolefin, polyether, polyurea, polyurethane, polyester, polyamine, polyamide and melamine resins. Of these, crosslinked products of polyolefin, polyether and polyurethane are preferred, crosslinked products of polyolefin and polyether are more preferred, and crosslinked products of polyolefin are most preferred.

Most preferred as monomers employed in the present invention are those having at least two ethylenically unsaturated groups. Listed as those examples include: esters of polyalcohols and (meth)acrylic acid (for example, ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol (meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene, 4-vinyl-benzoic acid-2-acryloylethyl ester, and 1,4-divinylcyclohexane); vinylsulfones (for example, divinylsulfone); acrylamides (for example, methylenebisacrylamide); and methacrylamides. Commercially available monomers having an anionic group and monomers having an amino group or a quaternary ammonium group may be employed. Listed as commercially available monomers having an anionic group which are preferably employed are KAYAMAR PM-21 and PM-2 (both produced by Nihon Kayaku Co., Ltd.); ANTOX MS-60, MS-2N, and MS-NH4 (all produced by Nippon Nyukazai Co., Ltd.), ARONIX M-5000, M-6000, and M-8000 SERIES (all produced by Toagosei Chemical Industry Co., Ltd.); BISCOAT #2000 SERIES (produced by Osaka Organic Chemical Industry Ltd.); NEW FRONTIER GX-8289 (produced by Dai-ichi Kogyo Seiyaku Co., Ltd.); NK ESTER CB-1 and A-SA (produced by Shin-Nakamura Chemical Co., Ltd.); and AR-100, MR-100, and MR-200 (produced by Daihachi Chemical Industry Co., Ltd.). Listed as commercially available monomers having an amino group or a quaternary ammonium group which are preferably employed are DMAA (produced by Osaka Organic Chemical Industry Ltd.); DMAEA and DMAPAA (produced by Kojin Co., Ltd.); BLENMER QA (produced by NOF Corp.), and NEW FRONTIER C-1615 (produced by Dai-ichi Kogyo Seiyaku Co., Ltd.).

It is possible to perform a polymerization reaction employing a photopolymerization reaction or a thermal polymerization reaction. The photopolymerization reaction is particularly preferred. It is preferable to employ a polymerization initiator to perform the polymerization reaction. For example, listed are thermal polymerization initiators and photopolymerization initiators described below which are employed to form binder polymers of a hard coat layer.

A commercially available polymerization initiator may be used. In addition to the polymerization initiators, employed may be a polymerization promoter. The added amount of a polymerization initiator and a polymerization promoter is preferably in the range of 0.2-10 weight % based on the total weight of the monomer.

In the coating solution for each layer of the antireflection layer, a polymerization inhibitor, a leveling agent, a thickening agent, an anti-coloring agent, a UV-absorber, a silane coupling agent, an antistatic agent or an adhering agent may be incorporated, in addition to the above-mentioned components (metal oxide particles, a polymer, a dispersion medium, a polymerization initiator and a polymerization promoter).

After the high-medium refractive index layer and the low refractive index layer are applied, irradiation with actinic rays is preferably carried out in order to promote hydrolysis or curing of the composition containing a metal alkoxide. More preferable is to carry out irradiation after application of each layer.

The actinic radiation usable in the present invention includes, for example, ultraviolet ray (UV ray), electron beam and γ-ray, and the actinic ray is not limited as long as it activates a compound. However, more preferable is ultraviolet ray or electron beam. The UV ray is specifically preferred since handling is easy and a high level of energy can be easily obtained. Any light source capable of generating UV rays can be used as the light source of the UV ray for causing photopolymerization of UV ray curable compound. For example, it is possible to use the low pressure mercury lamp, intermediate pressure mercury lamp, high pressure mercury lamp, ultra-high pressure mercury lamp, carbon arc light, metal halide lamp and xenon lamp. Further, ArF excimer laser, KrF excimer laser, excimer lamp and synchrotron radiation can also be used. The conditions on irradiation differs according to each type. The preferred amount of irradiation is preferably 20-10000 mJ/cm$^2$, more preferably 100-2000 mJ/cm$^2$ and specifically preferably 400-2000 mJ/cm$^2$.

(Polarizing Plate)

The polarizing plate of the present invention and the liquid crystal display of the present invention, employing the polarizing plate will now be described.

<Polarizing Film>

A polarizer (polarizing film), which is a main component of a polarizing plate, is the element which only transmits light having a polarization plane in the definite direction. The representative polarizer which is currently known is a polyvinyl alcohol based polarizing film, which include two types, one which is prepared by dying a polyvinyl alcohol based film with iodine and the other which is prepared by dying the same with a dichroic dye.

It is preferable that the polarizing film is formed employing ethylene-modified polyvinyl alcohol having an ethylene unit content of 1-4 mol %, a degree of polymerization of 2,000-4,000 and a saponification ratio of 99.0-99.99 mol %. The cutting temperature in hot-water of the film is preferably 66-73° C. Further, in order to decrease color spots, it is more preferable that the difference between the hot water cutting temperatures of the two points 5 cm apart in the TD direction of the film is at most 1° C. Further, in order to decrease color spots, it is still more preferable that the difference between the hot water cutting temperatures of the two points 1 cm apart in the TD direction is at most 0.5° C. Further, it is particularly preferable that the film thickness is 10-50 μm, in order to decrease color spots.

Employed as the ethylene-modified polyvinyl alcohol (being the ethylene-modified PVA) is prepared in such a manner that an ethylene-vinyl ester polymer, prepared by copolymerizing ethylene and vinyl ester based monomers, is saponified, whereby vinyl ester units are changed to vinyl alcohol units. Examples of a vinyl ester monomer include: vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content (being the copolymerized amount of ethylene) ethylene units in the ethylene-modified PVA is commonly 1-4 mol %, is preferably 1.5-3 mol %, but is more preferably 2-3 mol %. When the content of the ethylene units is less than 1 mol %, the polarizing performance, the durability enhancing effects, and color spot decreasing effects of the resulting polarizing film are undesirably degraded. On the other hand, when it exceeds 4 mol %, affinity of the ethylene-modified PVA to water is reduced, whereby the uniformity the film surface is undesirably degraded to tend to cause the formation of color spots of the polarizing film.

Further, during copolymerization of ethylene with vinyl ester based monomers, if desired, it is possible to copolymerize copolymerizable monomers in the range (at a ratio of preferably at most 15 mol %, but more preferably at most 5 mol %) in which the effects of the present invention is adversely affected.

Examples of such copolymerizable monomers with vinyl ester monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000-4,000, is preferably 2,200-3,500, but is more preferably 2,500-3,000 in terms of polarizing performance and durability. When the degree of polymerization of ethylene-modified PVA is less than 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average polymerization degree. This weight average polymerization degree is determined by means of GPC measurement at 40° C. employing hexafluoroisopropanol (HFIP) added with 20 mmol/liter of sodium trifluoroacetate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Employed as methods to produce a ethylene-modified film, other than a film forming method based on a melt extrusion system employing water-containing ethylene-modified PVA, include, using an ethylene-modified PVA solution prepared by dissolving ethylene-modified PVA in solvents, a casting method, a wet system film forming method (ejected into poor solvents), a gel film forming method (after an ethylene-modified PVA solution is temporality cooled and gelled, solvents are removed via extraction and an ethylene-modified PVA film is prepared), as well as methods of combinations of these. Of these, in view of obtaining an excellent ethylene-modified PVA film, preferred are the casting method and the melt extrusion method. The resulting ethylene-modified PVA film is, if necessary, dried and thermally treated.

Examples of a solvent which dissolves the ethylene-modified PVA employed during production of ethylene-modified PVA film include: dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, glycerin and water. These may be employed alone or in combination of two or more. Of these, suitably employed is dimethylsulfoxide, water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surfactants, and dichroic dyes may be incorporated in the above ethylene-modified PVA solution or water-containing ethylene-modified PVA.

During production of the ethylene-modified PVA film, it is preferable to incorporate polyalcohols as a plasticizer. Examples of polyalcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyalcohols is preferably 1-30 parts by weight with respect to 100 parts by weight of the ethylene-modified PVA, is more preferably 3-25 parts by weight, but is most preferably 5-20 parts by weight. When the added amount is less than 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate a surfactant. The types of surfactants are not particularly limited, but nonionic or cationic surfactants are preferred. Examples of suitable anionic surfactants include: carboxylic acid surfactants such as potassium laurate, sulfuric acid ester surfactants such as octyl sulfate, and sulfonic acid surfactants such as dodecylbenzene sulfonate. Examples of suitable nonionic surfactants include alkyl ether surfactants such as polyoxyethylene oleyl ether; alkyl phenyl ether surfactants such as polyoxyethylene octyl phenyl ether surfactants; alkyl ester surfactants such as polyoxyethylenelaurate; alkylamine surfactants such as polyoxyethylene lauryl aminoether; alkylamide surfactants such as polyoxyethylene lauric acid amide; polypropylene glycol ether surfactants such as polyoxyethylene polyoxypropylene ether; alkanol amide surfactants such as oleic acid diethanolamide; and allyl phenyl ether surfactants such as polyoxyalkylene phenyl ether. These surfactants may be employed individually or in combinations of at least two types.

The added amount of surfactants is preferably 0.01-1 part by weight with respect to 100 parts by weight of the ethylene-modified PVA, is more preferably 0.02-0.5 part by weight, but is most preferably 0.05-0.3 part by weight. When the added amount is less than 0.01 part by weight, effects to improve film casting properties and peeling properties are hardly exhibited, while when it exceeds 1 part by weight, surfactants are dissolved out onto the surface of the ethylene-modified PVA film to result in blocking, whereby handling properties tend to be degraded.

The hot-water cutting temperature of the ethylene-modified PVA film is preferably 66-73° C., is more preferably 68-73° C., but is most preferably 70-73° C. When the hot-water cutting temperature of the ethylene-modified PVA film is less than 66° C., a state occurs in which a film, which starts dissolution, is stretched whereby the polarization performance becomes insufficient due to reduced tendency of molecular orientation. On the other hand, when the hot-water cutting temperature is 73° C. or more, the film tends not to be stretched, whereby the polarization performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10-80 µm, more preferably 10-50 µm and still more preferably 20-40 µm. When the thickness is more than 10 µm, uniform stretching is easy, whereby color spotting of the polarizing film tends not to occur. On the other hand, when the thickness does not exceeds 80 µm, more preferably does not exceed 50 µm, during production of a polarizing film via uniaxial stretching of the ethylene-modified PVA film, the variation of thickness due to neck-in at the edge tends not to occur, whereby color spotting of the polarizing film becomes less appearing.

Further, to produce a polarizing film employing an ethylene-modified PVA film, for example, the ethylene-modified PVA film may be dyed, uniaxially stretched, fixed and dried, and, if desired, thermally treated. The order of the dying, uniaxial stretching, and fixing is not particularly limited. Further, the uniaxial stretching may be repeated twice or more.

Dying may be performed at any time such as prior to uniaxial stretching, during uniaxial stretching, or after uniaxial stretching. Employed as dyes for dying are dichroic dyes such as iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed individually or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (in a solution containing the above-mentioned dyes or in a fixing bath which will be described below) or in air employing an ethylene-modified PVA film which absorbed water. The temperature during stretching is not particularly limited, however, when the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably 4 or more with respect to polarization performance of the polarizing film, but is most preferably 5 or more. The upper limit of the stretching factor is not particularly limited, however, the stretching factor is preferably 8 or less, since uniform stretching is readily performed. The film thickness after stretched is preferably 2-20 µm, but is most preferably 10-20 µm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be added in the treatment bath.

Drying of a prepared polarizer is preferably performed between 30-150° C., but is more preferably performed between 50-150° C.

An optically transparent protective layer, exhibiting desired mechanical strength, is adhered to one or both sides of the polarizer prepared as above to prepare a polarizing plate. Listed as adhesives for the above adhesion may be a PVA adhesive and an urethane adhesive. Of these, a PVA adhesive is preferable.

The polarizing plate can be produced by a usual method. It is preferable that the back surface of the cellulose ester film of the present invention is subjected to the alkali saponification treatment and is pasted to at least one surface of a polarizing film using an aqueous solution of completely saponified polyvinyl alcohol, the polarizing film being prepared by immersing a polyvinyl alcohol film in an iodine solution, followed by stretching the film. On the other surface of the polarizing film, the cellulose ester film of the present invention may be provided or other polarizing plate protective film may be provided. As the polarizing plate protective film other than the cellulose ester film of the present invention, a cellulose ester film available on the market can be employed. Examples of a cellulose ester film available on the market include: KC8UX2M, KC4UX, KC5UX, KC4UY, KC4FR, KC8UY, KC12UR, KC8UCR-3, KC8UCR-4, KC8UY-HA and KC8UX-RHA (each manufactured by Konica Minolta Opto, Inc.), FUJITAC TD80UF, FUJITAC T80UZ, FUJITAC T40UZ and an antireflection film (FUJI FILM CV CLEAR VIEW UA, produced by Fuji Photo Film Co., Ltd.).

For example, polarizing plate having the following combinations are possible:
Cellulose ester film of the present invention (80 µm)/polarizer/KC8UX-RHA
Cellulose ester film of the present invention (40 µm)/polarizer/KC8UX-RHA
Cellulose ester film of the present invention (80 µm)/polarizer/KC8UCR-5
Cellulose ester film of the present invention (40 µm) polarizer/KC8UCR-5
Cellulose ester film of the present invention (80 µm)/polarizer/KC4UY
Cellulose ester film of the present invention (40 µm)/polarizer/KC4UY
Cellulose ester film of the present invention (80 µm)/polarizer/KC5UX
Cellulose ester film of the present invention (40 µm)/polarizer/KC5UX
Cellulose ester film of the present invention (80 µm)/polarizer/FUJITAC TD80UF
Cellulose ester film of the present invention (40 µm)/polarizer/FUJITAC TD80UF
Cellulose ester film of the present invention (80 µm)/polarizer/FUJITAC T40UZ
Cellulose ester film of the present invention (40 µm)/polarizer/FUJITAC T40UZ
Cellulose ester film of the present invention (80 µm)/polarizer/FUJI FILM CV CLEAR VIEW UA
Cellulose ester film of the present invention (40 µm)/polarizer/FUJI FILM CV CLEAR VIEW UA The polarizing plate protective film provided on the other surface of the polarizing film preferably has a hard coat layer or an antiglare layer each having a thickness of 8-20 µm. Preferably employed is a polarizing plate protective film having a hard coat layer or an antiglare layer each being disclosed, for example, in JP-A Nos. 2003-114333, 2004-203009, 2004-354699 or 2004-354828. Further, preferable is to have an antireflection layer containing a low refractive index layer on the hard coat layer or the antiglare layer, and the low refractive index layer preferably contains the above-mentioned hollow particles.

Alternatively, it is also preferable to use a polarizing plate protective film which also serves as an optical compensation film having an optical anisotropic layer formed by orientating a liquid crystal compound such as a discotic liquid crystal, a rod-shaped liquid crystal or a cholesteric liquid crystal. For example, the optical anisotropic layer can be formed by the method described in JP-A No. 2003-98348. The polarizing plate superior in the flatness and having a stable viewing angle enlarging effect can be obtained by the use of such the film in combination with the optical film of the present invention. Moreover, a film of a cyclic olefin resin, an acryl resin, a polyester resin or a polycarbonate resin may be used as the polarizing plate protective film on the other surface of the polarizing plate. In such the case, the film is preferably pasted with the polarizing plate through a suitable adhering treatment because such the film shows low suitability for saponification treatment.

The polarizing film is stretched in one direction (usually in the longitudinal direction). Therefore, when a polarizing plate is kept under a high temperature and high humidity condition, the polarizing film shrinks in the stretching direction, usually in the longitudinal direction, and expands in the direction orthogonal to the stretching direction, usually in the transverse direction. The expansion and shrinkage of the polarizing plate is larger when the polarizing plate protective film is thinner. Specifically the shrinkage in the longitudinal direction is larger. It is important to inhibit the expansion and shrinkage of the film in the casting direction because the stretching direction of the polarizing film is usually the same as the casting direction (MD direction) of the polarizing plate protective film. The cellulose ester film of the present invention is superior in the dimensional stability, accordingly, it is suitably employed as a polarizing plate protective film.

A polarizing plate may be constituted by pasting a polarizing plate protective film on one surface of the polarizing plate and a separable film on the other surface. The polarizing plate protective film and the separable film are employed for protecting the polarizing plate in the course of forwarding and inspection of the product. In this case, the protective film is pasted onto the surface of the polarizing plate opposite to the surface to be pasted with the liquid crystal cell for protecting the surface of the polarizing plate. A separable film is employed for covering the adhesive layer for pasting the polarizing plate to the liquid crystal cell and applied onto the surface of the polarizing plate to be pasted with the liquid crystal cell.

(In-Plane Switching Mode Liquid Crystal Display)

The liquid crystal display having superior visibility and enlarged viewing angle according to the present invention can be produced by incorporation of the polarizing plate of the present invention into an IPS mode liquid crystal display available on the market.

The in-plane switching mode liquid crystal display of the present invention includes a fringe-field switching (FFS) mode liquid crystal display; therefore, the polarizing plate of the present invention can also be incorporated in the FFS mode liquid crystal display and can exhibit the same effect as that in the case of the IPS (In Plane Switching) mode liquid crystal display.

In a liquid crystal display, an upper side polarizing film and a lower side polarizing film are provided on a pair of substrates provided in the upper side and the lower side of the liquid crystal cell for driving the display. It is preferable that the cellulose ester film of the present invention is provided between the upper substrate and the upper side polarizing film or between the lower substrate and the lower side polarizing film, or, alternatively, the cellulose ester film of the present invention is provided between the upper substrate and the upper side polarizing film and between the lower substrate and the lower side polarizing film.

EXAMPLES

The present invention will now be detailed with reference to examples, however the present invention is not limited thereto.

Example 1

Synthesis of Polymer X

Charged into a glass flask equipped with a stirrer, two dripping funnels, a gas feeding tube, and a thermometer were 40 g of a mixture of Monomers Xa and Xb of the type and ratio described in Table 1, 2 g of mercaptopropionic acid as a chain transfer agent, and 30 g of toluene. The resulting mixture was heated to 90° C. Thereafter, the mixture of Monomers Xa and Xb of the type and ratio described in Table 1 was dripped over 3 hours from one dripping funnel, while 0.4 g of azobisisobutyronitrile dissolved in 14 g of toluene was simultaneously dripped from the other dripping funnel over 3 hours. Thereafter, 0.6 g of azobisisobutyronitrile, dissolved in 56 g of toluene, was dripped over 2 hours, and reaction was performed for an additional 2 hours, whereby Polymers X1-X5 were prepared. The weight average molecular weight of each of above Polymers X1-X5, as shown in Table 1, was determined employing the method described below. The polymers having different molecular weights were prepared by varying the added amount of mercaptopropionic acid as a chain transfer agent and the adding rate of azobisisobutyronitrile.

MA, MMA, HEA, and HEMA, described in Table 1, are abbreviations of the following compounds.

MA: methyl acrylate
MMA: methyl methacrylate
HEA: 2-hydroxyethyl acrylate
HEMA: 2-hydroxyethyl methacrylate (Determination of Molecular Weight)

The weight average molecular weight was determined employing gel-permeation chromatography.

Measurement conditions follow.

Solvent: methylene chloride
Columns: SHODEX K806, K805, and K803G (produced by Showa Denko K.K., employed by connecting three columns)
Column temperature: 25° C.
Sample concentration: 0.1% by weight
Detector: RI Model 504 (produced by GL Science Co.)
Pump: L6000 (produced by Hitachi, Ltd.)
Flow rate: 1.0 ml/minute
Calibration curve: a calibration curve based on 13 samples of standard POLYSTYRENE STK standard POLYSTYRENE (produced by TOSOH Corp.) at an Mw of 500-1,000,000 was employed. Thirteen samples at an almost equal interval were employed.

<Synthesis of Polymer Y>

Block polymerization was carried out based on the polymerization method described in JP-A No. 2000-128911. Namely, charged into a flask, fitted with a stirrer, a nitrogen gas feeding pipe, a thermometer, a charging inlet, and a refluxing cooling pipe, was methyl acrylate or methyl methacrylate as Monomer Ya, and the ambient atmosphere in the flask was replaced with nitrogen-gas, and thioglycerol, as described below, was added while stirring. After the addition of thioglycerol, polymerization was carried out for 4 hours by appropriately changing the temperature of the reactants. Thereafter, the reactants were cooled to room temperature and polymerization was terminated by the addition of a 20 parts by weight of a 5% by weight benzoquinone tetrahydrofuran solution, whereby the polymerization was terminated. The reaction products were transferred to an evaporator and tetrahydrofuran, residual monomers and residual thioglycerol were removed at 80° C. under vacuum, whereby Polymers Y1-Y4, described in Table 1, were prepared. The weight average molecular weight of each of above Polymers Y1-Y4 was determined employing the measurement method described above, and is shown in Table 1.

| Methyl acrylate or methyl methacrylate | 100 parts by weight |
|---|---|
| Thioglycerol | 5 parts by weight |

TABLE 1

Polymer X: -(Xa)m-(Xb)n-(Xc)p- (m + n + p = 100)

| | Xa | | Xb | | Xc | | Weight Average |
|---|---|---|---|---|---|---|---|
| Polymer X | Monomer Type | Monomer Ratio: m | Monomer Type | Monomer Ratio: n | Monomer Type | Monomer Ratio: p | Molecular Weight |
| Polymer X1 | MMA | 80 | HEA | 10 | — | — | 5000 |
| | MA | 10 | | | | | |
| Polymer X2 | MMA | 80 | HEA | 20 | — | — | 5000 |
| Polymer X3 | MMA | 80 | HEMA | 20 | — | — | 5000 |
| Polymer X4 | MMA | 80 | HEA | 20 | — | — | 30000 |
| Polymer X5 | MMA | 95 | HEMA | 5 | — | — | 2000 |

Polymer Y: -(Ya)k-(Yb)q- (k + q = 100)

| | Ya | | Yb | | Weight Average |
|---|---|---|---|---|---|
| Polymer Y | Monomer Type | Monomer Ratio: k | Monomer Type | Monomer Ratio: q | Molecular Weight |
| Polymer Y1 | MA | 100 | — | — | 1000 |
| Polymer Y2 | MMA | 100 | — | — | 1000 |
| Polymer Y3 | MA | 100 | — | — | 500 |
| Polymer Y4 | MA | 100 | — | — | 3000 |

<Synthesis Example of Polymer UV Absorber P-1>

Synthesis of 2(2'-hydroxy-5'-t-butyl-phenyl)-5-carboxylic acid-(2-methacryloyloxy)ethyl ester-2H-benzotriazole (Exemplified Compound MUV-19) was carried out based on the method described below.

Dissolved in 160 ml of water was 20.0 g of 3-nitro-4-amino-benzoic acid, and 43 ml of concentrated hydrochloric acid was added. After adding 8.0 g of sodium nitrite dissolved in 20 ml of water at 0° C., the resulting mixture was stirred for 2 hours while maintaining the temperature at 0° C. Dripped into the resulting solution at 0° C. was 17.3 g of 4-t-butylphenol dissolved in 50 ml of water and 100 ml of water while maintaining alkalinity by the addition of potassium carbonate. The resulting solution was stirred at 0° C. for one hour and for an additional hour at room temperature. The reaction solution was acidified by the addition of hydrochloric acid and the resulting precipitates were collected via filtration, and subsequently washed well with water.

Precipitates collected via filtration were dissolved in 500 ml of a 1 mol/L aqueous NaOH solution. After adding 35 g of zinc powder, 110 g of a 40% aqueous NaOH solution was dripped. After dripping, stirring was carried out for about 2 hours, followed by filtration and water washing. The filtrate was neutralized by the addition of hydrochloric acid. The resulting precipitates were collected via filtration, washed with water and dried. Thereafter, re-crystallization was conducted employing a solvent mixture of ethyl acetate and acetone, whereby 2(2'-hydroxy-5'-t-butyl-phenyl)-5-carboxylic acid-2H-benzotriazole was prepared.

Subsequently added to 100 ml of toluene were 10.0 g of 2(2'-hydroxy-5'-t-butyl-phenyl)-5-carboxylic acid-2H-benzotriazole, 0.1 g of hydroquinone, 4.6 g of 2-hydroxyethyl methacrylate, and 0.5 g of p-toluenesulfonic acid, and the resulting mixture was refluxed for 10 hours in a flask fitted with an ester pipe while heated. The reaction solution was poured into water and precipitated crystals were collected via filtration, washed with water, dried, and recrystallized via ethyl acetate, whereby 2(2'-hydroxy-5'-t-butyl-phenyl)-5-carboxylic acid-(2-methacryloyloxy)ethyl ester-2H-benzotriazole, which was Exemplified Compound MUV-19, was prepared.

Subsequently, a copolymer (being Polymer UV Absorber P-1) of 2(2'-hydroxy-5'-t-butyl-phenyl)-5-carboxylic acid-(2-methacryloyloxy)ethyl ester-2H-benzotriazole with methyl methacrylate was synthesized based on the following method.

Added to 80 ml of tetrahydrofuran were 4.0 g of 2(2'-hydroxy-5'-t-butyl-phenyl)-5-carboxylic acid-(2-methacryloyloxy)ethyl ester-2H-benzotriazole, synthesized as above, and 6.0 g of methyl methacrylate, followed by the addition of 1.14 g of azoisobutyronitrile. The resulting mixture was refluxed, while heated, for 9 hours under a nitrogen atmosphere. After distilling off tetrahydrofuran under vacuum, the resulting products were re-dissolved in tetrahydrofuran, and the resulting solution was dripped into an excessive amount of methanol. The resulting precipitates were collected via filtration and dried at 40° C. under vacuum, whereby 9.1 g of a gray powdered polymer, which corresponded to Polymer UV Absorber P-1, was prepared. The number average molecular weight of the resulting polymer was confirmed to be 4,500, according to the GPC analysis employing the standard polystyrene. Further, the above copolymer was identified as a copolymer of 2(2'-hydroxy-5'-t-butyl-phenyl)-5-carboxylic acid-(2-methacryloyloxy)ethyl ester-2H-benzotriazole with methyl methacrylate. The composition of the above copolymer was 2(2'-hydroxy-5'-t-butyl-phenyl)-5-carboxylic acid-(2-methacryloyloxy)ethyl ester-2H-benzotriazole:methyl methacrylate was approximately 40:60.

(Preparation of Cellulose Ester Film 1)

| (Preparation of Dope) | |
|---|---|
| Cellulose Triacetate (at a substitution degree of an acetyl group of 2.92, an Mn of 100,000 and an Mw of 220,000, and an Mw/Mn of 2.2) | 100 parts by weight |
| Additive 1 | 12 parts by weight |
| Additive 2 | 5 parts by weight |
| Polymer UV Absorber P-1 | 3 parts by weight |
| Minute silicon oxide particles (AEROSIL R972, produced by Nippon Aerosol Co., Ltd.) | 0.1 parts by weight |
| Methylene chloride | 440 parts by weight |
| Ethanol | 40 parts by weight |

(Casting of Cellulose Ester Film)

The above dope was prepared, filtered employing FINE MET NF, produced by Nippon Seisen Co. Ltd. and subsequently, at 22° C., cast onto a stainless steel band support to reach a width of 2 m, employing a belt casting apparatus. The solvents in the cast dope were evaporated on the stainless steel band so that the residual solvent amount reached 100%, and the resulting web was peeled from the stainless steel band at a peeling tension of 162 Newton/m, and was then slit to a width of 1.6 m. Thereafter, drying was performed at a drying temperature of 136° C. while stretched at a factor of 1.1 was performed in the traverse direction employing a tenter. During this operation, the residual solvent amount was 10% at the beginning of stretching employing the tenter. After stretching by the tenter, the heating treatment, ambient air replacement, and pressing treatment, as described below, were carried out, whereby drying was completed. The resulting film was slit to a width of 1.5 m, and knurling, at a width of 10 mm and a height of 5 μm, was applied to both edges of the film. Subsequently, the resulting film was wound onto a core at an inner diameter of 6 inches at an initial tension of 220 N/m and a final tension of 110 N/m, whereby Cellulose Ester Film 1, described in Table 2, was prepared. The stretching factor in the MD direction, calculated based on the rotation rate of the stainless steel band support and the driving rate of the tenter was 1.1. The residual solvent amount, the thickness, and the roll length of each cellulose ester film were 0.1%, 80 μm, and 3,000 m, respectively.

After stretching by a tenter, the web was dried by drying 105° C. air flow in a conveying drying process in which a plurality rollers was vertically staggered was so that the residual solvents reached 0.3% by weight. Thereafter, the resulting film was thermally treated for 20 minutes in an ambience at 135° C. and an ambient air replacement frequency of 25 times/hour. During the above treatment, a pressure of 10 kPa in the thickness direction was applied to the film employing nip rollers arranged as a multistage. Subsequently, the film was cooled to room temperature and wound whereby Cellulose Ester Film 1 was prepared.

Subsequently, Cellulose Ester Films 2-39 were prepared in the same manner as Cellulose Ester Film 1, except that the type and amount of additives, the film thickness, the heat treatment temperature, the ambient air replacement frequency, and the presence or absence of the pressing treatment were changed to the conditions described in Table 2, and the free volume radius as well as the half-value width was regulated.

The above ambient air replacement frequency of the heating process is the frequency represented by the following formula in which the frequency per unit time of replacement of the ambience to fresh air is obtained.

Ambient Air Replacement Frequency=FA/V (times/hour) wherein V (m²) represents the capacity of the heat treatment room and FA (m²/hour) represents the blown amount of fresh air.

The retardation value of each of resulting Cellulose Ester Films 1-39 was determined employing the following method.

(Measurement of Retardations Ro and Rt)

Three-dimensional refractive indices at a wavelength of 590 nm of each of Cellulose Ester Films 1-29 were determined at 10 positions at 23° C. and 55% relative humidity, employing an automatic birefringence analyzer (KOBRA-21ADH, produced by Oji Scientific Instruments) and refractive indices nx, ny, and nz were obtained. In-plane direction retardation Ro was obtained based on Formula (1), while thickness direction retardation Rt was obtained based on Formula (2). Determination was carried out at ten positions and the average value was obtained.

$$Ro = (nx - ny) \times d \qquad \text{Formula (a)}$$

$$Rt = \{(nx + ny)/2 - nz\} \times d \qquad \text{Formula (b)}$$

wherein Ro represents the in-plane retardation value of the film, Rt represents the retardation value in the thickness direction of the film, nx represents the refractive index in the in-plane delayed phase axis direction of the film, ny represents the refractive index of the in-plane advanced phase axis direction of the film, and nz represents the refractive index of in the thickness direction of the film, and d represents the thickness (nm) of the film.

Table 2 shows the above evaluation results.

TABLE 2

| Cellulose Ester Film No. | Additive 1 Type | *1 | Additive 2 Type | *1 | UV Absorber | *2 | *3 | *4 | Pressing Treatment (kPa) | Free Volume Radius (nm) | Half-Value Width (nm) | Ro (nm) | Rt (nm) | Remarks |
|---|---|---|---|---|---|---|---|---|---|---|---|---|---|---|
| 1 | ** X1 | 12 | ** Y1 | 5 | present | 60 | 130 | 15 | — | 0.310 | 0.090 | 0 | 0 | Inv. |
| 2 | ** X1 | 12 | ** Y1 | 5 | none | 60 | 125 | 15 | 5 | 0.285 | 0.085 | 0 | 1 | Inv. |
| 3 | ** X1 | 12 | ** Y1 | 5 | none | 60 | 135 | 25 | 10 | 0.250 | 0.075 | 1 | 3 | Inv. |
| 4 | ** X1 | 12 | ** Y1 | 5 | none | 70 | 100 | 15 | — | 0.315 | 0.110 | 2 | 8 | Comp. |
| 5 | ** X1 | 12 | ** Y1 | 5 | none | 70 | 100 | — | — | 0.320 | 0.120 | 3 | 13 | Comp. |
| 6 | ** X2 | 10 | ** Y1 | 7 | none | 60 | 135 | 25 | — | 0.300 | 0.085 | 0 | -10 | Inv. |
| 7 | ** X2 | 12 | ** Y1 | 5 | none | 40 | 125 | 15 | 5 | 0.285 | 0.085 | 1 | -1 | Inv. |
| 8 | ** X2 | 12 | ** Y1 | 5 | none | 80 | 125 | 15 | — | 0.310 | 0.090 | 1 | 0 | Inv. |
| 9 | ** X2 | 12 | ** Y1 | 5 | none | 80 | 100 | 15 | — | 0.315 | 0.110 | 2 | 8 | Comp. |
| 10 | ** X2 | 12 | ** Y1 | 5 | none | 80 | 100 | — | — | 0.320 | 0.120 | 3 | 10 | Comp. |
| 11 | ** X3 | 12 | ** Y2 | 5 | none | 40 | 135 | 25 | 10 | 0.250 | 0.075 | 0 | -3 | Inv. |
| 12 | ** X3 | 12 | ** Y2 | 5 | none | 40 | 125 | 15 | 5 | 0.285 | 0.085 | 1 | -1 | Inv. |
| 13 | ** X3 | 12 | ** Y2 | 5 | none | 40 | 125 | 15 | — | 0.310 | 0.090 | 0 | 0 | Inv. |
| 14 | ** X3 | 10 | ** Y1 | 6 | none | 40 | 135 | 30 | — | 0.295 | 0.075 | 0 | 0 | Inv. |
| 15 | ** X3 | 10 | ** Y1 | 6 | none | 50 | 135 | 30 | — | 0.300 | 0.085 | 0 | 0 | Inv. |
| 16 | ** X3 | 10 | ** Y1 | 6 | none | 60 | 135 | 30 | — | 0.300 | 0.085 | 0 | 0 | Inv. |
| 17 | ** X2 | 6 | C-7 | 6 | none | 60 | 135 | 25 | — | 0.305 | 0.075 | 2 | 7 | Inv. |
| 18 | ** X3 | 6 | C-7 | 6 | none | 60 | 125 | 25 | — | 0.300 | 0.085 | 4 | 8 | Inv. |
| 19 | ** Y1 | 6 | C-10 | 6 | none | 60 | 135 | 25 | — | 0.295 | 0.070 | 2 | 6 | Inv. |
| 20 | A-4 | 6 | ** Y1 | 7 | none | 60 | 125 | 40 | — | 0.290 | 0.085 | 2 | 6 | Inv. |
| 21 | PL-19 | 8 | ** X1 | 4 | none | 80 | 130 | 35 | — | 0.305 | 0.090 | 5 | 3 | Inv. |
| 22 | *5 | 5 | ** X2 | 7 | none | 80 | 130 | 35 | — | 0.300 | 0.075 | 2 | 4 | Inv. |
| 23 | *6 | 5 | ** X2 | 7 | none | 80 | 130 | 35 | — | 0.305 | 0.085 | 3 | 5 | Inv. |
| 24 | *6 | 5 | ** X1 | 5 | none | 80 | 130 | 35 | — | 0.305 | 0.090 | 5 | 3 | Inv. |
| 25 | *7 | 5 | ** X2 | 7 | none | 80 | 130 | 35 | — | 0.305 | 0.085 | 3 | 5 | Inv. |
| 26 | PL-8 | 8 | ** X1 | 4 | none | 80 | 130 | 35 | — | 0.305 | 0.090 | 5 | 3 | Inv. |
| 27 | *8 | 3 | *9 | 8 | none | 80 | 160 | 10 | — | 0.335 | 0.140 | 13 | 36 | Comp. |
| 28 | *8 | 8 | *10 | 3 | none | 80 | 160 | 10 | — | 0.320 | 0.120 | 5 | 35 | Comp. |
| 29 | *8 | 8 | *10 | 3 | none | 80 | 175 | 46 | — | 0.355 | 0.150 | 3 | 31 | Comp. |
| 30 | ** X1 | 7 | ** Y1 | 10 | none | 40 | 130 | 40 | 5 | 0.285 | 0.090 | 1 | -20 | Inv. |
| 31 | ** X1 | 12 | ** Y1 | 5 | none | 40 | 125 | 35 | 5 | 0.295 | 0.085 | 0 | -15 | Inv. |
| 32 | ** X5 | 12 | ** Y3 | 5 | none | 40 | 120 | 30 | — | 0.305 | 0.095 | 1 | -30 | Inv. |
| 33 | ** X4 | 5 | ** Y4 | 8 | none | 20 | 135 | 30 | — | 0.260 | 0.040 | 0 | 15 | Inv. |
| 34 | A-31 | 8 | ** Y1 | 5 | none | 40 | 125 | 30 | — | 0.305 | 0.095 | 1 | 10 | Inv. |
| 35 | A-31 | 8 | ** X5 | 7 | none | 40 | 120 | 30 | — | 0.305 | 0.100 | 2 | 5 | Inv. |
| 36 | A-31 | 5 | ** Y2 | 10 | none | 40 | 130 | 40 | — | 0.300 | 0.090 | 0 | 5 | Inv. |
| 37 | A-31 | 5 | ** X1 | 10 | none | 40 | 130 | 40 | — | 0.300 | 0.090 | 1 | 5 | Inv. |
| 38 | A-31 | 10 | — | — | none | 40 | 130 | 40 | — | 0.310 | 0.100 | 1 | 20 | Inv. |
| 39 | A-31 | 10 | — | — | none | 40 | 100 | 10 | — | 0.320 | 0.150 | 1 | 20 | Comp. |

*1: Added Amount (parts by weight),
*2: Thickness of Cellulose Ester Film (μm),
*3: Heat Treatment Temperature (° C.)
*4: Ambient Air Replacement Frequency (times/hour)
** Polymer,
Inv.: Present Invention,
Comp.: Comparative Example
*5: Trimethylolpropane triacetate,
*6: Trimethylolpropane acetate 2,4-dioctanoate,
*7: Pentaerythritol tetraacetate
*8: Triphenyl phosphate,
*9: Ethylphthalyl ethyl glycolate
*10: Biphenyldiphenyl phosphate, Based on Table 2, it can be seen that by employing the polymers according to the present invention, and by controlling the free volume radius and the half-value width, the optical anisotropy of the cellulose ester film of the present invention is markedly decreased.

Example 2

Preparation of Polarizing Plates

By employing each of Cellulose Ester Films 1-39, 39 polarizing plates were prepared. Subsequently, the degradation of the polarizer, the dimensional stability of the polarizing plate, and the curling of the polarizing plate were evaluated.

A 120 μm thick polyvinyl alcohol film was immersed into 100 kg of an aqueous solution incorporating 1 kg of iodine and 4 kg of boric acid, and then stretched at a factor of 6, whereby a 25 μm thick polarizer was prepared. One side of the resulting polarizer was allowed to adhere to each of above Cellulose Ester Films 1-39 which had been subjected to alkali saponification, employing, as an adhesive, a 5% aqueous solution of completely saponified type polyvinyl alcohol.

The other side of each film was allowed to adhere to an antireflection film incorporating the hard coat layer described below, whereby Polarizing Plates 1-39 were prepared.
<Alkali Saponification>

| | | |
|---|---|---|
| Saponification Process | 2N—NaOH | 50° C. 90 seconds |
| Washing Process | water | 30° C. 45 seconds |
| Neutralization Process | 10 weight % HCl | 30° C. 45 seconds |
| Washing Process | water | 30° C. 45 seconds |

Under the above conditions, a film sample was saponified, washed, neutralized, and washed in the cited order, and subsequently dried at 80° C.
<Preparation of Antireflection Film>
By employing Cellulose Ester Film 1, prepared in Example 1, an antireflection film was prepared based on the following steps.

The refractive index of each layer constituting the antireflection layer was determined based on the following method.
(Refractive Index)

The refractive index of each refractive index layer was determined based on the measured results of the reflectance of the sample which had been prepared in such a manner that each of the several individual layers was applied onto the hard coat film prepared as below, while employing a spectrophotometer. The side of each sample, opposite the side to be measured, was subjected to a roughening treatment, and thereafter, the rear side was subjected to light absorption treatment employing a black spray, whereby light reflection from the rear surface was minimized. Subsequently, reflectance in the visible range (400-700 nm) was determined under the condition of 5-degree specular reflection, employing a spectrophotometer TYPE U-4000 (produced by Hitachi, Ltd.).
(Diameter of Minute Metal Oxide Particles)

The diameter of employed minute metal oxide particles was determined in such a manner that each of 100 minute particles was subjected to scanning electron microscopy (SEM) and the average value of the diameter of a sphere which circumscribed each of the particles was designated as the particle diameter.

<Preparation of Cellulose Ester Film Incorporating a Hard Coat Layer and a Back Coat Layer>

The hard coat layer liquid coating composition described below was filtered via a polypropylene filter at a pore diameter of 0.4 μm and was applied onto Cellulose Ester Film 1 prepared in Example 1, employing a micro-gravure coater. The resulting coating was dried at 90° C. and subsequently cured under conditions in which by employing an ultraviolet lamp, illuminance in the exposed area was set at 100 mW/cm$^2$ while the exposed amount was set at 0.1 J/cm$^2$, whereby a hard coat layer at a dried layer thickness of 7 μm was formed and a hard coat film was prepared.
(Hard Coat Layer Liquid Coating Composition)

The following materials were stirred and blended, whereby a hard coat layer liquid coating composition was prepared.

| | |
|---|---|
| Acryl monomer; KAYARAD DPHA (dipentaerythritol hexaacrylate, produced by Nippon Kayaku Co., Ltd.) | 220 parts by weight |
| IRUGACURE 184 (produced by Ciba Specialty Chemicals Co., Ltd.) | 20 parts by weight |
| Propylene glycol monomethyl ether | 110 parts by weight |
| Ethyl acetate | 110 parts by weight |

Further, the following back coat layer composition was applied onto the above coating to result in a wet layer thickness of 10 μm, employing an extrusion coater. The resulting coating was dried at 85° C., and wound, whereby a back coat layer was provided.
(Back Coat Layer Composition)

| | |
|---|---|
| Acetone | 54 parts by weight |
| Methyl ethyl ketone | 24 parts by weight |
| Methanol | 22 parts by weight |
| Diacetyl cellulose | 0.6 part by weight |
| 2% ultra-minute silica acetone dispersion (AEROSIL 200V, produced by Nippon Aerosil, Co., Ltd.) | 0.2 part by weight |

<<Preparation of Antireflection Film>>
As described below, applied onto the hard coat film, prepared as above, was a high refractive index layer and subsequently was a low refractive index layer, whereby an antireflection layer was prepared.
<<Preparation of Antireflection Layer: High Refractive Index Layer>>
The high refractive index layer coating composition, described below, was applied onto a hard coat film employing an extrusion coater, dried at 80° C. for one minute, and subsequently cured via an exposure to ultraviolet radiation at 0.1 L/cm$^2$, whereby a high refractive index layer was provide to result in a thickness of 78 nm.

The refractive index of the resulting high refractive index layer was 1.62.
<High Refractive Index Layer Coating Composition>

| | |
|---|---|
| Minute metal oxide particle isopropyl alcohol dispersion (20% solids, ITO particles at a particle diameter of 5 nm) | 55 parts by weight |

| Metal compound: Ti(OBu)4(tetra-n-butoxytitanium) | 1.3 parts by weight |
|---|---|
| Ionization curing type resin: dipentaerythritol hexaacrylate | 3.2 parts by weight |
| Photopolymerization initiator: IRUGACURE 184 (produced by Ciba Specialty Chemicals Co., Ltd.) | 0.8 part by weight |
| 10% straight chain dimethylsilicon-EO block polymer (FZ-2207, produced by Nippon Unicar Co., Ltd.) propylene glycol monomethyl ether liquid composition | 1.5 parts by weight |
| Propylene glycol monomethyl ether | 120 parts by weight |
| Isopropyl alcohol | 240 parts by weight |
| Methyl ethyl ketone | 40 parts by weight |

<<Preparation of Antireflection Layer: Low Refractive Index Layer>>

The following low refractive index layer coating composition was applied onto the above high refractive index layer, employing an extrusion coater. After drying the resulting coating at 100° C. for one minute, curing was carried out via an exposure to ultraviolet radiation of 0.1 J/cm² and thermal curing was further carried out at 120° C. for 5 minutes, whereby a low refractive index layer was provided to result in a thickness of 95 nm and thus an antireflection film was prepared. The refractive index of the above low refractive index layer was 1.37.

(Preparation of Low Refractive Index Layer Coating Composition)

<Preparation of Tetraethoxysilane Hydrolysis Product A>

A mixture prepared by blending 289 g of tetraethoxysilane with 553 g of ethanol was added to 157 g of a 0.15% aqueous acetic acid solution. The resulting mixture was stirred for 30 hours in a 25° C. water bath, whereby Hydrolysis Product A was prepared.

| Tetraethoxysilane Hydrolysis Product A | 110 parts by weight |
|---|---|
| Hollow minute silica based particle dispersion described below | 30 parts by weight |
| KBM 503 (silane coupling agent, produced by Shin-Etsu Chemical Co., Ltd.) | 4 parts by weight |
| 10% propylene glycol monomethyl ether liquid composition of straight chain dimethylsilicone-EO block copolymer (FZ-2207, produced by Nippon Unicar Co., Ltd.) | 3 parts by weight |
| Polypropylene glycol monomethyl ether | 400 parts by weight |
| Isopropyl alcohol | 400 parts by weight |

<Preparation of Hollow Minute Silica Based Particle Dispersion>

A mixture of 100 g of a silica sol of an average particle diameter of 5 nm and a $SiO_2$ concentration of 20% by weight and 1900 g of pure water was heated to 80° C. The pH of the above reaction mother liquor was 10.5. Simultaneously added to the mother liquor were 9,000 g of an aqueous 98% sodium silicate solution as $SiO_2$ and 9,000 g of an aqueous 1.02% by weight sodium aluminate solution as $Al_2O_3$. During the above operation, the temperature of the reaction liquor was maintained at 80° C. Immediately after the above addition, the pH of the reaction liquor increased to 12.5 and thereafter rarely varied. After the addition, the reaction liquor was cooled to room temperature and washed employing an ultrafiltration membrane, whereby an $SiO_2 \cdot Al_2O_3$ nucleus particle dispersion at a solid concentration of 20% by weight was prepared (Process (a)).

Added to 500 g of the above nucleus particle dispersion was 1,700 g of pure water, and the resulting mixture was heated to 98° C. While maintaining the above temperature, 3,000 g of a silicic acid liquid composition (at an $SiO_2$ concentration of 3.5% by weight) which had been prepared by de-alkalizing sodium silicate employing cation exchange resins was added, whereby a nucleus particle dispersion, in which the first silica covering layer was formed, was prepared (Process (b)).

Subsequently, 1,125 g of pure water was added to 500 g of the nucleus particle dispersion in which the silica covering layer, in which the solid concentration reached 13% by weight, was formed by washing, employing an ultrafiltration membrane. Further, the pH was controlled to 1.0 by dripping concentrated hydrochloric acid (35.5%), whereby an aluminum elimination treatment was performed. Subsequently, while adding 10 L of a aqueous hydrochloric acid solution at a pH of 3 and 5 L of pure water, aluminum salts dissolved via the ultrafiltration membrane were separated, whereby a porous $SiO_2 \cdot Al_2O_3$ particle dispersion, in which some of the constituting components of nucleus particles forming the first silica covering layer was removed, was prepared (Process (c)).

After heating, to 35° C., a mixture of 1,500 g of the above porous particle dispersion, 500 g of pure water, 1,750 g of ethanol, and 626 g of 28% ammonia water, 104 g of ethyl silicate (28% by weight $SiO_2$) was added, whereby the second silica covering layer was formed by covering the surface of the porous particles which formed the first silica covering layer with the hydrolysis polycondensation product of ethyl silicate. Subsequently, a hollow minute silica based particle dispersion at a solid concentration of 20% by weight was prepared in which the solvent was replaced with ethanol employing an ultrafiltration membrane.

The thickness of the first silica covering layer of the above hollow minute silica based particles was 3 nm, the average particle diameter thereof was 47 nm, and $MO_x/SiO_2$ (being a mol ratio) thereof was 0.0017, while the refractive index thereof was 1.28. The above average particle diameter was determined based on the dynamic light scattering method.

<<Heating Treatment of Antireflection Film>>

The prepared antireflection film was subjected to heat treatment at 80° C. for 4 days in a heat treatment room, and was then employed to prepare a polarizing plate.

<<Evaluation>>

(Rupture Problems During Preparation of Polarizing Plates)

In the above polarizing plate production process, 100 plate lots of each of the polarizing plates were prepared and the frequency of rupture problems of polarizing plates was recorded and evaluated based on the evaluation criteria below.

A: rupture problems of polarizing plates occurred in 0-2 lots
B: rupture problems of polarizing plates occurred in 3-5 lots
C: rupture problems of polarizing plates occurred in 6-10 lots
D: rupture problems of polarizing plates occurred in at least 11 lots Subsequently, liquid crystal displays were prepared employing Polarizing Plates 1-39 prepared in Example 2.

The previously adhered polarizing plate on the viewing side was peeled from liquid crystal television WOOO W17-LC50 produced by Hitachi, Ltd., which was an IPS mode type liquid crystal display, and the polarizing plate prepared as above was adhered to the glass surface of the liquid crystal cell. During the above operation, Cellulose Ester Films 1-39 prepared in Example 1 were arranged to be adhered onto the liquid crystal cell side. In the above liquid crystal television, produced by Hitachi, Ltd., employed was an immediate straight down back light.

In a bright room, a back light was continuously turned on, and visibility at the beginning of lighting and after 100 hours was visually evaluated based on the following criteria.
(Visibility)
A liquid crystal display panel was visually observed and visibility was evaluated employed the following rankings.
A: black looked sufficiently dense, clearness was noted, while no color shift was noted
B: black looked sufficiently dense, clearness was noted, while a slight color shift was noted
C: black did not look dense, clearness was slightly degraded, and color shift was noted
D: black did not look dense, clearness was degraded, and a color shift was a major concern
Table 3 below shows the evaluation results.

TABLE 3

| Polarizing Plate No. | Cellulose Ester Film No. | Rupture Problem during Production of Polarizing Plate | Liquid Crystal Display No. | Visibility | Remarks |
|---|---|---|---|---|---|
| 1 | 1 | B | 1 | A | Inv. |
| 2 | 2 | A | 2 | A | Inv. |
| 3 | 3 | A | 3 | A | Inv. |
| 4 | 4 | D | 4 | C | Comp. |
| 5 | 5 | D | 5 | D | Comp. |
| 6 | 6 | A | 6 | A | Inv. |
| 7 | 7 | A | 7 | A | Inv. |
| 8 | 8 | B | 8 | A | Inv. |
| 9 | 9 | D | 9 | C | Comp. |
| 10 | 10 | D | 10 | D | Comp. |
| 11 | 11 | A | 11 | A | Inv. |
| 12 | 12 | A | 12 | A | Inv. |
| 13 | 13 | B | 13 | A | Inv. |
| 14 | 14 | A | 14 | A | Inv. |
| 15 | 15 | A | 15 | A | Inv. |
| 16 | 16 | A | 16 | A | Inv. |
| 17 | 17 | B | 17 | B | Inv. |
| 18 | 18 | B | 18 | B | Inv. |
| 19 | 19 | B | 19 | B | Inv. |
| 20 | 20 | B | 20 | B | Inv. |
| 21 | 21 | B | 21 | B | Inv. |
| 22 | 22 | B | 22 | B | Inv. |
| 23 | 23 | B | 23 | B | Inv. |
| 24 | 24 | B | 24 | B | Inv. |
| 25 | 25 | B | 25 | B | Inv. |
| 26 | 26 | B | 26 | B | Inv. |
| 27 | 27 | D | 27 | D | Comp. |
| 28 | 28 | D | 28 | D | Comp. |
| 29 | 29 | D | 29 | D | Comp. |
| 30 | 30 | A | 30 | A | Inv. |
| 31 | 31 | A | 31 | A | Inv. |
| 32 | 32 | A | 32 | B | Inv. |
| 33 | 33 | A | 33 | A | Inv. |
| 34 | 34 | B | 34 | B | Inv. |
| 35 | 35 | B | 35 | B | Inv. |
| 36 | 36 | B | 36 | B | Inv. |
| 37 | 37 | B | 37 | B | Inv. |
| 38 | 38 | B | 38 | B | Inv. |
| 39 | 39 | D | 39 | D | Comp. |

Inv.: Present Invention,
Comp.: Comparative Example

Polarizing plates, in which the cellulose ester film of the present invention was employed as a polarizing plate protective film, resulted in minimal rupture problems, and the liquid crystal displays employing them minimized the degradation of visibility such as contrast or color shift after turning on a back light even over an extended period of time, whereby it was found that the above polarizing plates were excellent as a polarizing plate for an IPS mode type liquid crystal display.

Further, it was also found that the polarizing plate protective film on the viewing side exhibited sufficient antireflection capability.

Example 3

A Polarizing plate was prepared in the same manner as Example 2, except that the polarizer employed in Polarizing Plates 1-39 was replaced with the ethylene-modified PVA film, and evaluated in the same manner as Example 2. The polarizing plate of the present invention reproduced Example 2 and rupture problems during preparation of the polarizing plate was minimized and visibility was excellent. In addition, curling characteristics of the following polarizing plates was evaluated to B-A.

<Polarizer: Preparation of Ethylene-Modified PVA Film>

Impregnated into 100 parts by weight of ethylene-modified PVA at a content of ethylene units of 2.5 mol %, a saponification ratio of 99.95 mol %, and a degree of polymerization of 2,400 were 10 parts by weight of glycerin and 170 parts by weight of water. The resulting mixture was melt-kneaded, degassed, melt-extruded onto a metal roller via a T die, and then cast. The thickness of the ethylene-modified PVA film, after drying and a heat treatment, was 40 μm and the average value of hot water cutting temperature was 70° C.

A polarizing film was prepared in such a manner that the ethylene-modified PVA film, prepared as above, was subjected to a continuous process of preliminary swelling, dying, uniaxial stretching, fixing, drying, and a heat treatment in the cited order. In practice, the above ethylene-modified PVA film was immersed into water at 30° C. for 60 seconds to result in preliminary swelling, and subsequently immersed into an aqueous solution at a boric acid concentration of 40 g/liter, an iodine concentration of 0.4 g/liter, and a potassium iodide concentration of 60 g/liter. Subsequently, the resulting film was uniaxially stretched by a factor of 6 in a 4% boric acid aqueous solution at 55° C., and then immersed into an aqueous solution at a potassium iodide concentration of 60 g/liter, a boric acid concentration of 40 g/liter, and a zinc chloride concentration of 10 g/liter, all at 30° C. for 5 minutes, followed by a fixing treatment. Thereafter, the resulting ethylene-modified PVA film was removed and dried at 40° C., employing a heated air flow and further thermally treated at 100° C. for 5 minutes, whereby a polarizer of a layer thickness of 15 μm was prepared.

The transmittance and the degree of polarization of the resultant polarizing film were 44.34% and 99.46%, respectively, while the calculated dichroic ratio was 49.13. When the above polarizing film was placed at an angle of 10 degrees between two polarizing plates arranged in the parallel to the stretching axis direction (0 degree), the difference in luminance between the central portion and the edge portion against the lateral direction of the polarizing film was minimal, as targeted, and color shading was also minimal, as targeted.

<Evaluations of Curling of Polarizing Plates>

A polarizing plate cut to a 5 cm long and 1 cm wide sample was stored at 25° C. and 60% relative humidity for 3 days and then moved to an ambience of 25° C. and 10% relatively humidity. After 2 hours, curling was determined. A curl value was calculated based on the following formula.

Curl value=1/(radius of curvature (in cm) of the sample

Evaluation was performed based on the following criteria, referring to the range of the curl value.
A: less than 6
B: 6-less than 15
C: 15-less than 60
D: at least 60

Example 4

A liquid crystal display was prepared in the same manner as for Example 3, except that liquid crystal television WOOO W17-LC50, produced by Hitachi, Ltd, which was replaced with Hitachi liquid crystal television WOOO W32-L7000 which is an FFS mode type liquid display. Subsequently, visibility was evaluated, whereby Example 2 was reproduced and the liquid crystal display according to the present invention exhibited excellent visibility.

Example 5

The optical film on the viewing side of the liquid crystal cell of a liquid crystal television, FACE 23LC100, produced by Toshiba Co., Ltd., was peeled off. In the above optical film, a polarizing plate and a retardation film were adhered. Accordingly, the above retardation film was peeled off and the polarizing plate was allowed to remain. The transparent protective film on the liquid crystal cell side of the above polarizing plate was peeled off and, each of Cellulose Ester Film 1 prepared in Example 1 and Cellulose Ester Film 27, serving as an comparative example was adhered as an alternate, and the peeled retardation film was adhered in the same manner as before, whereby two types of optical films were prepared. The resultant optical film was adhered to the liquid crystal cell as before. Subsequently, a contrast ratio in the direction inclined by 70 degrees from the normal direction at an oblique 45 degrees (in the 1 o'clock 30 minutes direction of a clock. The results showed that the contrast ratio of the liquid crystal panel, employing Cellulose Ester Film 1 of the present invention as an optical film, was larger by a factor of 2 than the liquid crystal panel employing Cellulose Ester Film 27 as a comparative example, whereby it was found that the viewing angle was significantly enhanced. The contrast ratio was determined employing EZ CONTRAST (produced by ELDI Co.).

Further, the visibility was evaluated in the same manner as for Example 2. The liquid crystal panel employing Cellulose Ester Film 1 of the present invention exhibited excellent visibility even after turning on a back light for an extended period of time.

The invention claimed is:
1. A method for producing a cellulose ester film, comprising steps of:
casting a dope containing at least a plasticizer and cellulose ester to form a web;
stretching the web while the web still contains a solvent;
drying the web until an amount of residual solvent decreases to 0.3% to obtain a cellulose ester film; and
treating the film at 105-170° C. under a rate of atmosphere replacement of 12 times per hour or more while the web is transported,
wherein a free volume radius of the cellulose ester film determined by positron annihilation lifetime spectroscopy is in the range of 0.25 to 0.31 nm and a half-width of the cellulose ester film determined by positron annihilation lifetime spectroscopy is in the range of 0.04 to 0.1 nm;

wherein Ro of the cellulose ester film is in the range of 0 to 10 nm and Rt of the cellulose ester film is in the range of −30 to +20 nm, wherein Ro and Rt are defined by the following equations:

$$Ro=(nx-ny)\times d \qquad \text{Equation (a)}$$

$$Rt=((nx+ny)/2-nz)\times d, \qquad \text{Equation (b)}$$

wherein Ro represents an in-plane retardation value, Rt represents a retardation value in a thickness direction of the film, nx represents an in-plane refractive index in a slow axis direction, ny represents an in-plane refractive index in a fast axis direction, nz represents a refractive index in the thickness direction of the film (each refractive index is determined at a wavelength of 590 nm), and d represents a thickness of the film (nm); and wherein the dope in the casting step further comprises an additive selected from the group consisting of
a polymer having an average molecular weight of 500 to 30,000, the polymer being prepared from a monomer having an ethylenically unsaturated bond; and
an additive selected from the group consisting of compounds represented by Formulas (1), (2), (3), (5), (6), (7), (8), (9), (10), (11), (12) and (14):

Formula (1)

wherein $R^1$ and $R^2$ each independently represents an alkyl group which may have a substituent or an aryl group which may have a substituent,

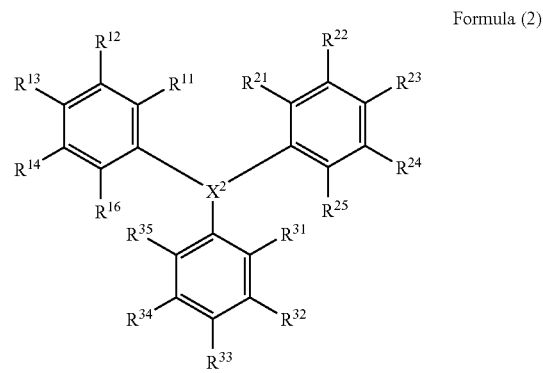

Formula (2)

wherein $X^2$ represents B, C—R (wherein R represents a hydrogen atom or a substituent), or N; and $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent,

Formula (3)

wherein R1 represents an organic group having a valence of n, and n represents an integer of 2 or more,

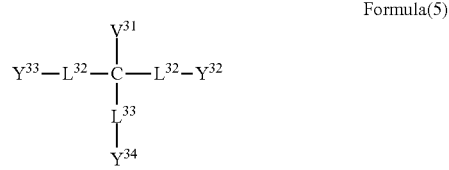

Formula (5)

-continued

Formula (6)

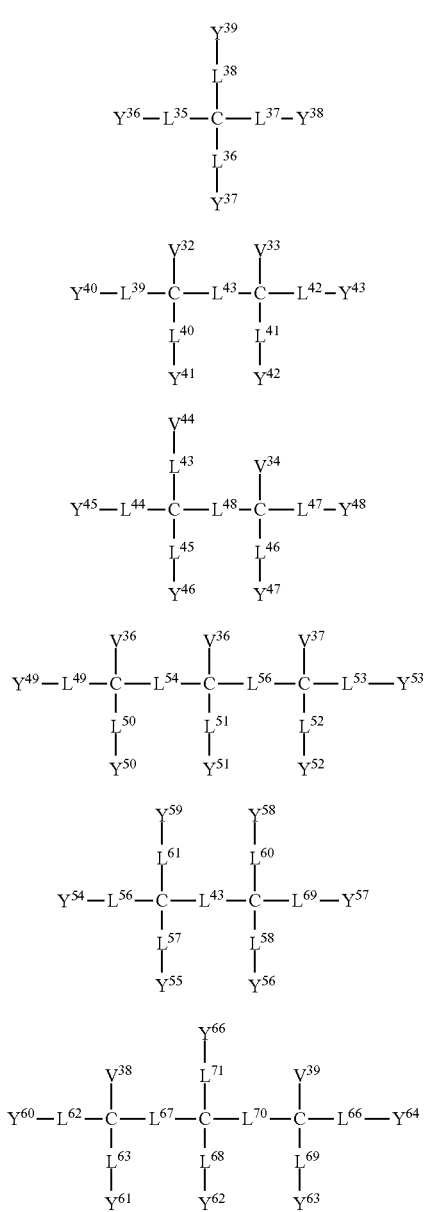

Formula (7)

Formula (8)

Formula (9)

Formula (10)

Formula (11)

-continued

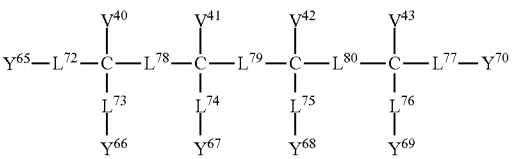

(Formula 12)

wherein $Y^{31}$-$Y^{70}$ each independently represents an acyloxy group having 1-20 carbon atoms, an alkoxycarbonyl group having 2-20 carbon atoms, an amido group having 1-20 carbon atoms, a carbamoyl group having 1-20 carbon atoms or a hydroxyl group; $V^{31}$-$V^{43}$ each independently represents a hydrogen atom or an aliphatic group having 1-20 carbon atoms; and $L^{31}$-$L^{80}$ each independently represents a single bond or a divalent saturated linking group having 1-40 total atoms and 0-20 carbon atoms; and $V^{31}$-$V^{43}$ and $L^{31}$-$L^{80}$ each may further have a substituent, and Formula (14)

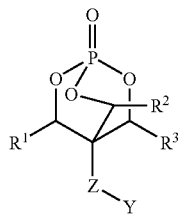

wherein $R^1$, $R^2$, and $R^3$ each independently represents a hydrogen atom or an alkyl group having 1-5 carbon atoms; Z represents a single bond, —O—, —CO—, an alkylene group, or an arylene group; and Y represents a hydrogen atom, an alkyl group, an aryl group, or an aralkyl group.

2. The method for producing the cellulose ester film of claim 1, wherein Rt of the cellulose ester film is further in the range of $-20$ nm$\leq$Rt$<$3 nm.

* * * * *